United States Patent
Beck et al.

(10) Patent No.: US 7,031,927 B1
(45) Date of Patent: Apr. 18, 2006

(54) SYSTEM, METHOD, AND COMPUTER PROGRAM PRODUCT FOR WEATHER AND TERRESTRIAL VEGETATION-BASED WATER RENOVATION AND MANAGEMENT FORECASTING

(75) Inventors: Steven Beck, Spring City, PA (US); Sam D. Campbell, Lawrence, KS (US); Frank deNoyelles, Lawrence, KS (US); Stephen L. Egbert, Lawrence, KS (US); Frederic D. Fox, Wayne, PA (US); David Penny, Lawrence, KS (US); Stephen J. Randtke, Lawrence, KS (US)

(73) Assignee: Strategic Weather Services, Wayne, PA (US)

( * ) Notice: Subject to any disclaimer, the term of this patent is extended or adjusted under 35 U.S.C. 154(b) by 0 days.

(21) Appl. No.: 09/547,791

(22) Filed: Apr. 12, 2000

(51) Int. Cl.
*G06F 17/60* (2006.01)

(52) U.S. Cl. .......................................................... 705/7

(58) Field of Classification Search ................ 705/7, 705/8, 9, 10; 700/2, 4, 284; 702/2, 136, 702/3; 703/10; 708/9
See application file for complete search history.

(56) References Cited

U.S. PATENT DOCUMENTS

| | | | |
|---|---|---|---|
| 3,808,410 A | 4/1974 | Schlesinger | ................ 235/156 |
| 4,015,366 A | 4/1977 | Hall, III | .......................... 47/1 |
| 4,040,629 A | 8/1977 | Kelly | |
| 4,218,755 A | 8/1980 | Root | |
| 4,342,125 A * | 8/1982 | Hodge | ............................ 4/508 |
| 4,580,814 A | 4/1986 | Berler | |
| 4,626,992 A * | 12/1986 | Greaves et al. | ............. 600/300 |
| 4,642,775 A | 2/1987 | Cline et al. | |
| 4,766,539 A | 8/1988 | Fox | |
| 4,784,150 A | 11/1988 | Voorhies et al. | ............. 128/664 |
| 5,063,506 A | 11/1991 | Brockwell et al. | |
| 5,128,861 A | 7/1992 | Kagami et al. | |
| 5,128,862 A | 7/1992 | Mueller | |
| 5,130,925 A | 7/1992 | Janes et al. | |
| 5,140,523 A | 8/1992 | Frankel et al. | |

(Continued)

FOREIGN PATENT DOCUMENTS

DE 41 14 584 11/1991

(Continued)

OTHER PUBLICATIONS http://www.irrigation.com—as Archived on Feb. 19, 1999.—A trade web site on golf, agriculture and landscape irrigation.*

(Continued)

*Primary Examiner*—Susanna M. Diaz
(74) *Attorney, Agent, or Firm*—Sterne, Kessler, Goldstein & Fox P.L.L.C.

(57) ABSTRACT

A system, method, and computer program product for weather and/or terrestrial vegetation-based water renovation and management forecasting are described herein. The system includes a water renovation and management forecast system that acts as an analysis engine, where the analysis engine executes a request for the evaluation of water. The system may also include a front end system that preferably provides a graphical user interface to the users of the present invention to access the water renovation and management forecast system. In addition, a database stores both past (i.e., history) and future (i.e., forecast) weather and/or terrestrial vegetation data that are used by the water renovation and management forecast system in the analysis of the water. Data in the database are passed in via the front end system, collected by the water renovation and management forecast system, or derived by the water renovation and management forecast system.

24 Claims, 41 Drawing Sheets

U.S. PATENT DOCUMENTS

| | | | |
|---|---|---|---|
| 5,168,445 A | 12/1992 | Kawashima et al. | |
| 5,189,606 A | 2/1993 | Burns et al. | |
| 5,208,665 A | 5/1993 | McCalley et al. | 358/86 |
| 5,237,496 A | 8/1993 | Kagami et al. | |
| 5,250,941 A | 10/1993 | McGregor et al. | 340/825 |
| 5,253,165 A | 10/1993 | Leiseca et al. | |
| 5,253,181 A | 10/1993 | Marui et al. | 716/17 |
| 5,263,167 A | 11/1993 | Conner, Jr. et al. | |
| 5,283,865 A | 2/1994 | Johnson | |
| 5,295,064 A | 3/1994 | Malec et al. | |
| 5,295,069 A | 3/1994 | Hersey et al. | |
| 5,309,355 A | 5/1994 | Lockwood | |
| 5,342,144 A | 8/1994 | McCarthy | 405/39 |
| 5,377,095 A | 12/1994 | Maeda et al. | |
| 5,444,820 A | 8/1995 | Tzes et al. | |
| 5,491,629 A | 2/1996 | Fox et al. | |
| 5,504,675 A | 4/1996 | Cragun et al. | |
| 5,521,813 A | 5/1996 | Fox et al. | |
| 5,654,886 A | 8/1997 | Zereski, Jr. et al. | |
| 5,673,366 A | 9/1997 | Maynard et al. | |
| 5,692,233 A | 11/1997 | Garman | |
| 5,712,985 A | 1/1998 | Lee et al. | |
| 5,740,549 A | 4/1998 | Reilly et al. | |
| 5,796,611 A | 8/1998 | Ochiai et al. | |
| 5,796,932 A | 8/1998 | Fox et al. | 345/326 |
| 5,832,456 A | 11/1998 | Fox et al. | |
| 5,848,378 A | 12/1998 | Shelton et al. | |
| 5,855,006 A | 12/1998 | Huemoeller et al. | 705/9 |
| 5,870,302 A * | 2/1999 | Oliver | 700/11 |
| 5,884,286 A | 3/1999 | Daughtery, III | |
| 5,909,671 A | 6/1999 | Byford et al. | |
| 5,978,738 A | 11/1999 | Brown | |
| 5,979,363 A * | 11/1999 | Shaar | 119/230 |
| 5,983,200 A | 11/1999 | Slotznick | |
| 5,999,882 A | 12/1999 | Simpson et al. | |
| 6,002,863 A | 12/1999 | Sheer et al. | 395/500.43 |
| 6,012,834 A | 1/2000 | Dueck et al. | |
| 6,018,640 A | 1/2000 | Blackman et al. | |
| 6,021,402 A | 2/2000 | Takriti | |
| 6,035,285 A | 3/2000 | Schlect et al. | 705/30 |
| 6,061,662 A | 5/2000 | Makivic | |
| 6,067,525 A | 5/2000 | Johnson et al. | 705/10 |
| 6,144,944 A | 11/2000 | Kurtzman et al. | |
| 6,173,276 B1 | 1/2001 | Kant et al. | |
| 6,188,960 B1 | 2/2001 | Baron et al. | |
| 6,240,369 B1 | 5/2001 | Foust | |
| 6,263,321 B1 | 7/2001 | Daughtery, III | |
| 6,298,285 B1* | 10/2001 | Addink et al. | 700/284 |
| 6,298,307 B1 | 10/2001 | Murphy et al. | |
| 6,317,686 B1 | 11/2001 | Ran | |
| 6,339,747 B1 | 1/2002 | Daly et al. | |
| 6,341,287 B1* | 1/2002 | Sziklai et al. | 707/102 |
| 6,356,842 B1 | 3/2002 | Intriligator et al. | |
| 6,397,162 B1* | 5/2002 | Ton | 702/136 |
| 6,405,179 B1 | 6/2002 | Rebane | |
| 6,418,417 B1 | 7/2002 | Corby et al. | |
| 6,453,215 B1* | 9/2002 | Lavoie | 700/284 |
| 6,453,216 B1* | 9/2002 | McCabe et al. | 700/284 |
| 6,496,780 B1 | 12/2002 | Harris et al. | |
| 6,498,987 B1 | 12/2002 | Kelly et al. | |
| 6,535,817 B1 | 3/2003 | Krishnamurti | |
| 6,581,008 B1 | 6/2003 | Intriligator et al. | |
| 6,584,447 B1 | 6/2003 | Fox et al. | |
| 2002/0026284 A1 | 2/2002 | Brown | |
| 2002/0032644 A1 | 3/2002 | Corby et al. | |
| 2002/0091692 A1 | 7/2002 | Yoshida et al. | |
| 2002/0107638 A1 | 8/2002 | Intriligator et al. | |
| 2002/0130899 A1 | 9/2002 | Ryan et al. | |
| 2002/0133385 A1 | 9/2002 | Fox et al. | |
| 2002/0194113 A1 | 12/2002 | Lof et al. | |
| 2003/0004780 A1 | 1/2003 | Smith et al. | |
| 2003/0200027 A1 | 10/2003 | Root et al. | |
| 2004/0215394 A1 | 10/2004 | Carpenter et al. | |
| 2004/0225556 A1 | 11/2004 | Willen et al. | |
| 2004/0230519 A1 | 11/2004 | Parker | |

FOREIGN PATENT DOCUMENTS

| | | |
|---|---|---|
| FR | 2 751 774 | 7/1996 |
| FR | 2 732 477 | 10/1996 |
| JP | 4-135271 | 5/1992 |
| JP | 9-128411 | 5/1997 |
| JP | 10-096790 | 4/1998 |
| JP | 10-332840 | 12/1998 |
| JP | 11-258359 | 9/1999 |
| WO | WO 98/22899 | 5/1998 |

OTHER PUBLICATIONS

Helfrich, Greg; Haas, Greg; Dubin Gary, "Software developed for disinfection rule compliance", Water Engineering & Management, 1993.*

Erickson, Paul, "Determination of Minimum Pool Level for Quabbin Reservoir on the Basis of Water Quality Constraints", 1966.*

Price et al. "Adapting a Patch Model to Simulate the Sensitivity of Central-Canadian Boreal Ecosystems to Climate Variability." Journal of Biogeography, vol. 26, No. 5, pp. 1101-1113, Sep. 1999.*

Reynolds, C.S. "The Ecosystems Approach to Water Management" (abstract only). Journal of Aquatic Ecosystem Stress and Recovery, vol. 2, No. 1, Mar. 1993.*

Risser, Paul G. "The Status of the Science Examining Ecotones." BioScience, vol. 45, No. 5, p. 318(8), May 1995.*

Kickert et al. "Predictive Modeling of Effects Under Global Change." Environmental Pollution 100 (103), pp. 87-132, 1999.*

International Search Report issued Jan. 8, 2001 for PCT/US01/11915, 4 pages.

Banham, R., "Reinsurers Seek Relief in Computer Predictions", Aug. 1993, pp. 14-16, 18-19, XP002082269, p. 14, col. 1, line 1, col. 2, line 29.

Chen, P.C., "Supercomputer-Based Visualization Systems Used for Analyzing Output Data of a Numerical Weather Prediction Model," ACM, pp. 296-309 (1990).

Gagne, James, 'Fair-weather trends', May 1997, American Demographics, pp. 1-5.

Gotschall, Mary G., "Bullish on weather," *Electric Perspectives*, Washington, vol. 23, No. 5, p. 30, 8 pgs (Sep./Oct. 1998).

http://www.bysb.com/sponsors/weathr.htm.

Hunter, R., "Forecast for Weather Derivatives: Hot Derivatives Strategy," May 1999, pp. 1-6, XP002133864, as printed from http://derivatives.com/magazine/arrive/1998/0598feal.asp> p. 1, line 1-p. 6, line 9.

"Japan-US Business Report, American Companies in Japan," *Software and Information Services*, vol. 1997, No. 335, Aug. 31, 1997.

Karmin, Monroe W., "Inflation, Jobs and Interest Rates: Dangerous Territory," *U.S. News & World Report*, vol. 108, No. 19, p. 50, May 14, 1990.

Lucchetti, A., "Cold Winter On the Way? Some bet on it," *Wall Street Journal*, Nov. 6, 1997.

Malliaris, M., "Beating the Best: A Neutral Network Challenges the Black-Scholes Formula," *Proceedings of the Conference on Artificial Intelligence for Applications*, US, Los Alamitos, IEEE Comp. Soc. Press, 1993, pp. 445-449, XP000379639, ISBN; 0-8186-3840-0, p. 445, col., 1, line 16, p. 446, col. 1, line 17.

"Microsoft Expedia Travel Services Debuts on the Web," PR Newswire, Oct. 22, 1996.

Ojala, Marydee, "The dollar sign: Weather databases online," Database, vol. 18, No. 1, pp. 72-76, Feb./Mar. 1995.

"Origins of Option Pricing Techniques", "The Black and Scholes Model", "The Black and Scholes Model " and "Graphs of the Black Scholes Model", as printed from http://bradley.bradley.edu/.about.arr/bsm, Apr. 9, 1997, (8 pages).

Pizano, A. et al., "Automatic Generation of Graphical User Interfaces for Interactive Database Applications," *Proceedings of the 1993 International Conference on Information and Knowledge Management*, Association for Computing Machinery, pp. 344-355 (Nov. 1993), XP009035258.

Rao, S.R.;Thomas, Edward G; Javalgi, Rajshekhar G., 'Activity Preferences and Trip-Planning Behavior of the U.S. Outbound Pleasure Travel Market', Winter, 1992, Journal of Travel Research, pp. 1-12.

Riordan, D. and Hansen, B.K., "A fuzzy case-based system for weather prediciton," *Engineering Intelligent Systems*, vol. 10, No. 3, CRL Publishing Ltd., pp. 139-146 (Sep. 2002).

Schwartz, S., "Modeling tools aid in financial risk management," *Insurance & Technology*, vol. 21, No. 4, pp. 20-21 (Apr. 1996).

"Skyline Multimedia Entertainment, Inc. Announces Co-Marketing Pact With Internet's InfoSpace.com; Deal Marks Theme Entertainment Company's Expansion Into Tour Industry Services," Business Wire, Sep. 4, 1998.

Stix, G., "A Calculus of Risk," *Scientific American*, pp. 92-97 (May 1998).

Studwell, A., "Weather Derivatives," *11th Conference on Applied Climatology*, Jan. 10-15, 1999, pp. 36-40, XP00089822, p. 36, col. 1, line 1-p. 40, col. 1, line 33.

Turvey, Calum G., "Weather Derivatives and Specific Event Risk," *Proceedings of the 1999 American Agricultural Economics Association Annual Meeting*, American Agricultural Economics Association (Aug. 1999).

Turvey, Calum, "Weather Derivatives for Specific Event Risks in Agriculture," *Review of Agricultural Economics*, American Agricultural Economics Association, vol. 23, No. 2, pp. 333-351 (Spring/Summer 2001).

Upbin, B., "Betting against God," *Forbes*, vol. 162, No. 1, p. 108(1) (Jul. 6, 1998).

'Urilicorp's Aquila energy to Greatly Expand it's Weather Hedging Products', Nov. 20, 1997, McGraw-Hill Publications, vol. 17, No. 1, p. 4.

"WeatherPlanner Introduces Weather Forecasting Service for Consumers and Small Businesses," PR Newswire, Nov. 11, 1997.

"WeatherPlanner Introduces Weather Forecasting Service for Skiers; Revolutionary Planning Tool Provides Forecasts up to 12 Months in Advance," PR Newswire, Dec. 12, 1997.

"WeatherPlanner Introduces Weather Forecasting Service for Vacationers; Revolutionary Planning Tool Provides Forecasts up to 12 Months in Advance," PR Newswire, Mar. 19, 1998.

"WeatherPlanner Introduces Weather Forecasting Service to Aid Brides in Planning Weddings and Honeymoons," PR Newswire, Dec. 9, 1997.

"WeatherPlanner Offers Weather Forecasting Service for Outdoor Enthusiasts; Weather Forecasts Now Available up to 12 Months in Advance," PR Newswire, Mar. 6, 1998.

"WeatherPlanner Tees Up Weather Forecasting Service for Golfers; Weather Forecasts Now Abailable up to 12 Months in Advance," PR Newswire, May 5, 1998.

"Web WeatherPlanner Site for Weather Predictions," Newsbytes News Network, Dec. 12, 1997.

Williams, Michael et al., "Natural Gas Trends," Railroad Commission of Texas Gas Services Division Regulatory Analysis & Policy Section, Jul. 28, 2003.

www.intellicast.com, Screen Print, Jul. 4, 1998.

wysiwyg://171/http://www.aquilaenergy.com/northamerica/about/.

English Abstract of French Patent Publication No. 2 751 774, 1 page, data supplied from the esp@cenet database.

English Abstract of Japanese Patent Publication No. 9-128411, 1 page, data supplied from the esp@cenet database.

English Abstract Page for Japanese Patent Publication No. 10096790, 1 page, data supplied from the esp@cenet database.

English Abstract Page for Japanese Patent Publication No. 10332840, 1 page, data supplied from the esp@cenet database.

English Abstract Page for Japanese Patent Publication No. 11258359, 1 page, data supplied from the esp@cenet database.

International Search Report from PCT Appl. No. PCT/US93/11005, 5 pages, mailed Jun. 27, 1994.

International Search Report from PCT Appl. No. PCT/US95/00618, 2 pages, mailed May 3, 1995.

International Search Report from PCT Appl. No. PCT/US95/02557, 3 pages, mailed Jun. 8, 1995.

International Search Report from PCT Appl. No. PCT/US97/01075, 2 pages, mailed May 14 1997.

International Search Report from PCT Appl. No. PCT/US99/23452, 3 pages, mailed Jun. 4, 2000.

International Search Report from PCT Appl. No. PCT/US04/32440, 2 pages, mailed May 27, 2005.

Best, D.L. and Pryor, S.P., *Air Weather Service Model Output Statistics System Project Report*, United States Air Force, Entire Report submitted (Oct. 1983).

*Demand Modeling & Forecasting System Product Description*, Printed from DIALOG File No. 256, 1 page (Apr. 1989—Product Release Data).

*Down to Earth Sales Analysis 3.1 Product Description*, Printed from DIALOG File No. 256, 1 page (Apr. 1989—Product Release Date).

Hurrell, M., "The Weather Business," *Intercity*, pp. 29, 31 and 32 (Feb. 1991).

*IMREX Demand Forecasting System Product Description*, Printed from DIALOG File No. 256, 1 page (1984—Product Release Date).

*The Weather Initiative*, (Brochure), The Met Office, 23 pages (1990).

*Microsoft Excel User's Guide*, Microsoft Corporation, pp. 280-281, 596-601 and 706-709 (1993).

Brennan Peter J., "Portfolio Managers Weather Global Risk Management Challenge," *Wall Street Computer Review*, Dealers Digest Inc., vol. 7, No. 1, pp. 20-22, 24, 54, 56, Oct. 1989.

Jensen, Cary and Anderson, Loy, *Harvard Graphics: The Complete Reference*, Osborne McGraw-Hill, pp. 5, 16, 17, 126-129, 737-747, 1990.

Cave Tom, "Weather Service Is a Boon To System Dispatchers," *Transmission & Distribution*, vol. 43, No. 8, pp. 165, 166, 168-169, Aug. 1991.

Mitchell et al., "Where No Computer Has Gone Before: Massively Parallel Processing Promises Unparalleled Performance," McGraw-Hill Inc., *Business Week*, pp. 80-84, 88, Nov. 25, 1991.

Engle, R.F. et al, "Modelling Peak Electricity Demand," John Wiley & Sons, Ltd., *Journal of Forecasting*, vol. 11, No. 3, pp. 241-251, Apr. 1992.

*Microsoft Access™ User's Guide*, Microsoft Corporation, pp. 22-27, 36-39, 327-335, 370-373, 395-447, 1992.

Ehrenberg, A.S.C. et al., "The After Effects of Price-Related Consumer Promotions," Advertising Research Foundation, Inc., *Journal of Advertising Research*, vol. 34, No. 4, pp. 11-12, Jul./Aug. 1994.

Patent Abstracts of Japan, JP 1236396, published Sep. 21, 1989.

Patent Abstracts of Japan, JP 1259488, published Oct. 17, 1989.

Patent Abstracts of Japan, JP 2268396, published Nov. 2, 1990.

Patent Abstracts of Japan, JP 2299059, published Dec. 11, 1990.

Patent Abstracts of Japan, JP 4077896, published Mar. 11, 1992.

Patent Abstracts of Japan, JP 4135271, published May 8, 1992.

Patent Abstracts of Japan, JP 4353970, published Dec. 8, 1992.

Patent Abstracts of Japan, JP 5189406, published Jul. 30, 1993.

Patent Abstracts of Japan, JP 6076161, published Mar. 18, 1994.

Patent Abstracts of Japan, JP 6149833, published May 31, 1994.

\* cited by examiner

Weather History Data 505

| Year | MA | Data Type | Period1 | Period2 | Period3 | Period4 | Period5 | Period6 |
|---|---|---|---|---|---|---|---|---|
| ... | ... | ... | ... | ... | ... | ... | ... | ... |
| 1997 | MA100 | temp.sea | 46 | 47 | 50 | 51 | 49 | 47 |
| 1998 | MA100 | temp.sea | 46 | 47 | 49 | 51 | 50 | 48 |
| 1997 | MA100 | prec.sea | 1.01 | 1.03 | 1.08 | 1.1 | 1.12 | 1.1 |
| 1998 | MA100 | prec.sea | 1.01 | 1.03 | 1.07 | 1.1 | 1.12 | 1.1 |
| 1997 | MA100 | wind_speed.sea | 17 | 15 | 5 | 7 | 10 | 14 |
| 1998 | MA100 | wind_speed.sea | 16 | 15 | 4 | 7 | 10 | 13 |
| 1997 | MA100 | solar_radiation.sea | 3.4 | 4.1 | 4.2 | 5.5 | 4.3 | 3.8 |
| 1998 | MA100 | solar_radiation.sea | 3.4 | 4.0 | 4.2 | 5.4 | 4.0 | 3.7 |
| 1997 | MA100 | cloud_cover.sea | 75 | 75 | 25 | 25 | 25 | 75 |
| 1998 | MA100 | cloud_cover.sea | 75 | 75 | 25 | 25 | 25 | 75 |
| 1997 | MA100 | cooling_rate.sea | 0.2 | 0.3 | 0.2 | 0.2 | 0.2 | 0.1 |
| 1998 | MA100 | cooling_rate.sea | 0.3 | 0.3 | 0.2 | 0.2 | 0.2 | 0.2 |
| 1997 | MA100 | growing_degree_days.sea | 24 | 25 | 25 | 21 | 19 | 16 |
| 1998 | MA100 | growing_degree_days.sea | 24 | 26 | 25 | 21 | 19 | 16 |
| ... | ... | ... | ... | ... | ... | ... | ... | ... |

FIG. 6A

Weather History Data 505

| Year | MA | Data Type | Period1 | Period2 | Period3 | Period4 | Period5 | Period6 |
|---|---|---|---|---|---|---|---|---|
| 1997 | MA100 | temp | 49 | 43 | 45 | 47 | 50 | 42 |
| 1998 | MA100 | temp | 53 | 51 | 56 | 50 | 58 | 54 |
| 1997 | MA100 | prec | 1.5 | 0.4 | 0.9 | 1.3 | 1.7 | 0.3 |
| 1998 | MA100 | prec | 1.1 | 0.01 | 2.68 | 1.78 | 0.48 | 0.01 |
| 1997 | MA100 | wind_speed | 15 | 14 | 5 | 7 | 16 | 20 |
| 1998 | MA100 | wind_speed | 12 | 15 | 10 | 8 | 18 | 21 |
| 1997 | MA100 | solar_radiation | 3.0 | 4.1 | 4.0 | 5.2 | 4.3 | 4.0 |
| 1998 | MA100 | solar_radiation.sea | 3.4 | 4.0 | 4.5 | 5.4 | 4.0 | 3.7 |
| 1997 | MA100 | cloud_cover | 100 | 75 | 25 | 25 | 25 | 0 |
| 1998 | MA100 | cloud_cover | 75 | 75 | 25 | 25 | 25 | 25 |
| 1997 | MA100 | cooling_rate | 0.3 | 0.3 | 0.2 | 0.2 | 0.2 | 0.1 |
| 1998 | MA100 | cooling_rate | 0.3 | 0.3 | 0.2 | 0.2 | 0.2 | 0.2 |
| 1997 | MA100 | growing_degree_days | 26 | 27 | 25 | 25 | 19 | 16 |
| 1998 | MA100 | growing_degree_days | 23 | 26 | 25 | 20 | 19 | 15 |
| ... | ... | ... | ... | ... | ... | ... | ... | ... |

FIG. 6B

Weather History Data 505

| Year | MA | Data Type | Period1 | Period2 | Period3 | Period4 | Period5 | Period6 |
|---|---|---|---|---|---|---|---|---|
| 1997 | MA100 | temp.cat | 1 | -1 | -1 | -1 | 1 | -1 |
| 1998 | MA100 | temp.cat | 1 | 1 | 1 | -1 | 1 | 1 |
| 1997 | MA100 | prec.cat | 1 | -1 | -1 | 1 | 1 | -1 |
| 1998 | MA100 | prec.cat | 1 | -1 | 1 | 1 | -1 | -1 |
| 1997 | MA100 | wind_speed.cat | -1 | 0 | 0 | 0 | 1 | 1 |
| 1998 | MA100 | wind_speed.cat | -1 | 0 | 1 | -1 | 1 | 1 |
| 1997 | MA100 | solar_radiation.cat | 0 | 0 | -1 | 0 | 0 | 0 |
| 1998 | MA100 | solar_radiation.cat | 1 | 0 | 0 | 0 | 0 | -1 |
| 1997 | MA100 | cloud_cover.cat | 0 | 0 | 0 | 0 | 0 | -1 |
| 1998 | MA100 | cloud_cover.cat | 1 | 0 | 0 | 0 | 0 | 0 |
| 1997 | MA100 | cooling_rate.cat | 0 | 0 | 0 | 0 | 0 | 0 |
| 1998 | MA100 | cooling_rate.cat | 1 | 1 | 0 | 1 | 0 | 0 |
| 1997 | MA100 | growing_degree_days.cat | -1 | 0 | 0 | -1 | 0 | -1 |
| 1998 | MA100 | growing_degree_days.cat | ... | ... | ... | ... | ... | ... |
| ... | ... | ... | | | | | | |

FIG. 6C

Weather Patterns Data 510

- SUSTAINED WEATHER
    - TEMPERATURE SUSTAINED 2 PERIODS
    - TEMPERATURE SUSTAINED 3 PERIODS
    - PRECIPITATION SUSTAINED 2 PERIODS
    - PRECIPITATION SUSTAINED 3 PERIODS
    - WIND SPEED SUSTAINED 2 PERIODS
    - WIND SPEED SUSTAINED 3 PERIODS
    - SOLAR RADIATION SUSTAINED 2 PERIODS
    - SOLAR RADIATION SUSTAINED 3 PERIODS
    - CLOUD COVER SUSTAINED 2 PERIODS
    - CLOUD COVER SUSTAINED 3 PERIODS
    - COOLING RATE SUSTAINED 2 PERIODS
    - COOLING RATE SUSTAINED 3 PERIODS
    - GROWING DEGREE DAYS SUSTAINED 2 PERIODS
    - GROWING DEGREE DAYS SUSTAINED 3 PERIODS

- TEMPERATURE/PRECIPITATION LAG 1 PERIOD
    - SEASONAL/SEASONAL
    - SEASONAL/ABOVE SEASONAL
    - SEASONAL/BELOW SEASONAL
    - ABOVE SEASONAL/SEASONAL
    - ABOVE SEASONAL/ABOVE SEASONAL
    - ABOVE SEASONAL/BELOW SEASONAL
    - BELOW SEASONAL/SEASONAL
    - BELOW SEASONAL/ABOVE SEASONAL
    - BELOW SEASONAL/BELOW SEASONAL

- TEMPERATURE/SOLAR RADIATION LAG 1 PERIOD
    - SEASONAL/SEASONAL
    - SEASONAL/ABOVE SEASONAL
    - SEASONAL/BELOW SEASONAL
    - ABOVE SEASONAL/SEASONAL
    - ABOVE SEASONAL/ABOVE SEASONAL
    - ABOVE SEASONAL/BELOW SEASONAL
    - BELOW SEASONAL/SEASONAL
    - BELOW SEASONAL/ABOVE SEASONAL
    - BELOW SEASONAL/BELOW SEASONAL

- CLOUD COVER/SOLAR RADIATION LAG 1 PERIOD
    - SEASONAL/SEASONAL
    - SEASONAL/ABOVE SEASONAL
    - SEASONAL/BELOW SEASONAL
    - ABOVE SEASONAL/SEASONAL
    - ABOVE SEASONAL/ABOVE SEASONAL
    - ABOVE SEASONAL/BELOW SEASONAL
    - BELOW SEASONAL/SEASONAL
    - BELOW SEASONAL/ABOVE SEASONAL
    - BELOW SEASONAL/BELOW SEASONAL

Weather Forecast Data 515

| Year | MA | Data Type | Period1 | Period2 | Period3 | Period4 | Period5 | Period6 |
|---|---|---|---|---|---|---|---|---|
| N+1 | MA100 | temp.sea | 47 | 47 | 49 | 52 | 54 | 55 |
| N+1 | MA100 | prec.sea | 1.00 | 1.03 | 1.06 | 1.05 | 1.10 | 1.1 |
| N+1 | MA100 | wind_speed.sea | 18 | 14 | 5 | 7 | 11 | 15 |
| N+1 | MA100 | solar_radiation.sea | 3.4 | 4.1 | 4.2 | 5.4 | 4.2 | 3.7 |
| N+1 | MA100 | cloud_cover.sea | 75 | 75 | 25 | 0 | 25 | 75 |
| N+1 | MA100 | cooling_rate.sea | ? | ? | ? | ? | ? | ? |
| N+1 | MA100 | growing_degree_days.sea | 24 | 27 | 27 | 25 | 20 | 17 |
| ... | ... | ... | ... | ... | ... | ... | ... | ... |
| N+1 | MA100 | temp | 48 | 49 | 50 | 53 | 55 | 57 |
| N+1 | MA100 | prec | 1.1 | 1.05 | 1.05 | 1.00 | 1.15 | 1.2 |
| N+1 | MA100 | wind_speed | 16 | 16 | 7 | 5 | 16 | 20 |
| N+1 | MA100 | solar_radiation | 3.5 | 4.5 | 4.5 | 5.5 | 5.0 | 4.3 |
| N+1 | MA100 | cloud_cover | 75 | 25 | 75 | 25 | 0 | 25 |
| N+1 | MA100 | cooling_rate | 0.2 | 0.3 | 0.2 | 0.2 | 0.2 | 0.2 |
| N+1 | MA100 | growing_degree_days | 24 | 28 | 26 | 22 | 20 | 16 |
| ... | ... | | ... | ... | ... | ... | ... | ... |

FIG. 8A

Weather Forecast Data 515

| Year | MA | Data Type | Period1 | Period2 | Period3 | Period4 | Period5 | Period6 |
|---|---|---|---|---|---|---|---|---|
| N+1 | MA100 | temp.cat | 1 | 1 | 1 | 1 | 1 | 1 |
| N+1 | MA100 | prec.cat | 1 | 1 | -1 | -1 | 1 | 1 |
| N+1 | MA100 | wind_speed.cat | -1 | 1 | 1 | 1 | 1 | 1 |
| N+1 | MA100 | solar_radiation.cat | 0 | -1 | 1 | 1 | 1 | 1 |
| N+1 | MA100 | cloud_cover.cat | -1 | 0 | 0 | 0 | -1 | -1 |
| N+1 | MA100 | cooling_rate.cat | 0 | 1 | -1 | -1 | 0 | 0 |
| ... | ... | growing_degree_days.cat | ... | ... | ... | ... | ... | -1 |

FIG. 8B

| Year | Reservoir | MA | Description of Watershed | | | | | | | | | | | Recorded Problems | | | | | | Attempted Solutions | | | | | | Number of People Served | Size in Acres of Water Supply versus Total Size | Ownership Type | Uses (%) | | | | | |
|---|---|---|---|---|---|---|---|---|---|---|---|---|---|---|---|---|---|---|---|---|---|---|---|---|---|---|---|---|---|---|---|---|---|---|
| | | | Terrain (%) | | | | | Aquatic Systems (%) | | | | | Period1 | Period2 | Period3 | Period4 | Period5 | Period6 | Period1 | Period2 | Period3 | Period4 | Period5 | Period6 | | | | Drinking Water | Flood Control | Irrigation | Recreation | Power Plant Cooling | Other |
| | | | Grassland | Cropland | Forest | Residential | Industry | Other | Ponds | Wetlands | Streams/Rivers | Other | | | | | | | | | | | | | | | | | | | | | | |
| ... | ... | ... | ... | ... | ... | ... | ... | ... | ... | ... | ... | ... | ... | ... | ... | ... | ... | ... | ... | ... | ... | ... | ... | ... | ... | ... | ... | ... | ... | ... | ... | ... | ... | ... |
| 1997 | R1 | MA 100 | 58 | 30 | 9 | 2 | 0 | 1 | 30 | 35 | 35 | 0 | OP1, OP6 | OP1, OP6 | OP1, OP6 | OP1, OP6 | OP1, OP6 | OP1, OP6 | | S2 | S8 | | | S1 | 15,000 | 8,800/ 9,400 | F | 50 | 25 | 25 | 0 | 0 | 0 |
| 1998 | R1 | MA 100 | 40 | 48 | 9 | 2 | 0 | 1 | 30 | 45 | 25 | 0 | OP6 | OP6 | OP6 | OP1, OP6 | OP1, OP6 | OP1, OP3, OP6 | S6 S2 | | | | | | 5,325 | 8,312/ 9,400 | F | 40 | 25 | 25 | 10 | 0 | 0 |
| 1997 | R2 | MA 101 | 25 | 0 | 45 | 5 | 23 | 4 | 20 | 0 | 80 | 0 | OP4 | OP6 | OP4 | OP4 | OP1, OP6 | OP4 | | | S7 | | | S7 | 0 | 950/ 1,500 | P | 0 | 0 | 0 | 0 | 100 | 0 |
| 1998 | R2 | MA 101 | 25 | 0 | 45 | 5 | 23 | 4 | 20 | 0 | 80 | 0 | OP4 | OP4 | OP4, OP2, OP4 | OP4, OP2, OP4 | OP2, OP4 | OP2, OP4 | S7 | S7 | S7 | | | | 0 | 900/ 1,500 | P | 0 | 0 | 0 | 0 | 100 | 0 |
| 1997 | R3 | MA 135 | 20 | 0 | 30 | 5 | 45 | 0 | 50 | 0 | 50 | 0 | OP6 | OP6 | OP6 | OP6 | OP6 | OP6 | | | S2 | S2 | S2 | S2 | 1,200 | 5,400/ 7,000 | D | 70 | 30 | 0 | 0 | 0 | 0 |
| 1998 | R3 | MA 135 | 20 | 0 | 30 | 3 | 48 | 0 | 40 | 10 | 50 | 0 | OP6 | | OP6 | OP6 | OP6 | OP6 | S2 | S2 | | | | | 1,313 | 5,000/ 7,000 | D | 75 | 15 | 0 | 9 | 0 | 1 |
| ... | ... | ... | ... | ... | ... | ... | ... | ... | ... | ... | ... | ... | ... | ... | ... | ... | ... | ... | ... | ... | ... | ... | ... | ... | ... | ... | ... | ... | ... | ... | ... | ... | ... | ... |

FIG. 9

Reservoir/Watershed History Database 410

Observable Problems Data 1005

| Observable Problem | Description | Related Fundamental/Observable Problems |
|---|---|---|
| OP1 | Objectionable Taste and Odor Conditions | OP3, OP6, FP2, FP3, FP4 |
| OP2 | Declining Wildlife (e.g., fish) | OP5, OP6, OP8, FP3, FP4 |
| OP3 | Shallow Water | FP3 |
| OP4 | Decreased Water Clarity | FP3, FP4 |
| OP5 | Decreased Water Flow | FP3, FP4 |
| OP6 | Excessive Plant Growth | FP1, FP4 |
| ... | ... | ... |

FIG. 11

Fundamental Problems Data 1010

| Fundamental Problem | Description | Related Weather Causes | Related Terrestrial Vegetation Causes | Possible Solutions (✓) | | | | | | | | | |
|---|---|---|---|---|---|---|---|---|---|---|---|---|---|
| | | | | S1 | S2 | S3 | S4 | S5 | S6 | S7 | S8 | S9 | ... |
| FP1 | Elevated Plant Nutrient Levels | Excessive watershed runoff due to high precipitation and/or high wind speed; high temperature; high solar radiation and/or reduced cloud coverage increasing water temperature, decreasing water circulation, and increasing plant growth | Early season greenness in agricultural areas; Late season greenness in agricultural areas | ✓ | | ✓ | | | | | | | ... |
| FP2 | Elevated Chemical Levels (Geosmin) | High solar radiation, high temperatures, low cooling rate, and/or reduced cloud coverage decreasing water circulation and increasing plant growth | Early season greenness in agricultural areas; Late season greenness in agricultural areas | ✓ | ✓ | ✓ | | ✓ | ✓ | ✓ | ✓ | ✓ | ... |
| FP3 | Siltation | Excessive watershed runoff due to high precipitation and/or high wind speed | Early season greenness in agricultural areas; Late season greenness in agricultural areas | | ✓ | ✓ | | ✓ | | ✓ | ✓ | ✓ | ... |
| FP4 | Thermal Stratification | Warm temperatures in the spring and early summer; High solar radiation, high temperatures, low cooling rate, and/or reduced cloud coverage decreasing water circulation | | ✓ | | | ✓ | | | | | | ... |
| ... | ... | ... | ... | ... | ... | ... | ... | ... | ... | ... | ... | ... | ... |

FIG. 12

Solutions Database 420

| Type of Solution | Solution | Description | Term | Economic Impact | Political Impact | Environmental Impact |
|---|---|---|---|---|---|---|
| Physical | S1 | Adjust Water Level | short | low | high | medium |
| | S2 | Cut Weeds | short | medium | low | low |
| | S3 | Dredge | long | high | low | low |
| | S4 | Aeration (Destratification) | short | medium | low | low |
| | S5 | Alter Adjacent Land Use | long | high | high | high |
| | S6 | Disinfect (Water Treatment) | long | high | low | low |
| | S7 | Filter (Water Treatment) | long | high | low | low |
| | S8 | Apply different types of fertilizer to crops | short | low | high | medium |
| | S9 | Apply fertilizer at time sensitive times relating to terrestrial greenness | short | low | high | low |
| Chemical | S10 | Introduce Herbicides | short | medium | high | high |
| Biological | S11 | Introduce Fish | long | medium | low | low |
| ... | ... | ... | ... | ... | ... | ... |

Temporal Metrics Data 1405

| Year | MA | Time of Onset of Greenness 620 | | | | | | Time of End of Greenness 620 | | | | | | Duration of Greenness 620 | | | | | | Time of Maximum Greenness 620 | | | | | |
|---|---|---|---|---|---|---|---|---|---|---|---|---|---|---|---|---|---|---|---|---|---|---|---|---|---|
| | | Period1 | Period2 | Period3 | Period4 | Period5 | Period6 | Period1 | Period2 | Period3 | Period4 | Period5 | Period6 | Period1 | Period2 | Period3 | Period4 | Period5 | Period6 | Period1 | Period2 | Period3 | Period4 | Period5 | Period6 |
| ... | ... | ... | ... | ... | ... | ... | ... | ... | ... | ... | ... | ... | ... | ... | ... | ... | ... | ... | ... | ... | ... | ... | ... | ... | ... |
| 1997 | MA100 | 80 | 81 | 80 | 88 | 86 | 81 | 250 | 250 | 252 | 260 | 245 | 250 | 170 | 174 | 172 | 162 | 159 | 169 | 185 | 184 | 190 | 177 | 185 | 187 |
| 1998 | MA100 | 75 | 77 | 80 | 85 | 85 | 83 | 239 | 244 | 266 | 250 | 250 | 245 | 164 | 167 | 186 | 165 | 165 | 166 | 186 | 186 | 190 | 179 | 178 | 185 |
| 1997 | MA101 | 92 | 93 | 101 | 101 | 100 | 95 | 251 | 250 | 251 | 249 | 245 | 250 | 159 | 157 | 150 | 148 | 145 | 155 | 189 | 183 | 182 | 180 | 189 | 189 |
| 1998 | MA101 | 101 | 101 | 115 | 115 | 103 | 97 | 245 | 250 | 250 | 246 | 245 | 250 | 144 | 149 | 135 | 131 | 142 | 153 | 185 | 186 | 180 | 189 | 191 | 190 |
| ... | ... | ... | ... | ... | ... | ... | ... | ... | ... | ... | ... | ... | ... | ... | ... | ... | ... | ... | ... | ... | ... | ... | ... | ... | ... |

FIG. 16

NDVI-Value Metrics Data 1410

NDVI-Value Metrics 1605

| Year 605 | MA 610 | Value of Onset of Greenness 620 (1610) | | | | | | Value of End of Greenness 620 (1615) | | | | | | Value of Maximum NDVI 620 (1620) | | | | | | Range of NDVI 620 (1625) | | | | | |
|---|---|---|---|---|---|---|---|---|---|---|---|---|---|---|---|---|---|---|---|---|---|---|---|---|---|
| | | P1 | P2 | P3 | P4 | P5 | P6 | P1 | P2 | P3 | P4 | P5 | P6 | P1 | P2 | P3 | P4 | P5 | P6 | P1 | P2 | P3 | P4 | P5 | P6 |
| ... | ... | ... | ... | ... | ... | ... | ... | ... | ... | ... | ... | ... | ... | ... | ... | ... | ... | ... | ... | ... | ... | ... | ... | ... | ... |
| 1997 | MA100 | 120 | 125 | 122 | 119 | 126 | 115 | 118 | 120 | 119 | 117 | 121 | 121 | 169 | 171 | 168 | 169 | 170 | 170 | 49 | 48 | 47 | 51 | 47 | 50 |
| 1998 | MA100 | 115 | 117 | 120 | 119 | 125 | 110 | 120 | 120 | 121 | 120 | 118 | 118 | 170 | 170 | 168 | 165 | 166 | 166 | 44 | 47 | 50 | 50 | 48 | 47 |
| 1997 | MA101 | 132 | 133 | 150 | 117 | 130 | 125 | 130 | 118 | 120 | 119 | 119 | 119 | 165 | 165 | 166 | 170 | 171 | 169 | 50 | 51 | 48 | 54 | 53 | 50 |
| 1998 | MA101 | 145 | 151 | 130 | 120 | 125 | 125 | 135 | 119 | 125 | 120 | 120 | 116 | 169 | 170 | 170 | 171 | 169 | 170 | 48 | 51 | 53 | 53 | 48 | 50 |
| ... | ... | ... | ... | ... | ... | ... | ... | ... | ... | ... | ... | ... | ... | ... | ... | ... | ... | ... | ... | ... | ... | ... | ... | ... | ... |

Derived Metrics Data 1415

| Year 605 | MA 610 | Derived Metrics 1705 | | | | | | | | | | | | | | | | | | | | | | |
|---|---|---|---|---|---|---|---|---|---|---|---|---|---|---|---|---|---|---|---|---|---|---|---|---|
| | | Accumulated NDVI 620 (1710) | | | | | | Rate of Green-up 620 (1715) | | | | | | Rate of Senescence 620 (1720) | | | | | | Mean Daily NDVI 620 (1725) | | | | |
| | | Period1 | Period2 | Period3 | Period4 | Period5 | Period6 | Period1 | Period2 | Period3 | Period4 | Period5 | Period6 | Period1 | Period2 | Period3 | Period4 | Period5 | Period6 | Period1 | Period2 | Period3 | Period4 | Period5 | Period6 |
| ... | ... | ... | ... | ... | ... | ... | ... | ... | ... | ... | ... | ... | ... | ... | ... | ... | ... | ... | ... | ... | ... | ... | ... | ... | ... |
| 1997 (1730) | MA100 | 1600 | 1600 | 1570 | 1550 | 1620 | 1600 | 2.2 | 2.1 | 2.0 | 2.1 | 2.0 | 2.0 | -1.7 | -2.0 | -1.9 | -1.7 | -1.7 | -1.9 | 155 | 150 | 150 | 149 | 149 | 148 |
| 1998 (1735) | MA100 | 1620 | 1590 | 1590 | 1600 | 1620 | 1620 | 2.2 | 2.2 | 1.9 | 2.2 | 2.0 | 2.0 | -1.6 | -2.1 | -1.8 | -1.8 | -1.7 | -1.7 | 150 | 150 | 150 | 149 | 149 | 150 |
| 1997 | MA100 | 1560 | 1570 | 1590 | 1550 | 1600 | 1590 | 2.0 | 2.2 | 1.9 | 2.0 | 1.9 | 2.2 | -1.7 | -1.8 | -1.7 | -1.7 | -1.8 | -2.0 | 152 | 155 | 150 | 155 | 153 | 150 |
| 1998 | MA100 | 1590 | 1600 | 1610 | 1590 | 1600 | 1600 | 2.0 | 2.1 | 2.0 | 1.9 | 2.0 | 2.1 | -1.7 | -1.7 | -1.7 | -1.8 | -1.8 | -1.8 | 150 | 153 | 152 | 149 | 155 | 155 |
| ... | ... | ... | ... | ... | ... | ... | ... | ... | ... | ... | ... | ... | ... | ... | ... | ... | ... | ... | ... | ... | ... | ... | ... | ... | ... |

FIG. 17

Vegetation Forecast Metrics Data 1420

Temporal Metrics

| Year | MA | Time of Onset of Greenness 620 | | Time of End of Greenness 620 | | Duration of Greenness 620 | | Time of Maximum Greenness 620 | | Value of Onset of Greenness 620 | | Value of End of Greenness 620 | | Value of Maximum NDVI 620 | | Range of NDVI 620 | | Accumulated NDVI 620 | | Rate of Green-up 620 | | Rate of Senescence 620 | | Mean Daily NDVI 620 | |
|---|---|---|---|---|---|---|---|---|---|---|---|---|---|---|---|---|---|---|---|---|---|---|---|---|---|
| | | Period1 | Period6 | Period1 | Period6 | Period1 | Period6 | Period1 | Period6 | Period1 | Period6 | Period1 | Period6 | Period1 | Period6 | Period1 | Period6 | Period1 | Period6 | Period1 | Period6 | Period1 | Period6 | Period1 | Period6 |
| ... | ... | ... | ... | ... | ... | ... | ... | ... | ... | ... | ... | ... | ... | ... | ... | ... | ... | ... | ... | ... | ... | ... | ... | ... | ... |
| N+1 | MA100 | 75 | 80 | 251 | 250 | 170 | 172 | 185 | 191 | 120 | 122 | 120 | 120 | 171 | 170 | 50 | 49 | 1610 | 1550 | 2.1 | 2.0 | -1.8 | -1.8 | 150 | 145 |
| N+1 | MA101 | 92 | 90 | 250 | 250 | 171 | 170 | 190 | 190 | 120 | 121 | 119 | 120 | 170 | 170 | 49 | 46 | 1600 | 1600 | 2.0 | 2.0 | -1.7 | -1.8 | 150 | 150 |
| ... | ... | ... | ... | ... | ... | ... | ... | ... | ... | ... | ... | ... | ... | ... | ... | ... | ... | ... | ... | ... | ... | ... | ... | ... | ... |

FIG. 18

Government Compliance Database 430

| Type | State/Locality | MA(s) Applicable | Permit Required for Solution (✓) | | | | | | | | | |
|------|----------------|------------------|----|----|----|----|----|----|----|----|----|-----|
| | | | S1 | S2 | S3 | S4 | S5 | S6 | S7 | S8 | S9 | ... |
| Federal | — | MA100–MA1780 | | | | | | | | | | ... |
| State | Alabama | MA201 – MA215 | | | | | | | | ✓ | | ... |
| | Alaska | MA100 – MA109 | | | ✓ | | ✓ | ✓ | ✓ | ✓ | | ... |
| | Arkansas | MA390 – MA415 | | | ✓ | | ✓ | ✓ | ✓ | ✓ | ✓ | ... |
| | ... | ... | ... | ... | ... | ... | ... | ... | ... | ... | ... | ... |
| Local | Allegheny County, PA | MA129 | ✓ | | ✓ | | ✓ | ✓ | ✓ | ✓ | | ... |
| | Awency County, MD | MA909 | ✓ | | ✓ | | ✓ | ✓ | ✓ | ✓ | ✓ | ... |
| | Buck County, PA | MA128 | ... | ... | ... | ... | ... | ... | ... | ... | ... | ... |
| | ... | ... | | | | | | | | ✓ | ✓ | ... |

FIG. 19

CLIENT  SERVER
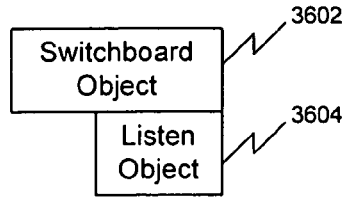
FIG. 36A
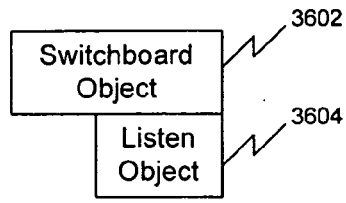 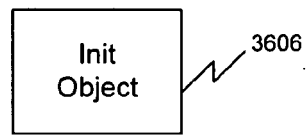
FIG. 36B
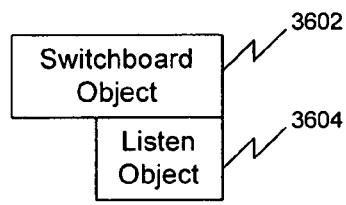 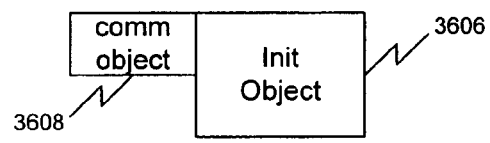
FIG. 36C
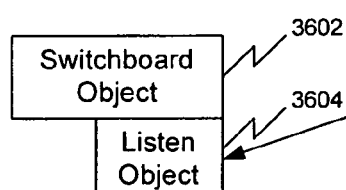 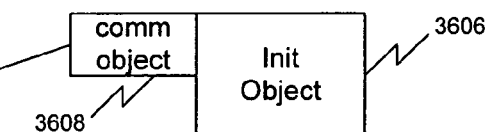
FIG. 36D
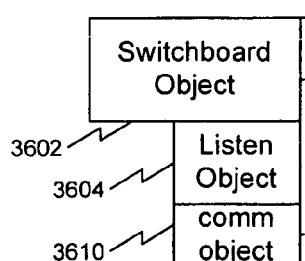 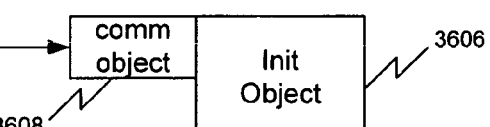
relocates
FIG. 36E
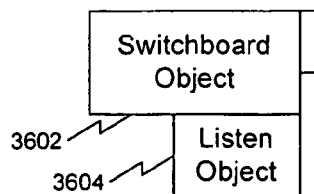 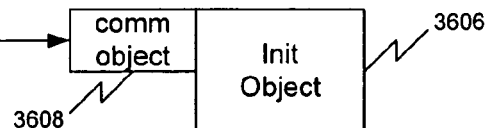
FIG. 36F

SYSTEM, METHOD, AND COMPUTER PROGRAM PRODUCT FOR WEATHER AND TERRESTRIAL VEGETATION-BASED WATER RENOVATION AND MANAGEMENT FORECASTING

BACKGROUND OF THE INVENTION

1. Field of the Invention

The present invention is generally related to water renovation and management, and more particularly to weather and terrestrial vegetation-based reservoir renovation and management forecasting.

2. Related Art

Reservoirs and lakes are basins of standing water ranging greatly in size with the flow of water through them reduced below that of the streams and rivers entering. Both "behave" in most of the same ways, are affected by most of the same environmental conditions, can provide most of the same resources, and can require most of the same types of renovation and management. Reservoirs are constructed by human means while lakes are of natural origin. Reservoirs are more often the focus of renovation and management because they are constructed at great expense to serve particular continuing needs. Reservoirs are often constructed in locations where there are few natural lakes. Therefore, reservoirs are likely to be in environments hostile to their continuing existence.

In general, an ecosystem is a system formed by the interaction of a community of organisms with their physical environment. A reservoir, though human construction, is an ecosystem and functions much like a natural lake being a system with many interacting and interdependent parts. These interacting and interdependent parts can be both coarsely and finely viewed. The coarser viewed parts include the reservoir and its watershed. A reservoir's watershed comprises other systems connected to the reservoir within its drainage basin including the land (i.e., terrain) and other aquatic systems like ponds, wetlands, and streams/rivers. A watershed is generally ten (10) to one hundred (100) times larger than its reservoir.

The finer viewed parts of an ecosystem include particular species of plants and animals. Finer viewed parts also include the physical and chemical conditions/components like temperature and the dissolved nutrients in the watershed or in the reservoir water. Changes in the structure or functioning of the coarser and/or finer viewed parts of the ecosystem and the ensuing "chain reactions" of these changes affecting other parts is the normal operation of an ecosystem. Certain changes can also lead to undesirable conditions and the problems that society must solve in order to maintain the intended uses of these resources.

More than two million ponds and reservoirs of all sizes have been constructed in the United States this century and many more worldwide. In the United States nearly one thousand (1,000) reservoirs are larger than one thousand (1,000) acres with about half of these being federally operated. The lower half of the continental United States has the greatest number of reservoirs, particularly the central states of Kansas, Missouri, Oklahoma, Arkansas, and Texas. A typical Kansas reservoir, seven thousand (7000) acres in size, constructed in the 1970s cost a total of fifty (50) to sixty (60) million dollars.

More than half of the population of the United States receives some drinking water from reservoirs. The economic impact of recreation for reservoirs larger than one hundred (100) acres and the economic impact of all reservoirs in terms of flood control protecting lives and property are incalculable.

Problems in reservoirs today that most often require particular renovation and management actions involve the quality of drinking water, recreation, the water storage capacity for flood control, power generation, and so forth. As discussed above, reservoirs were built where there are few natural lakes. In fact, reservoirs were built to serve the many different purposes that lakes typically provide. Therefore, since lakes do not naturally exist in these locations, it is not surprising that the local environment is often not very supportive of a reservoir's continued existence.

There are few natural lakes in these areas mostly because the soils are naturally very erodible and can be disturbed even more by human activities. Thus, the reservoir acts as a settling basin where the process of siltation deposits soil, clay, and smaller rock particles filling the basin in one hundred (100) to two hundred (200) years. This is the actual projected life expectancy of most reservoirs when they are built, which is far shorter than the tens of thousands of years that most lakes exist. As reservoirs fill with these materials, three to five times more rapidly in their upper basins where the streams enter, the ever expanding shallow zones reduce the quality of the water and habitat as well as the original storage capacity for flood waters, power generation, and recreation. Two hundred of the largest reservoirs in the US are now more than forty (40) years old. Over the next century most of the reservoirs that currently exist will have filled, at least to the point of ending their useful life.

Since reservoirs have already been built in nearly all of the best places, one possible solution to prolonging the useful life of a reservoir is to excavate the reservoir. This solution is not ideal for several reasons. First, excavating the existing reservoir will require moving fifteen (15) to thirty (30) times more material than originally moved to construct the reservoir's dam. Second, it will be necessary to find a close by location to deposit this material to reduce costs. And finally, because so much urban and rural development has steadily surrounded existing reservoirs, it is not possible to simply continually raise the height of the original dam and the contained water level.

Obviously, new renovation and management strategies must be developed and implemented to maintain the intended uses of these reservoirs and extend their life expectancy. What is needed is a way of using past and future weather analysis in the process of projecting future reservoir problems to determine, not only one or more solutions for each problem, but also the timely implementation of each solution. Further what is needed is a way of using past and future terrestrial vegetation analysis in the process of projecting future reservoir problems to determine, not only one or more solutions for each problem, but also the timely implementation of each solution. Terrestrial vegetation, as it relates to weather conditions, are indicators of reservoir water conditions.

SUMMARY OF THE INVENTION

The present invention is a system, method, computer program product, and portions and combinations thereof, for a total approach for weather-based and/or terrestrial vegetation-based management and renovation of reservoirs for water supply, recreation, flood control, and other multipurpose uses. It is important to note that the present invention, as it analyzes a reservoir for renovation and management strategies, may use weather data alone in its analysis, terrestrial vegetation data alone, or both weather and terrestrial vegetation data may be used in combination with each other.

The system for water renovation and management forecasting is weather and/or terrestrial vegetation-based. The system includes a water renovation and management forecast system that acts as an analysis engine, where the analysis engine executes a request in the evaluation of water. The system may also include a front end system that preferably provides a graphical user interface to the users of the present invention to access the water renovation and management forecast system. In addition, a database stores both past and future weather and/or terrestrial vegetation data that is used by the water renovation and management forecast system in the analysis of the water. Data in the database are passed in via the front end system, collected by the water renovation and management forecast system, or derived by the water renovation and management forecast system.

The method of the present invention preferably involves setting up a database, where the data stored in the database are used for forecasting renovation and management schemes for water; receiving, by a front end system, a request to analyze a specific body of water; analyzing, with a water renovation and management forecast system, problems and solutions for those problems for the body of water based on history and future weather and/or terrestrial vegetation.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. Generally, the drawing in which an element first appears is indicated by the leftmost digit(s) in the corresponding reference number.

BRIEF DESCRIPTION OF THE FIGURES

The present invention will be described with reference to the accompanying drawings, wherein:

FIGS. 6A, 6B, and 6C are tables containing exemplary weather history data according to an embodiment of the present invention;

FIGS. 7A and 7B illustrate exemplary weather patterns data according to an embodiment of the present invention;

FIGS. 8A and 8B are tables containing exemplary weather forecast data according to an embodiment of the present invention;

FIG. 9 is a table containing exemplary reservoir/watershed history data according to an embodiment of the present invention;

FIG. 11 is a table containing exemplary observable problems data according to an embodiment of the present invention;

FIG. 12 is a table containing exemplary fundamental problems data according to an embodiment of the present invention;

FIG. 13 is a table containing exemplary solutions data according to an embodiment of the present invention;

FIG. 15 is a table containing exemplary temporal metrics data according to an embodiment of the present invention;

FIG. 16 is a table containing exemplary NDVI-value metrics data according to an embodiment of the present invention;

FIG. 17 is a table containing exemplary derived metrics data according to an embodiment of the present invention;

FIG. 18 is a table containing exemplary vegetation forecast metrics data according to an embodiment of the present invention;

FIG. 19 is a table containing exemplary government compliance data according to an embodiment of the present invention;

FIGS. 36A–36I illustrate the dynamic steps to establish communication between a client and a server executing an object-oriented program according to an embodiment of the present invention.

Figure 1:
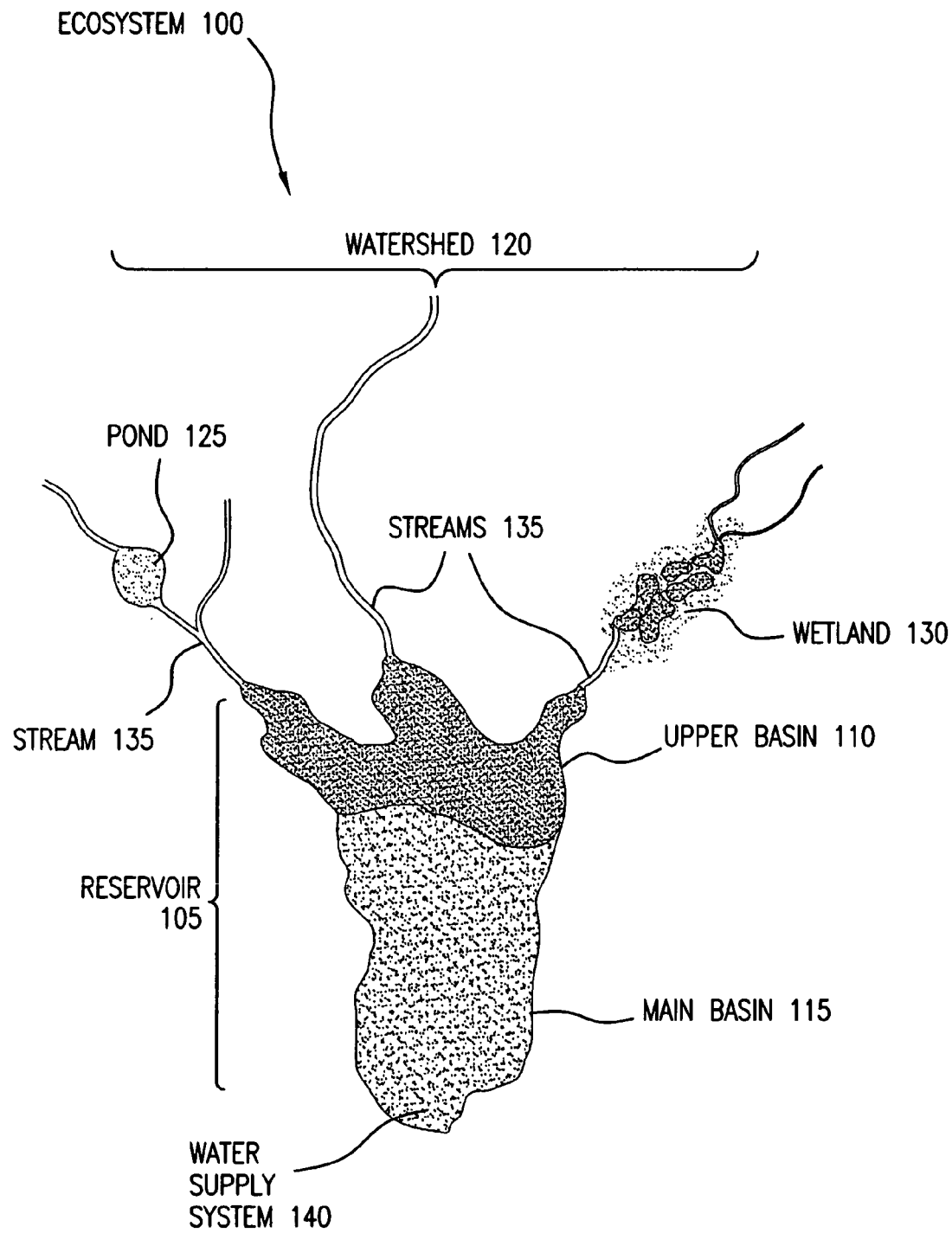
FIG. 1 illustrates the interconnection of the coarser viewed parts of an ecosystem according to an embodiment of the present invention.

| Detailed Description of the Preferred Embodiments TABLE OF CONTENTS | | |
| --- | --- | --- |
| I. | Overview of The Present Invention | |
| II. | Overview of an Ecosystem | |
| III. | System Architecture Overview | |
| IV. | Weather-Related Functionality of the Present Invention | |
| | A. | Temperature |
| | B. | Precipitation |
| | C. | Wind Speed |
| | D. | Cloud Cover |
| | B. | Solar Radiation |
| | F. | Cooling Rate |
| | G. | Growing Degree Days |
| V. | Terrestrial Vegetation-Related Functionality of the Present Invention | |
| VI. | Examples of Interaction Between Problems, Solutions, Weather, and Terrestrial Vegetation | |
| VII. | Databases of the Present Invention | |
| | A. | Weather Database |
| | | 1. Weather History Data |
| | | 2. Weather Pattern Data |
| | | 3. Weather Forecast Data |
| | B. | Reservoir/Watershed History Database |
| | C. | Problems Database |
| | | 1. Observable Problems Data |
| | | 2. Fundamental Problems Data |
| | D. | Solutions Database |
| | B. | Terrestrial vegetation database |
| | | 1. Temporal Metrics Data |
| | | 2. NDVI-Value Metrics Data |
| | | 3. Derived Metrics Data |
| | | 4. Vegetation Forecast Metrics Data |
| | F. | Government Compliance Database |
| VIII. | General System Operation | |
| | A. | Background Modules |
| | | 1. Calculator Module |
| | | 2. Data Manager Module |
| | | 3. External Data Parser Module |
| | B. | Processing Modules |
| | | 1. Operation of Analyzer Module |
| | |    i. Determination of the Impact of Past Weather Patterns on Observable Problems |
| | |    ii. Determination of the Impact of Past Terrestrial Vegetation on Observable Problems |
| | | 2. Operation of Diagnosis Module |
| | | 3. Operation of Remedy Module |
| | |    i. Determination of the Impact of Predicted Future Weather on Fundamental Problems |
| | |    ii. Determination of the Impact of Predicted Future Terrestrial Vegetation on Fundamental Problems |
| | |    iii. Determination of the Solutions to Fundamental Problems |
| | | 4. Operation of Compliance Module |
| | | 5. Operation of Cost Module |
| | C. | Administration Modules |
| | | 1. Administration Module |
| | | 2. Initiator Module |
| | | 3. User/database Module |
| IX. | Implementations of the Present Invention | |
| | A. | An Implementation of the Present Invention |
| | B. | A Software Programming Language and Network Architecture |
| | C. | Other Implementations of the Present Invention |
| X. | Conclusion | |

I. Overview of The Present Invention

The present invention is directed to a system, method, and computer program product for water renovation and management forecasting. For convenience, the present invention is described herein in the context of a reservoir and its watershed. However, it should be understood that the invention is adapted and envisioned for use with any basin of water, such as lakes, ponds, etc., in addition to reservoirs.

The present invention is "weather and/or terrestrial vegetation adapted." In other words, the present invention, when forecasting water renovation and management, takes the affect of weather and/or terrestrial vegetation into consideration. For example, suppose the invention is used to forecast water level adjustment of a reservoir for flood control next spring. In performing this forecasting function, the present invention will take into consideration the weather predictions for next spring (whether precipitation in general will be below seasonal, seasonal, or above seasonal, for example). The anticipated terrestrial vegetation of the land surrounding the reservoir also provides an indication of the quantity and quality of water that will flow into the reservoir (i.e., not be absorbed by the surrounding vegetation). Thus, the present invention may also take into consideration the terrestrial vegetation predictions for next spring. Because it takes weather and/or terrestrial vegetation into consideration, the present invention is generally more accurate than systems and methods that do not take the affect of weather and/or terrestrial vegetation into consideration.

If a user desires, based on the weather and/or terrestrial vegetation, to automatically diagnosis any basin of water to determine both past and present problems, receive both short term and long term remedies of the problems based on the diagnosis, and receive both short term and long term management advice of the water basin based on the diagnosis and remedies, the present offers a way to provide such information. More specifically, the present invention greatly facilitates and enhances the ability of users to remedy and manage water basins based on past and future weather and/or terrestrial vegetation and how each affects water conditions. The present invention typically incorporates some or all of the following categories of functionality: (1) retrieving and analyzing past and current water basin data to produce a diagnosis of the ecosystem, (2) determining solutions (i.e., remedies) for the water basin based on the diagnosis and predicted future weather and terrestrial vegetation, and (3) determining management advice for the user based on the diagnosis and determined solutions. Further development of the use of weather and terrestrial vegetation analyses in reservoir management and renovation will be discussed below as they relate to both the databases and the functionality of the present invention.

Figure 2:
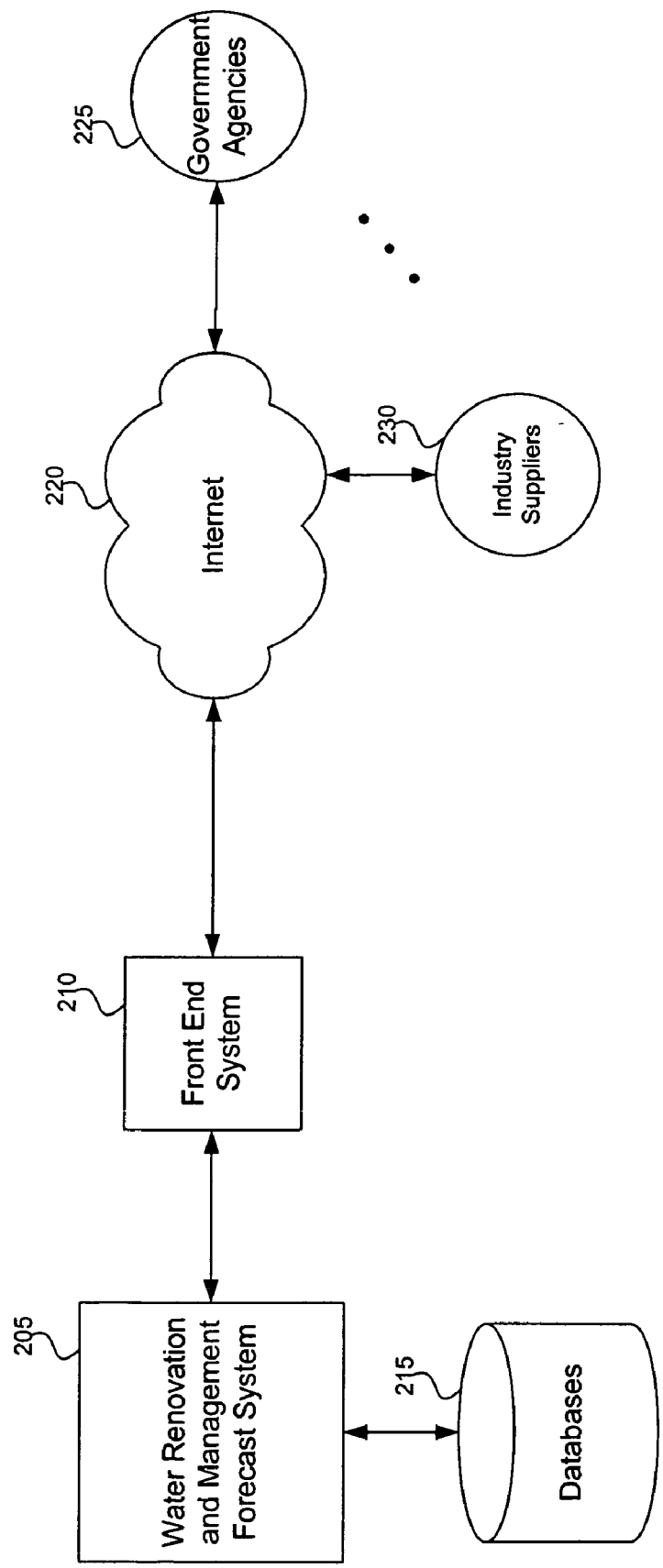
FIG. 2 is a block diagram representing an example operating environment of the present invention according to an embodiment of the present invention.

The present invention thus contemplates a water renovation and management forecast system 205, a front end system 210, and databases 215 as shown in FIG. 2 and described in detail below. To facilitate the reader in the understanding of the present invention an ecosystem in terms of a reservoir and its watershed is described next. As mentioned above, for convenience only, the present invention is described herein in the context of a reservoir and its watershed. However, it should be understood that the invention is adapted and envisioned for use with any basin of water.

II. Overview of an Ecosystem

A reservoir, though human construction, is an ecosystem and functions much like a natural lake being a system with many interacting and interdependent parts. These interacting and interdependent parts can be both coarsely and finely viewed. The coarser viewed parts include: (1) the reservoir and all of the other systems connected to the reservoir within its drainage basin including the terrestrial and other aquatic systems like ponds, wetlands, and streams. These terrestrial and/or aquatic systems make up the reservoir's watershed. The finer viewed parts include particular species of plants and animals. Finer viewed parts also include the physical and chemical conditions/components like temperature and the dissolved nutrients in the watershed or in the reservoir water.

An example of the coarser viewed parts of an ecosystem, and how they interconnect, are further explained with reference to FIG. 1. In FIG. 1, the coarser viewed parts of an ecosystem 100 includes: (1) a reservoir 105 made up of an upper basin 110 and a main basin 115; and (2) a watershed 120 made up of one or more ponds 125, one or more wetlands 130, one or more streams 135, and the adjoining land. Main basin 115 comprises a water supply system 140. Water supply system 140 is the water that is supplied to consumers.

Streams 135 enter upper basin 110. Thus, the process of siltation fills upper basin 110 with materials (e.g., deposits of soil, clay, smaller rock particles, etc.) three to five times more rapidly than main basin 115. Thus, water supply system 140 typically reduces in quality and quantity as reservoir 105 gets older and fills with silt.

III. System Architecture Overview

FIG. 2 is a block diagram representing an example operating environment of the present invention. It should be understood that the example operating environment in FIG. 2 is shown for illustrative purposes only and does not limit the invention. Other implementations of the operating environment described herein will be apparent to persons skilled in the relevant art(s) based on the teachings contained herein, and the invention is directed to such other implementations. Referring to FIG. 2, a water renovation and management forecast system 205 (also called "renovation system" herein), a front end system 210, databases 215, the global Internet 220, government agencies 225, and industry suppliers 230 according to an embodiment of the present invention, are shown.

An embodiment of the functional modules of the present invention includes water system 205, front end system 210, and databases 215. Renovation system 205 acts as an analysis engine for the present invention in the evaluation of water system renovation and management. Renovation system 205 is connected to front end system 210. Front end system 210 may provide a graphical user interface (GUI) to users of renovation system 205. Although the embodiment of the present invention shown in FIG. 2 illustrates renovation system 205, front end system 210, and databases 215 as separate functional modules, several (or all) modules may be combined as long as the functionality of each module still exists within the present invention as will be described below.

Data needed to perform all features of the present invention are either passed in via front end system 210, collected by renovation system 205, or derived by renovation system 205. Requests can be made by front end system 210 to renovation system 205 at any time as long as renovation system 205 has the data to process the request. Thus, the various functions provided by the present invention are not dependent on the source of the data.

Front end system 210 may also operate as a Web server. A Web server provides the GUI to users of renovation system 205 in the form of Web pages when access is made via Internet 220. As is well-known in the relevant art(s), a Web server is a server process running at a Web site which sends out Web pages in response to Hypertext Transfer Protocol (HTTP) requests from remote browsers. An optional firewall (not shown) serves as the connection and separation between front end system 210 and Internet 220. Generally speaking, a firewall—which is well-known in the relevant art(s)—is a dedicated gateway machine with special security precaution software. It is typically used, for example, to service Internet 220 connections and dial-in lines, and protects a cluster of more loosely administered machines hidden behind it from an external invasion.

Renovation system 205 is also connected to databases 215. Databases 215 stores collections of data required by renovation system 205. Both the functions of the engine of renovation system 205 and the data stored in databases 215 will be discussed in further detail below.

The global Internet 220 includes a plurality of external workstations that, not only allow users of Internet 220 to remotely access and use renovation system 205, but also allows renovation system 205 to access the external workstations. In essence, the present invention may use an external workstation to request data from both government agencies 225 and industry suppliers 230. Renovation system 205 and front end system 210 may request data relating to compliance regulations for water renovation activities, historical data relating to one or more reservoirs, etc., from government agencies 225. Renovation system 205 and front end system 210 may also request data relating to availability, pricing and description information regarding supplies and/or services required for water renovation and management from industry suppliers 230. It is important to note that the present invention is not limited to requesting data from government agencies 225 and industry suppliers 230. The present invention may also request data from any other entity that will facilitate the present invention in water renovation and management. Also note that the present invention may communicate with government agencies 225, industry suppliers 230, and so forth, via communication methods other than Internet 220 (via TCP/IP), including asynchronous dial up and asynchronous lease line. What is meant by asynchronous dial up, asynchronous lease line, and TCP/IP communication is explained next.

The term asynchronous is usually used to describe communications in which data can be transmitted intermittently rather than in a steady stream. For example, a telephone conversation is asynchronous because both parties can talk whenever they like. If the communication were synchronous, each party would be required to wait a specified interval before speaking. Asynchronous dial up refers to connecting a device to a network via a modem and a public telephone network. Asynchronous dial up access is really just like a phone connection, except that the parties at the two ends are computer devices rather than people. Because asynchronous dial up access uses normal telephone lines, the quality of the connection is not always good and data rates are limited.

An alternative way to connect two computers is through an asynchronous leased line, which is a permanent connection between two devices. Leased lines provide faster throughput and better quality connections, but they are also more expensive.

TCP/IP is an acronym for Transmission Control Protocol/Internet Protocol, the suite of communications protocols used to connect hosts on Internet 220. TCP/IP uses several protocols, the two main ones being TCP and IP.

TCP/IP is built into the UNIX operating system and is used by Internet 220, making it the de facto standard for transmitting data over networks. Even network operating systems that have their own protocols, such as Netware, also support TCP/IP.

Figure 3:
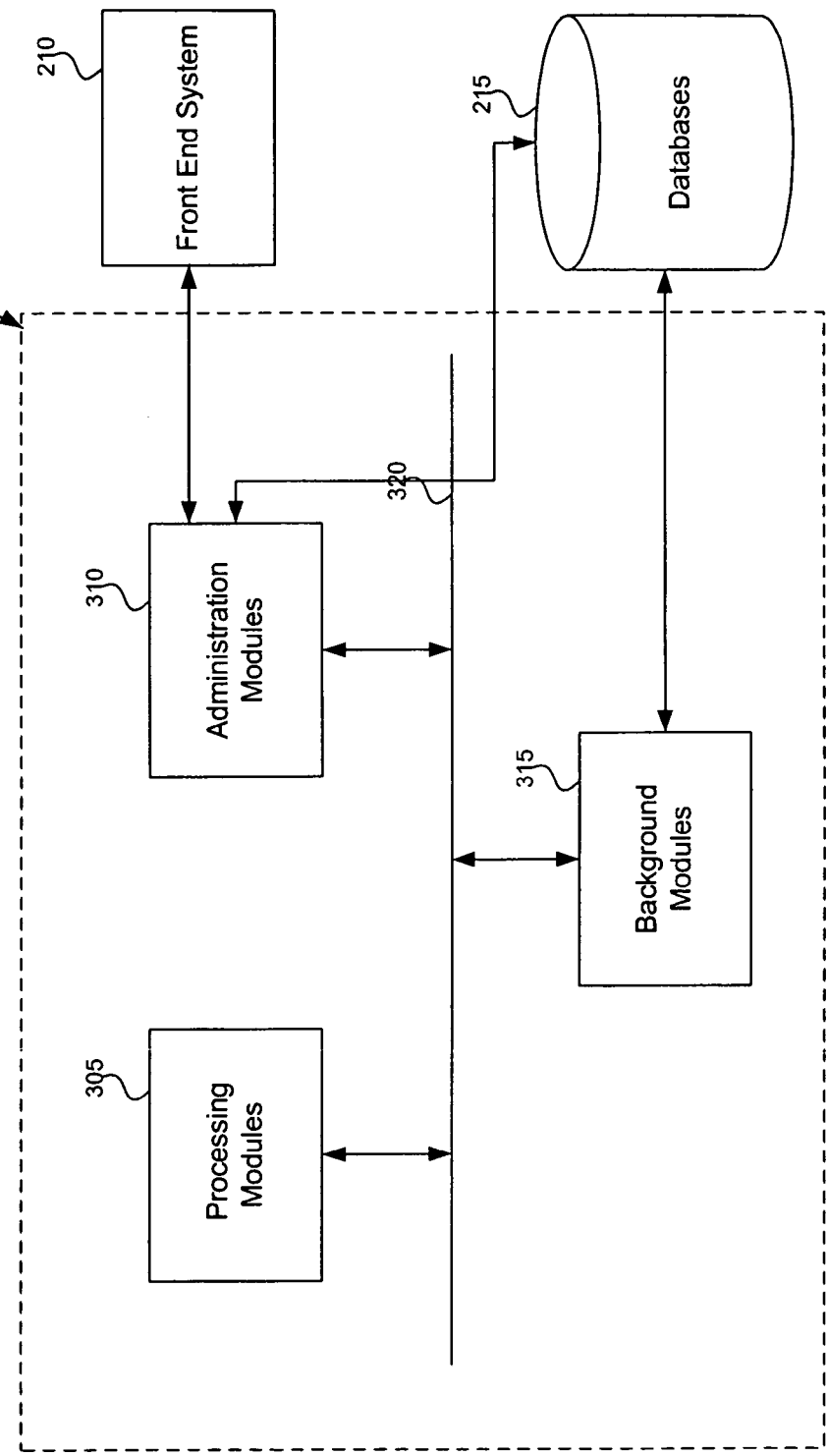
FIG. 3 is a block diagram of the functional modules of a renovation system according to an embodiment of the present invention.
Figure 4:
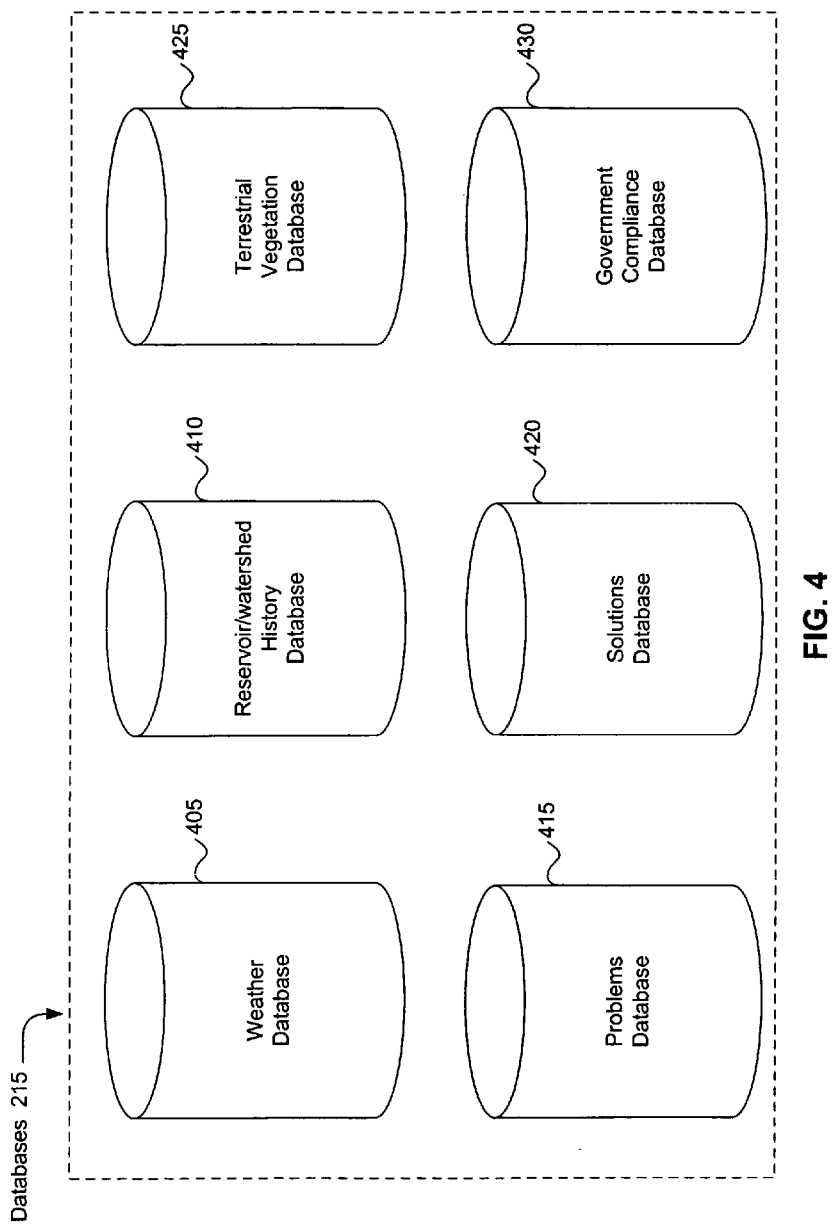
FIG. 4 is a high level view of the various databases utilized by the invention according to an embodiment of the present invention.

FIG. 3 is a block diagram of the functional modules of renovation system 205 preferably connected by a network according to an embodiment of the present invention. It should be understood that the particular renovation system 205 in FIG. 3 is shown for illustrative purposes only and does not limit the invention. Other implementations for performing the functions described herein will be apparent to persons skilled in the relevant art(s) based on the teachings contained herein, and the invention is directed to such other implementations. As will be apparent to one skilled in the relevant art(s), all of the modules "inside" of renovation system 205 are preferably connected and communicate via a communication medium such as a network 320.

The topology of network 320 as shown in FIG. 3 is called a bus topology. In general, the topology of a network is the geometric arrangement of functions (i.e., computers) within the system. Other common types of network topologies include star and ring topologies, etc. Although the present invention is illustrated in FIG. 3 as incorporating a bus topology, the present invention can equally be applied to other topologies.

Referring to FIG. 3, renovation system 205 includes processing modules 305, administration modules 310, and background modules 315. Each module of processing modules 305 can be operated independently of the other modules. Data needed by the present invention are either passed in via front end system 210, collected by renovation system 205, or derived by renovation system 205. Requests can be made by front end system 210 to renovation system 205 at any time as long as renovation system 205 has the data to process the request. Thus, the various functions provided by the present invention are not dependent on the source of the data. Connected to databases 215 are background modules 315 and administration modules 310. Administration modules 310 are also connected to front end system 210. These modules are described for illustrative purposes. The invention is not limited to these modules.

In an embodiment of the present invention, processing modules 305 contain five (5) modules. Each module performs a unique set of processing features. Such processing features include, among other features, obtaining and evaluating data for a reservoir and its watershed, determining observable and fundamental problems experienced by the reservoir based on the obtained/evaluated data, querying historical weather to determine weather-related causes of the determined problems, and querying future weather to determine short and long term solutions and/or management schemes to the determined problems. Additional processing features provided by processing modules 305 include querying historical terrestrial vegetation of the reservoir's surrounding vegetation to determine vegetation-related causes of the determined problems, and querying future terrestrial vegetation to determine short and long term solutions and/or management schemes to the determined problems.

Each processing module operates in conjunction with front end system 210 to form a complete automated water renovation and management solution. The individual modules of processing modules 305 will be described in detail below with reference to FIG. 22.

In an embodiment of the present invention, administration modules 310 contain three (3) modules. Each module performs a unique set of administrative features. Such administrative features include, among other features, an interface to front end system 210, an interface to databases 215, and direct access to the various modules of renovation system 205. The individual modules of administration modules 310 will be described in detail below with reference to FIG. 34.

In an embodiment of the present invention, background modules 315 contain three (3) modules. Each module performs a unique set of background features including, among other features, the evaluation of unique circumstances (including the cost and government compliance regulations for particular solutions), the calculation of mathematical formulas, the requests for data from databases 215, and the ability to accept data in various formats, parse the data, and save the data in appropriate tables in databases 215. The individual modules of background modules 315 will be described in detail below with reference to FIG. 20.

IV. Weather-Related Functionality of the Present Invention

The present invention utilizes certain weather conditions (i.e., parameters) that either directly or indirectly affect the functioning of reservoirs both over the long term and more immediately on a day to day basis (i.e., short term). Weather, particularly the solar radiation as it affects water temperature, water circulation, and plant growth and the precipitation as it affects movement of materials from land to water, is strongly correlated in some way with all of the reservoir problems that the present invention identifies. Weather will be explained throughout this application as it relates to reservoirs.

The present invention monitors many weather parameters, with a particular emphasis on seven (7) parameters. These parameters include temperature, precipitation, wind speed, solar radiation, cloud covering, cooling rate, and growing degree days. The present invention is not limited to these weather parameters. For example, the present invention also may measure the rate of evaporation, where evaporation is the process of converting a substance (such as water) from its liquid phase to its gaseous phase.

How each parameter affects the conditions and/or problems of reservoirs will be described throughout the application. Following is a brief explanation of each weather parameter and its unit of measure as it relates to the present invention. The present invention contemplates using other units of measure and it not limited to the units of measure described below.

A. Temperature

Temperature is the degree of hotness or coldness of the environment. The unit of measure used in the present invention for temperature is degrees Fahrenheit (° F.).

B. Precipitation

When cloud particles become too heavy to remain suspended in the air, they fall to the earth as precipitation. Precipitation occurs in a variety of forms including hail, rain, freezing rain, sleet, or snow. The unit of measure used in the present invention for precipitation is inches.

C. WindSpeed

Wind speed is the rate, in knots, at which the wind passes a given point.

Generally, the wind speed is determined by averaging the speed over a 2-minute period. Table 1 below gives a general description of the type of wind speed one would experience at a given knot. The unit of measure used in the present invention for wind speed is knots.

TABLE 1

Table A-1 Estimating Wind Speed

| Knots | Specifications |
|---|---|
| <1 | Calm: smoke rises vertically. |
| 1–3 | Direction of wind shown by smoke drift not by wind vanes. |
| 4–6 | Wind felt on face; leaves rustle; vanes moved by wind. |
| 7–10 | Leaves and small twigs in constant motion; wind extends light flag. |
| 11–16 | Raises dust, loose paper; small branches moved. |
| 17–21 | Small trees in leaf begin to sway; crested wavelets form on inland waters. |
| 22–27 | Large branches in motion; whistling heard in overhead wires; umbrellas used with difficulty. |
| 28–33 | Whole trees in motion; inconvenience felt walking against wind. |
| 34–40 | Breaks twigs off trees; impedes progress. |
| 41–47 | Slight structural damage occurs. |
| 48–55 | Trees uprooted; considerable damage occurs. |
| 56–71 | Widespread damage. |

D. Cloud Cover

Cloud cover is the percentage of the sky dome covered by clouds. Local geographical features, such as mountains, oceans, and large lakes, influence the formation of clouds. The unit of measure used in the present invention for cloud cover is percentage.

E. Solar Radiation

Solar radiation data provide information on how much of the sun's energy strikes a surface at a location on earth during a particular time period. The data give values of energy per unit of area. By showing naturally occurring changes in the amount of solar radiation over the course of days, months, and years, the data determine the amount of solar radiation of a location. Clouds are the predominant atmospheric condition that determines the amount of solar radiation that reaches the earth. The unit of measure used in the present invention for solar radiation is kilowatt-hours per square meter per day (kWh/sq m/day).

F. Cooling Rate

The rate of cooling of a heated object at any instant is proportional to the difference between the object's temperature and the environment. Thus, the object cools faster at first, while it is hot, and the rate of cooling slows down as the temperature of the object approaches the environment's temperature.

G. Growing Degree Days Growing degree days (GDD) are a daily accumulation of heat for crop growth. GDD are related to the number of days it takes for a particular type of crop to mature. Variations between locations, between seasons at a particular location, between planting times at a particular location and season, and between the requirements of different crops result in differences in GDD. For example, corn does not grow when temperatures are below 50° F., and temperatures above 86° F. do not increase plant growth rate.

The "days to maturity" for different types of vegetation (and for different hybrids of a particular type of vegetation) are closely related to their growing day degree requirements. For example, a type of vegetation requiring 2,450 GDD planted April 25 near David City, Nebraska, would be expected to mature in 121 days compared to 134 days for one requiring 2,700 GDD. The seasonal temperature of a region must be able to meet the growing degree days requirement of a vegetation or it will not be adapted.

The unit of measure used in the present invention for growing degree days is GDD. The formula for GDD is to add the daily high temperature (e.g., 86° F. maximum) and daily low temperature (e.g., 50° F. minimum); divide this figure by 2 and subtract 50. The remainder represents the heat units for one day: Thus, GDD=(86+50) 2–50=18 GDD.

Example Relationships Between Weather Parameters

Different types of weather parameters influence others. The amount of solar radiation reaching the earth's surface varies greatly because of changing atmospheric conditions and the changing position of the sun, both during the day and throughout the year. Clouds are the predominant atmospheric condition that determines the amount of solar radiation that reaches the earth. Consequently, regions of the nation with cloudy climates receive less solar radiation than the cloud-free desert climates of the southwestern United States for any given location, the solar radiation reaching the earth's surface decreases with increasing cloud cover.

Local geographical features, such as mountains, oceans, and large lakes, influence the formation of clouds, the amount of solar radiation received for these areas may be different from that received by adjacent land areas. For example, mountains may receive less solar radiation than adjacent foothills and plains located a short distance away. Winds blowing against mountains force some of the air to rise, and clouds form from the moisture in the air as it cools. Coastlines may also receive a different amount of solar radiation than areas further inland. Where the changes in geography are less pronounced, such as in the Great Plains, the amount of solar radiation varies less.

V. Terrestrial Vegetation-Related Functionality of the Present Invention

The terrestrial vegetation covering the land surrounding a reservoir is a particularly important characteristic controlling the influence that this land has on the reservoir receiving its drainage. The present invention utilizes certain metrics gathered by remote sensing techniques to determine both past and future terrestrial vegetation of the land surrounding reservoirs. These metrics include terrestrial greenness and vegetation phenologic metrics. Terrestrial greenness and vegetation phenologic metrics, as they relate to weather conditions (i.e., parameters), are indicators of reservoir conditions. Terrestrial greenness is a generic term used to describe the condition of vegetation as observed from earth observation satellites that look at earth objects in discrete portions of the light spectrum known as spectral bands (via remote sensing technologies.) Terrestrial vegetation will be explained throughout this application as it relates to reservoirs.

Certain information for the reservoir and its watershed is best gathered with the many new remote sensing technologies continually being developed. Some have now been providing information for more than a decade. Particularly the technologies employing the use of high elevation sensors from airplanes and satellites serve the important need for information gathered across large expanses of water and land. Quantifying the extent of aquatic weed growth following certain nutrient changes in the reservoir water or quantifying the extent of shallow zones developing due to siltation or more rapidly following water level manipulations can only be done with analyses of data gathered in such a broad scale manner. The watershed is generally ten (10) to one hundred (100) times or more larger than the area of the reservoir. Therefore, characterizing features of this land and other water bodies draining into the reservoir must be accomplished in part from an elevated vantage point. Key features of this land and upper water bodies can be first examined historically for characteristics most affected by human activities and changing weather conditions as the most likely candidates causing changes leading to problems.

Plant phenology refers to the climate-related growth and development stages of plants. Because the phenologies or growth calendars of various plants and assemblages of plants differ from each other, there are corresponding differences in temporal patterns of terrestrial greenness in the landscape. For example, winter wheat, which is planted in the fall, greens up briefly in late fall and the aboveground biomass then dies back over the winter months. In the spring it greens up early, ripens in May and June, and is harvested in late June or early July. Corn, on the other hand, is planted in April, greens up in May, reaches its peak in July, senescences in August, and is harvested in September. Because of these differences in temporal patterns, it is possible to use a time series of the normalized difference vegetation index (NDVI) (explained below) images over an entire year to separate wheat and corn, as well as other crops. Likewise, cool season grasses can be separated from warm season grasses, forested areas from grassland, and so on.

The present invention monitors many terrestrial greenness and vegetation phenologic metrics, as they relate to weather conditions, as indicators of reservoir conditions. There are many measures of satellite-derived terrestrial greenness, some consisting of a single band (e.g., the green band or the near-infrared band) and others consisting of ratios of bands. The most commonly used and accepted vegetation ratio is the normalized difference vegetation index (NDVI) which is an adjusted ratio of the near-infrared band and the red band. The following formula may be used to calculate NDVI:

$$NDVI = \frac{\text{near-infrared} - \text{red}}{\text{near-infrared} + \text{red}}$$

High values of NDVI indicate vigorously growing vegetation, while low values indicate areas of sparse vegetation or no vegetation at all. These values have been found to be strongly correlated to vegetation measurements such as biomass and leaf area index.

Time-series NDVI images can be harnessed to measure and evaluate the phenological progress of vegetation through a series of vegetation phenologic metrics (VPM). As the term implies, vegetation phenologic metrics are specific measurements of the development and condition over time based on satellite-derived vegetation values (i.e., NDVI).

In addition to the standard set of VPMs, it is possible to derive numerous additional measurements. For example, the mean onset of vegetation or the variation in the onset of vegetation (i.e., the standard deviation) for an area such as a watershed, county, or crop reporting district, can be calculated. Such derived measurements provide summary information over a defined spatial extent that may help in analyzing underlying ecosystem (or agro-ecosystem) processes. The set of key VPMs includes the following measurements shown below in Table 2.

TABLE 2

| Temporal Metrics | NDVI-Value Metrics | Derived Metrics |
| --- | --- | --- |
| 1. Time of onset of greenness | 1. Value of onset of greenness | 1. Accumulated NDVI |
| 2. Duration of greenness | 2. Value of end of greenness | 2. Rate of green up |
| | | 3. Rate of senescence |

TABLE 2-continued

| Temporal Metrics | NDVI-Value Metrics | Derived Metrics |
| --- | --- | --- |
| 3. Time of end of greenness | 3. Value of maximum NDVI | 4. Mean daily NDVI |
| 4. Time of maximum greenness | 4. Range of NDVI | |

Although the set of key VPMs will be described in more detail below, following is a general introduction to these measurements. Onset of greenness represents the beginning of photosynthetic activity. Time of end of greenness represents the end of photosynthetic activity. Duration of greenness represents the length of photo synthetic activity. Time of maximum greenness represents the time when photosynthesis is at its maximum.

Value of onset of greenness represents the level of photosynthesis at start. Value of maximum NDVI represents the level of photosynthesis at maximum. Range of NDVI represents the range of measurable photosynthesis. Accumulated NDVI represents the net primary production. Rate of green-up represents the acceleration of increasing photosynthetic activity. Rate of senescence represents the acceleration of decreasing photosynthetic activity. Mean daily NDVI represents the mean daily photosynthetic activity.

Although the present invention focuses of the above metrics, the present invention is not limited to these metrics. Temporal metrics, NDVI-value metrics, and derived metrics are stored in databases 215 of the present invention in temporal metric data 1405 (FIG. 15), NDVI-value metrics data 1410 (FIG. 16), and derived metrics data 1415 (FIG. 17), respectively. Terrestrial vegetation will be explained throughout this application as it relates to reservoirs.

VI. Examples of the Interaction Between Problems, Solutions, Weather, and Terrestrial Vegetation Prior to explaining the specifics of databases 215, a high level overview of some of the reservoir problems and solutions addressed by the present invention will aid in the understanding of databases 215. The high level overview will also aid in the understanding of the functionality of renovation system 215. Also, some examples of interaction between reservoir problems, solutions, and weather and terrestrial vegetation conditions will further aid in the understanding of the present invention. The current invention contemplates two types of problems within a reservoir and its watershed that could involve either management or renovation actions. These two types of problems are observable and fundamental problems. Fundamental problems typically exist prior to, and are the essence of, observable problems.

Generally, observable problems are detectable by one or more of the human senses. Examples of observable problems include, but are not limited to, declining sport fish availability, excessive plant growth, and taste and odor in drinking water. Observable problems are usually trigger by one or more fundamental problems.

Fundamental problems are typically not detectable by the human senses. Examples of fundamental problems include, but are not limited to, excess nutrients or soil entering the reservoir due to some disturbance in the watershed, and thermal stratification. All of the fundamental problems are caused to some degree by certain weather conditions and/or terrestrial vegetation of the vegetation surrounding the reservoir.

Thermal stratification is defined in the present invention as a functional problem. Thermal stratification naturally occurs with warmer weather as surface water is heated more rapidly than deeper water during the spring and early summer. This can rapidly form a warm and thus less dense surface layer a few meters deep in the reservoir that physically does not mix with the colder and thus more dense deeper water. Thermal stratification also creates other management problems as the deeper water declines in oxygen and increases in ammonia and hydrogen sulfide as the summer progresses producing very inhospitable conditions for sport fish and even leads to objectionable taste and odor problems. Objectionable taste and odor is defined as the present invention as an observable problem.

With thermal stratification, nutrients tend to build up in the deeper water due to settling of organic matter from above and the resulting increased decomposition that releases these nutrients. The deep nutrient-rich water often does not receive enough light for summer algae growth but is later mixed to the surface in the early fall when the entire reservoir water column becomes mixed again as it cools. This often causes another "burst" of microorganism growth in the fall at about the time when taste and odor problems are about to begin. Thermal stratification is weather related and in affect also produces shallow water zones intensifying certain plant problems.

Elevated nutrient levels are also required for this growth in the reservoir and such nutrient levels are most often produced by watershed runoff, thus by precipitation as another predictable weather condition. Sparse vegetation on the land in the watershed also increases nutrient levels and siltation (described below) in the reservoir. Dense vegetation helps to hold nutrients and silt instead of allowing them to enter the watershed runoff. With precipitation and sparse vegetation (indicated by terrestrial vegetation) comes runoff and the movement of silt and nutrients to the reservoir. Elevated nutrient levels are defined as a fundamental problem, and shallow water is defined as an observable problem by the present invention.

Although the relationships between VPMs and development of taste and odor problems are still being developed at this point, there are three general groups of hypotheses that can be formed. These hypotheses include early season vegetation, terrestrial vegetation condition as a surrogate for reservoir vegetation condition, and terrestrial biomass as a nutrient source.

Early season vegetation is first discussed. Inasmuch as chemical agricultural fertilizers are applied heavily in the spring, one contributor to aquatic vegetation growth and, consequently, taste and odor problems, might be heavy runoff of fertilizers into rivers and streams that feed reservoirs. Earlier than normal onset of crop vegetation in agricultural areas might mean that crops have begun to develop earlier than normal compared to grasses, trees, and shrubs that ordinarily serve as buffers to absorb fertilizer runoff. In such a scenario, more chemical fertilizers than normal might feed into aquatic systems. On the other hand, later than normal onset might indicate a situation where fields have been planted late but where fertilizers were applied prior to planting. This situation might also permit heavier than normal fertilizer runoff into streams, since there are no crop roots to take them up or hold them.

In both these situations, the indicator vegetation measures might simply be the date of onset of vegetation or the rate of greenup. Or, it may be a derived measure such as the standard deviation of date of onset or rate of greenup within a watershed.

In the scenario of terrestrial vegetation condition as a surrogate for reservoir vegetation condition, terrestrial and aquatic vegetation can be viewed as being independent from each other but responding to the same environmental inputs, primarily climatic in nature. Relevant climate conditions would be temperature patterns and related measures such as growing degree days. It is not necessary to establish causal links between terrestrial and aquatic vegetation, but to use measures of terrestrial vegetation as surrogates for aquatic vegetation development. Measures of terrestrial vegetation that might be expected to relate to high growth of aquatic vegetation might include high peak vegetation values, a prolonged duration of greenness, and high accumulated vegetation over a growing season.

The relationship of terrestrial biomass as a nutrient source is based on the fact that decomposing vegetation from the current year's growth becomes dissolved organic matter that enters the aquatic system and becomes a nutrient source for the following year's aquatic vegetation. Indicator vegetation values would be those that indicate a large crop of aboveground biomass, including total accumulated vegetation over the growing season, duration of greenness, and high peak vegetation.

The movement of silt causes siltation. Siltation is defined by the present invention as a fundamental problem. Shallower water levels created over time by siltation, or immediately by water level manipulation, can be related to weather and terrestrial vegetation. Shallower water produces warmer water because more of the entire water column or volume is exposed to high light conditions.

Excessive plant growth is defined by the present invention as an observable problem. Plant growth in reservoirs is driven by plant nutrients, particularly nitrogen and phosphorus, dissolved in the reservoir water. Eutrophication is the process of increases in nutrients and accompanying plant growth that occur in reservoirs either by natural processes or processes greatly influenced by human activities. Plant growth is also highly dependent upon available light that beneath the surface of the reservoir is controlled by the clarity of the water. The types of plant growth in reservoirs, thus the particular accompanying problems, are related to the clarity of the water along with the total amounts of nitrogen and phosphorus and the relative amounts of nitrogen verses phosphorus or the N:P ratio.

The present invention defines decreased water clarity as an observable problem. Water clarity is a function of the amount of suspended matter in the water, mostly silt and microscopic algae. Floating flowering plants and suspended algae prevail with reduced water clarity and elevated nutrient levels. With low amounts of nitrogen present relative to phosphorus (N:P ratios less than about 5:1) only a certain type of algae dominates, particular species of bluegreen algae which are able to fix or use atmospheric nitrogen. These algae in this way are like terrestrial legumes in being able to use a type of nitrogen that is naturally in high supply in water and air but other plants are unable to use it.

The bluegreen algae are the plants most often associated with the production of geosmin in a reservoir. Geosmin is a chemical released by certain microorganisms that imparts a "musty" taste and odor to the water which is difficult and costly to remove at the water treatment plant. The bluegreen algae plants either produce geosmin in their cells that is then released upon death and decomposition or the bacteria and fungi decomposing them produce the geosmin. These algae are also greatly favored by reduced water transparency because of their unique ability to be very buoyant from trapped gas produced by their own growth. They are a larger type of suspended microscopic algae not readily eaten by the animal food chain in the reservoir. Not being eaten leads to even greater accumulations of their biomass in late summer and fall in temperate climates. Such masses at the surface also cause recreation problems as this material accumulates along the shoreline.

With greater water clarity certain algae growing attached to bottom surfaces and certain rooted flowering plants dominate with elevated nutrient concentration in the water. In some reservoirs, particularly observed in the California, the water can be very transparent due to greatly reduced erosion but still have high nutrient levels due to fertilizer runoff and/or sewage contamination (human or livestock). Here the bottom algae, including some bluegreen algae, have also been associated with geosmin production. In the fall these surface or bottom algae naturally die and decompose rapidly leading to the common geosmin incidents in the late fall and early winter in many reservoirs. Large growths of flowering plants, rooted or floating, are less often associated with geosmin incidents either because they produce less in their bodies or less is produced with decomposition since their structure is much more coarse compared to algae and they decompose slowly. The problems caused by flowering plants are mostly physical ones including the disruption of habitat for fish growth and the disruption of the physical acts of fishing, swimming, and boating, even commercial navigation. Flowering plants are particularly a problem in low erosion areas and in the more southern temperate and tropical regions where these flowering plants do not naturally die back during the winter thus their biomass accumulates year after year.

Seeking solutions to the above problems begin with identifying the sources of these conditions within the reservoir itself. For example, in recent years it has been discovered that undesirable taste and odor conditions in reservoirs are most often due to the presence of the chemical geosmin present in the reservoir water before it reaches the water treatment plant. This problem as it exists today everywhere in the United States and abroad generally appears in the late summer and fall causing the greatest occurrence of public complaints to plant operators and to the local political establishment. Extreme treatment measures are often pursued at the water treatment plant and are usually inaffective at removing the geosmin.

Alternative water sources become the only solution but are often not available. Currently there is no evidence that geosmin in the concentrations found in reservoir water or in the distributed water is toxic either to wildlife or to humans. It does create a "musty" taste and odor at very low concentrations that is objectionable to the user who then typically assumes that there must really be any number of "dangerous" chemicals or organisms present thus the high incidents of ensuing complaints. Beginning with the production of geosmin in the reservoir and weather, warm and sunny spring, and early summer weather conditions stimulate the growth of aquatic plants, particularly the algae.

The thermal stratification of a reservoir may have to be managed due to the adverse affects noted above. Here, there is an attempt to physically break down the thermal layers. This is attempted either by pumping compressed air deep into the water column to cause mixing or by selectively drawing water out of a particular thermal layer for the normal outflow from the reservoir (called aeration). Certain volumes of continuous outflow from a reservoir are required by law to maintain flow in the stream below. Compressed air or other mechanical mixing systems are very expensive and must be set up well in advance to be quickly affective when conditions require such treatment. Selective discharge must also be initiated well in advance of the onset of the problems caused by stratification.

Thus, the accurate prediction of spring and summer temperature conditions and terrestrial vegetation would allow far more cost affective and successful management actions to be taken.

Controlling excessive plant growth in reservoirs is a necessary action for addressing most of the reservoir problems addressed by the present invention. Renovation and management actions to control these various types of plant-related problems involve particular actions specifically directed at controlling the type of associated plant. There are many situations where conventional methods are not working and there are opportunities for new more affective actions to be developed and implemented. The present invention takes certain weather and terrestrial vegetation conditions experienced by a reservoir into account that excessively stimulate the growth of these plants. Also, there are new actions to physically remove these plants or to restructure through dredging certain habitats in the reservoir that have changed due to siltation.

With continuing efforts to reduce soil erosion to preserve agricultural productivity and to reduce siltation rates in reservoirs, water clarity will increase in many reservoirs, yet excess nutrients still enter from other sources. Thus, controlling the inflow of nutrients has become even more important. New methods to remove nitrogen and phosphorus at their domestic and agricultural sources are considered by the present invention, such as using only certain types of fertilizer for crops and/or applying fertilizer that is time-sensitive to anticipated terrestrial greenness for the region. In fact, certain methods may be implemented to capture these nutrients along the way within the watershed drainage system before they reach the reservoir. Certain management practices in the smaller farm ponds and streams that nearly all agricultural runoff passes through can deposit these nutrients in contained sediments and vegetation for indefinite periods of time.

Also, as part of the adjacent land configuration accompanying dredging as discussed above, settling basins and wetlands, through which the runoff is directed to pass, can be constructed in new more affective ways. There are new ways to construct the former such that they are particularly affective at removing nutrients attached to the silt particles. The latter, being the most productive type of natural plant habitat, can be strategically located as part of the use of dredging spoils to intercept within the natural wetland plant growth much of the nutrient load heading towards the reservoir.

The process of mechanically shredding and promoting the natural decay of floating and rooted flowering plants are alternatives to using herbicide controls. Herbicide use in reservoirs, particularly in those used as water supplies, has declined in recent years with greater regulation over the use of such chemicals, with their increasing cost, and with little advance in improving their effectiveness. Mechanical means of control are now more often preferred. The recent design, construction, and use of the "Aquaplant Terminator" device is revolutionizing this action. This device, associated with the present invention, is a boat with special attachments that are mechanically able to shred floating or near surface flowering plants at a rate considerably faster than any other mechanical device on the market. Patents are pending for particular features of the construction of this device.

Another mechanical device being developed can be used while navigating the reservoir. This device passes large volumes of water with high concentrations of floating blue-green algae through specially designed chambers. These chambers are designed to critically alter cell structure and clumping followed by passing these plants back into the reservoir in a more harmless condition. Being microscopic, even though sometimes in floating masses, these plants cannot be killed by mechanical shredding and they cannot be harvested. However, it is possible to alter their structure and functioning so that less geosmin is ultimately released either directly upon their death or by the microorganisms decomposing them.

The present invention also addresses a way of effectively dealing with the problem of taste and odor before it reaches the water treatment plant. This begins with identifying the source of the production of geosmin in the reservoir or perhaps in the watershed. Conditions in the reservoir most closely related to the appearance of geosmin are conditions affecting certain types of plant growth described above. In terms of the physical structure of the reservoir basin, conditions include the expansion of shallow water zones overlying silt deposits, silt deposits periodically exposed to the atmosphere, high nutrient levels in shallow water, and a greater fraction of the total volume of reservoir water occupying increasingly shallower areas. These reservoir structural conditions are clearly related to siltation and basin filling invoking the management and renovations actions involving dredging. These structural basin conditions and the plant conditions are not often considered all together when developing management and renovation actions as we are doing in our work with taste and odor problems. Now such considerations will open the way to developing actions from several directions to reduce the concentrations of geosmin reaching the treatment plant by reducing the production in the basin. The geosmin that does reach the treatment plant is also being targeted in new ways by the present invention as described next.

Although the present invention focuses on the correction of water problems prior to reaching the treatment stage, it may be necessary to treat water to solve a problem. The reservoir condition that most often produces a problem that must be treated in the water received by a water treatment plant for domestic water supply is once again the high levels of the chemical geosmin and the accompanying objectionable taste and odor for the consumer. Currently, attempts to control this condition within the water treatment plant focus on its removal by chemical or biological means.

The financial costs for addressing geosmin problems either within the reservoir or within the treatment plant can be quite substantial as shown recently for reservoir water supply systems in Kansas. The City of Wichita has allocated five hundred thousand (500,000) dollars to control nutrient levels in their reservoir to reduce the production of geosmin by aquatic plant growth. The City of Emporia has installed an ozonation component for their treatment facility for removing geosmin at a cost of eight hundred and thirty thousand (830,000) dollars. The City of Lawrence, after having to shut down their treatment plant and use an alternative water source for nearly two months in the fall and winter of 1995–96, is now assessing the capital improvements needed after another high geosmin episode occurred in the fall and early winter of 1997–98. As discussed above this problem worldwide grows worse as reservoirs age and fill with silt. Objectionable taste and odor is registered by the consumer when geosmin concentrations rise above 5 nanograms (ng) per liter (nanogram=one billionth of a gram) in the water from the tap. Concentrations of geosmin above twenty (20) to fifty (50) ng/liter require complicated and costly treatment efforts that are ineffective at concentrations above 100 ng/liter. It is not uncommon to record concentrations of geosmin in reservoirs at above 200 ng/liter.

The longer-term declines in water levels due to siltation will ultimately have to be addressed by dredging as discussed in detail earlier. Whereas, short-term changes in water levels are used by reservoir managers to prepare for later spring and early summer flood control requirements, but this may exacerbate other problems already noted. There is great value in predicting well in advance the extent of the rainy period and thus an amount of water to be released. The specifics of databases 215 are described next.

VII. Databases of the Present Invention

In general, a database is a collection of information organized in such a way that a computer program can quickly select desired pieces of data. A database is similar to an electronic filing system. To access information from a database, you need a database management system (DBMS). This is a collection of programs that enables you to enter, modify, organize, and select data in a database.

Traditional databases are organized by tables, fields, records, and files. A field is a single piece of information; a record is one complete set of fields; a table is a collection of records; and a file is a collection of tables. For example, a telephone book is analogous to a file. It contains a list of records, each of which consists of three fields: name, address, and telephone number.

An alternative concept in database design is known as Hypertext. In a Hypertext database, any object, whether it be a piece of text, a picture, or a film, can be linked to any other object. Hypertext databases are particularly useful for organizing large amounts of disparate information, but they are not designed for numerical analysis.

The present invention may also be implemented using a standard database access method called Open DataBase Connectivity (ODBC). The goal of ODBC is to make it possible to access any data from any application, regardless of which DBMS is handling the data. ODBC manages this by inserting a middle layer, called a database driver, between an application and the DBMS. The purpose of this layer is to translate the application's data queries into commands that the DBMS understands. For this to work, both the application and the DBMS must be ODBC-compliant—that is, the application must be capable of issuing ODBC commands and the DBMS must be capable of responding to them.

With reference to FIG. 4, the various databases that comprise databases 215 are shown. Databases 215 comprise a weather database 405, a reservoir/watershed history database 410, a problems database 415, a solutions database 420, a terrestrial vegetation database 425, and a government compliance database 430. Each of these databases are described in detail below with reference to one or more exemplary tables. Each table contains multiple fields. Like names of fields represent the same type of data in different tables. It should be readily apparent to those skilled in the art that the databases are not limited to the described tables and their fields, but may include more or less tables and/or fields as required.

A. Weather Database The present invention makes use of weather data. The weather data include seasonal weather data (for example, the average temperature in June), historical weather data (for example, the temperature last June), and forecast weather data (for example, a prediction as to what the temperature will be next June). The seasonal weather data, for example, seasonal temperature, represent a narrow range of temperatures, which is implementation dependent, for a specific location and period. It is based upon the 40% of occurrences centered around the mean temperature during a 30 year period. The historical weather data preferably represent a library of historical weather data covering two to five years, although other time spans are alternatively possible and envisioned by the present invention. The forecast weather data represent weather predictions for preferably fifteen months, although other time spans are alternatively possible and envisioned by the present invention. Databases of seasonal weather data and historical weather data are available from many publicly and/or commercially available publications and services. The forecast weather data are commercially available from Strategic Weather Services of Wayne, Pa. Other forms of forecast weather data are available from other commercial sources, but these other forms cannot be used directly with the present invention. Instead, they must be modified so as to be consistent with the form and substance discussed herein.

Figure 5:
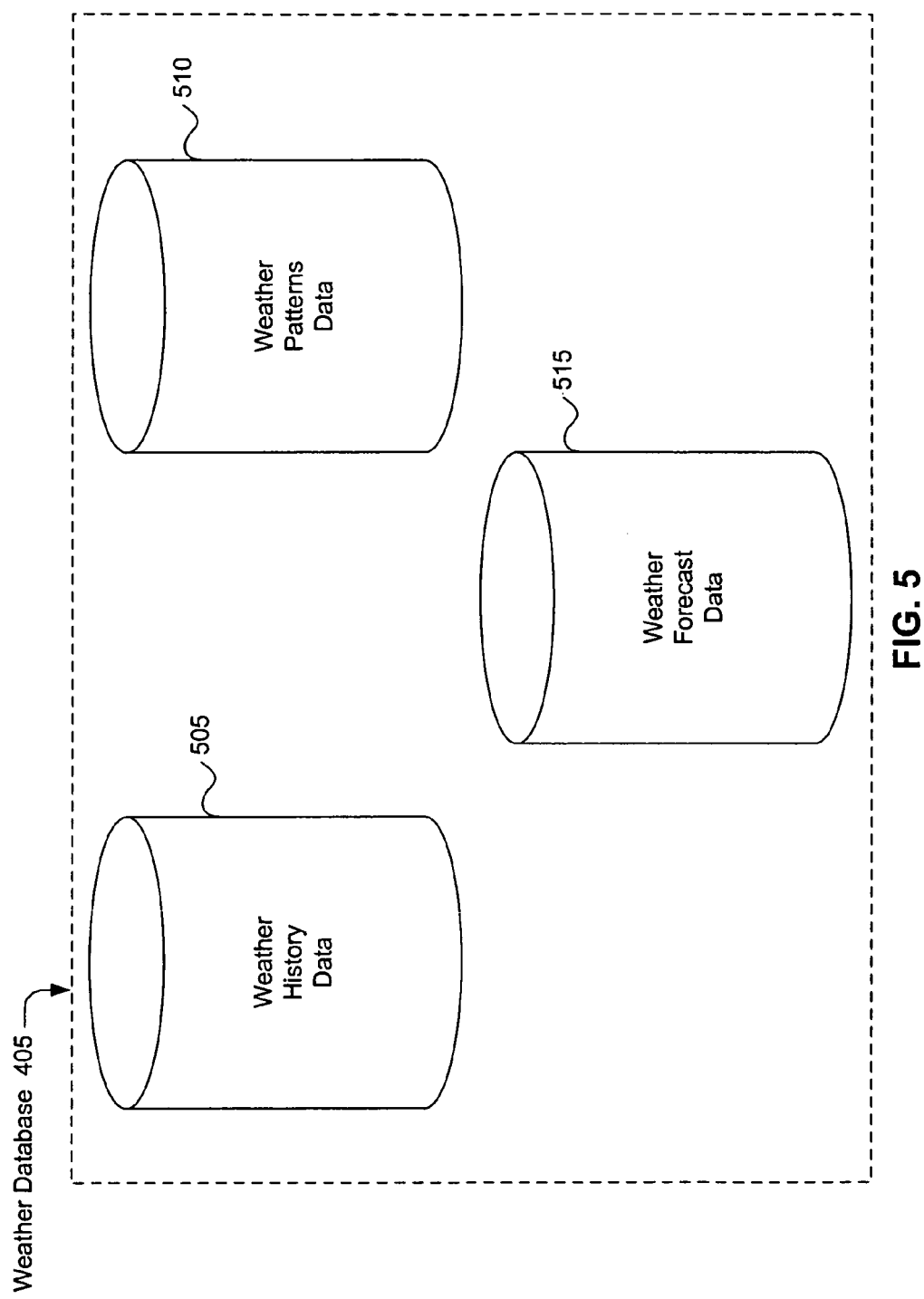
FIG. 5 is an exemplary weather database according to an embodiment of the present invention.

Weather database 405 comprises three types of data, as shown in FIG. 5. Referring to FIG. 5, weather database 405 comprises weather history data 505, weather patterns data 510, and weather forecast data 515. Weather database 405, along with weather history data 505, weather patterns data 510, and weather forecast data 515, is described in detail in U.S. Pat. No. 5,832,456, and incorporated herein by reference in its entirety. For completeness, however weather history data 505, weather patterns data 510, and weather forecast data 515 are briefly described herein.

1. Weather History Data

Exemplary weather history data 505 are shown with reference to FIGS. 6A, 6B, and 6C. History data 505 comprise a year field 605, a MA field 610, a data type field 615, and multiple period fields 620 including Period 1 through Period 6. Weather history data 505 include, for each year 605 in the view, one or more records for each MA 610 (metropolitan area). The term MA closely resembles the well known name Metropolitan Statistical Area (MSA). However MA preferably encompasses a larger surrounding geographical area/region than the strict MSA definition to include a particular reservoir and its watershed. However, the invention is not limited to this embodiment. Weather history data 505 contain, but is not limited to, data on metropolitan areas. The records in weather history data 505 contain information specifying the weather that occurred in the subject MA 610 in the time span represented in the view. Specifically, for each MA 610, there is a record for each of several weather data types 615 for each of several periods 620.

The historical weather information shown in weather history data 505 is provided on a per period basis. Periods 620 may be any increment of time, such as daily, weekly, bi-weekly, monthly, bimonthly, quarterly, etc. Preferably, the increment of time represented by a period is the same in both weather history data 505 and weather forecast data 515 within weather database 405.

In an embodiment of the present invention, there are three classes of weather data types 615 in weather history data 505—seasonal, actual, and category (also called weather pattern). A seasonal data type is the seasonal (or average) value of a weather parameter. Accordingly, the data type "temp.sea" is the average temperature; the data type "prec.sea" is the average precipitation; the data type "wind speed.sea" is the average wind speed; the data type "solar_radiation.sea" is the average rate of solar radiation; the data type "cloud_cover.sea" is the average percentage of cloud cover; the data type "cooling rate.sea" is the average rate of cooling; and the data type "growing degree days.sea" is the average number of growing days for a particular type of vegetation. Seasonal data types are shown in FIG. 6A. Referring to FIG. 6A, a record 622 shows that in 1997, the metropolitan area indicated by MA100 had a seasonal temperature of 46° F. in Period 1.

An actual data type is the actual value of a weather parameter. Accordingly, the data type "temp" is the actual temperature; the data type "prec" is the actual precipitation; the data type "wind_speed." is the actual wind speed; the data type "solar_radiation" is the actual rate of solar radiation; the data type "cloud_cover" is the actual percentage of cloud cover; the data type "cooling rate" is the actual rate of cooling; and the data type "growing degree days" is the actual number of growing days for a particular type of vegetation. Actual data types are shown in FIG. 6B. Referring to FIG. 6B, a record 623 shows that in 1997, the metropolitan area indicated by MA100 had an actual temperature of 49° F. in Period 1.

A category data type reflects a weather parameter's actual versus seasonal values. Accordingly, the data type "temp.cat" reflects actual temperature versus seasonal temperature; the data type "prec.cat" reflects actual precipitation versus seasonal precipitation; the data type "wind_speed.cat"reflects actual wind speed versus seasonal wind speed; the data type "solar_radiation.cat" reflects actual rate of solar radiation versus seasonal rate of solar radiation; the data type "cloud_cover.cat" reflects actual percentage of cloud cover versus seasonal percentage of cloud coverage; the data type "cooling_rate.cat" reflects actual rate of cooling versus seasonal rate of cooling; and the data type "growing degree days.cat" reflects the actual number of growing days versus seasonal number of growing days for a particular type of vegetation. The following Table 3 shows what the values of a category data type reflect.

TABLE 3

| | |
|---|---|
| Below Seasonal | −1 |
| Seasonal | 0 |
| Above Seasonal | 1 |

Referring to Table 3, if a category data type is equal to 1, then the actual value was greater than the seasonal value. If a category data type is equal to 0, then the actual value was equal to (or substantially corresponded to) the seasonal value. If a category data type is equal to −1, then the actual value was less than the seasonal value. Of course, values other than 1, 0, and −1 could be alternatively used to indicate these relationships. Also, other weather data types may be used. Category data types are shown in FIG. 6C. Referring to FIG. 6C, a record 625 shows that in 1997, the metropolitan area indicated by MA100 had an actual temperature that was greater than the seasonal temperature for Period 1.

2. Weather Patterns Data

Figure 7A:
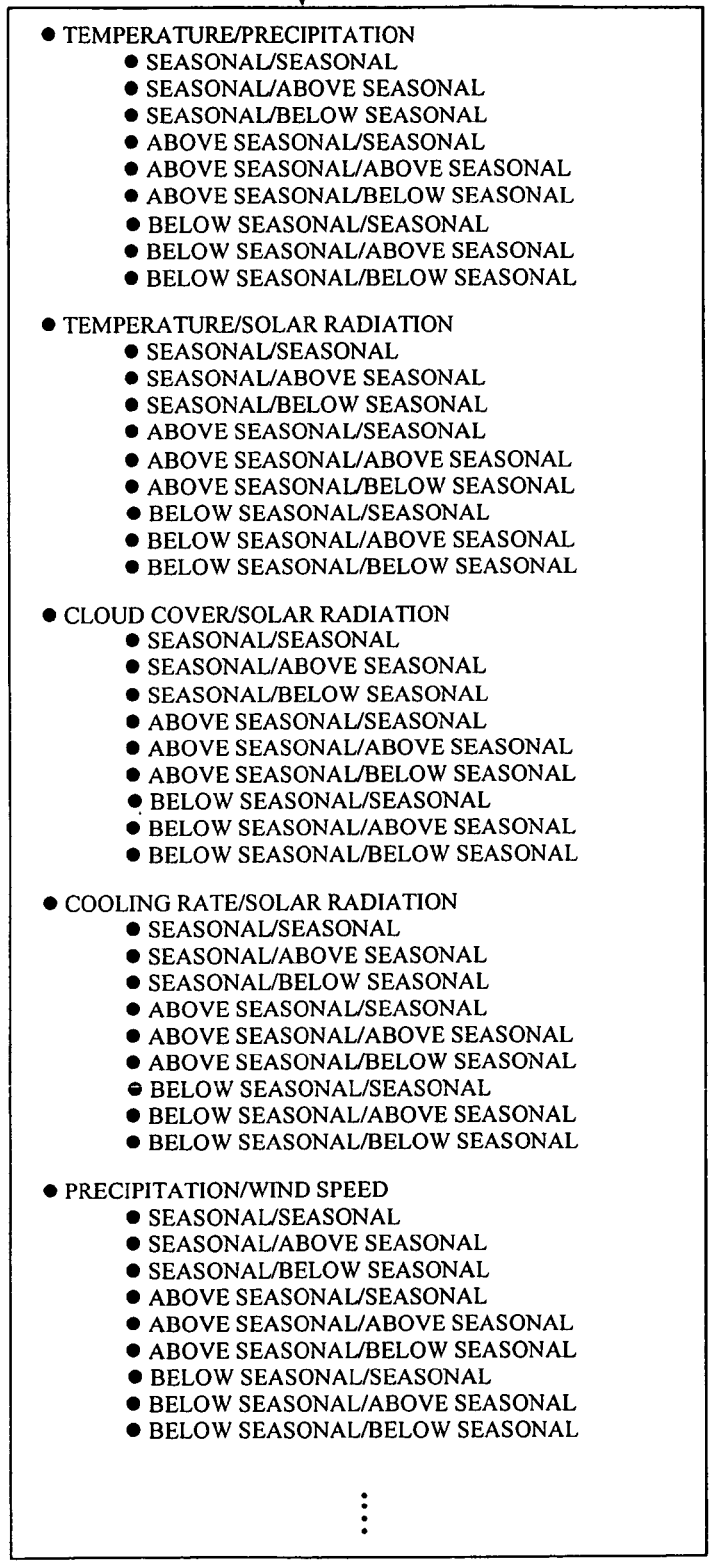

Exemplary weather patterns data 510 are shown with reference to FIGS. 7A and 7B. Each weather pattern includes one or more weather parameters. The present invention makes use of a number of different weather patterns to characterize the weather that occurred during any given past period, or that is predicted to occur during any given future period. Preferred weather patterns are presented in FIGS. 7A and 7B. As indicated in FIGS. 7A and 7B, exemplary weather patterns employed by the present invention include temperature/precipitation, temperature/solar radiation, cloud cover/solar radiation, etc., sustained weather, temperature/precipitation lag 1 period, and temperature/snow lag 1 period. The present invention is not limited to these weather patterns. For example patterns also include temperature/precipitation/wind speed combinations.

Referring to FIG. 7A, the temperature/precipitation, temperature/solar radiation, etc., weather patterns are now explained. Each weather pattern includes one or more weather parameters. For example, the temperature/precipitation weather pattern includes the temperature parameter and the precipitation parameter. For any given period, each parameter can be either seasonal, below seasonal, or above seasonal (except the sustained weather pattern, described below). For any given period, the values of these weather patterns are represented by the entries in weather history data 505 (FIG. 6C) having the category data type. For example, in 1997, the weather pattern in MA100 during Period 1 was temperature above seasonal/precipitation above seasonal (see records 625 and 630 in FIG. 6C). This weather pattern is abbreviated by T1P1. This file is used as the "look up" to allow renovation system 205 to determine which patterns it will use. Consider, for example, records 625–633 in weather history data 505 shown in FIG. 6C. In Period 1, the weather pattern T1P1 occurred in both 1997 and 1998.

As explained above, one type of weather parameter may influence others. For example, clouds are the predominant atmospheric condition that determines the amount of solar radiation that reaches the earth. Therefore, it is likely that if cloud coverage is below seasonal then solar radiation is likely to be above seasonal for a particular year 605, MA 610, and period 620.

Referring to FIG. 7B, the sustained weather pattern represents contiguous weeks (or other periods) of similar weather, for example having "temperature sustained two weeks" as a pattern. The "temperature seasonal/precipitation seasonal lag 1 period" pattern represents the occurrence of "temperature seasonal/precipitation seasonal" in the previous week.

3. Weather Forecast Data

Exemplary weather forecast data 515 are shown with reference to FIGS. 8A and 8B. Forecast data 515 comprise year field 605, MA field 610, data type field 615, and multiple period fields 620 including Period 1 through Period 6. As indicated by like numbering, these fields contain the same type of data as the fields described with reference to history data 505 (FIGS. 6A–6C).

Weather forecast data 515 include, for each future year 605 in the view, one or more records for each MA 610. These records contain information specifying the weather that is predicted to occur in the subject MA 610 in the future time span represented in the view. Specifically, for each MA 610, there is a record for each of several weather data types 615.

There are also three classes of weather data types 615, as in weather history data 505, including seasonal, actual, and category. These classes are the same as those described above with respect to weather history data 505. Accordingly, the description above of weather history data 505 also applies to the weather forecast data 515. Referring to FIG. 8A, a record 805 shows that in the 1999 (where N=1998), the metropolitan area indicated by MA100 is predicted to have a temperature of 47° F. for Period 1.

Relationship Between Past and Future Data

As evident by the description above, weather history data 505 represent past data because they contain historical information. In contrast, weather forecast data 515 present future data because they contain information pertaining to predicted weather in the future.

Both databases contain information on a per period basis (see periods 620). Preferably, the increment of time represented by the period is the same for both data. Also, the periods in both data are synchronized. Suppose that the increment of time is set equal to one month. In this example, if it is assumed that Period 1 represents January, then in weather history data 505, Period 1 represents January of a past year. Similarly, in weather forecast data 106, Period 1 will represent January of a future year.

Time Periods

As discussed above, data may be stored in weather history data 505 using any time increment or period, including but not limited to daily, weekly, monthly, quarterly, etc. Similarly, weather forecast information for each location may be stored in weather forecast data 515 on a daily basis, a weekly basis, a monthly basis, or a quarterly basis. Preferably, the time increment/period is the same for both data 505 and 515.

B. Reservoir/Watershed History Database

The history of any ecosystem continually affects its current functioning. More specifically, the history provides important clues to help to identify renovation and/or management strategies of particular problems in the present and future of a reservoir and its watershed. The present invention determines the history of reservoir construction and subsequent development as well as the natural history and the history of human activities within the watershed. This determination requires being able to identify the different external sources of information for the various components of such a history. These external sources include a number of state and federal agencies or offices (government agencies 225) responsible for gathering and storing such information.

There is also important information concerning the early natural terrain (e.g., vegetation) of the land before settlement in various types of public records. These public records may include old survey records going back to the original settling of the land by Europeans during the past three centuries. For example, it is important to know the extent to which the current vegetation covering a watershed is not native to the region and thus not as well adapted to the climate and other conditions of the region. This provides important information about the natural stability of a reservoir and its watershed in terms of how easily it can become disturbed. How easily it can become disturbed may cause particular problems to be considered for renovation and management. The way in which the present invention collects and parses the data that are stored in reservoir/watershed history database 410, and in databases 215 in general, will be described in detail below with reference to FIGS. 20 and 21.

Exemplary reservoir/watershed history database 410 is shown with reference to FIG. 9. History database 410 comprises year field 605, a reservoir field 905, MA field 610, a description of watershed field 910, a recorded problems field 915, an attempted solutions field 920, a number of people served field 925, a size in acres of water supply versus total size field 930, an ownership type field 935, and a uses field 940. Description of watershed field 910 further comprises a terrain field 945 and an aquatic systems field 950. Terrain field 945 further comprises fields that indicate the percentage of each type of terrain that make up the watershed of reservoir 905. The fields of different terrain types include a grassland field 955, a cropland field 960, a forest field 965, a residential field 970, an industry field 975, and an other field 980. Aquatic systems field 950 further comprises fields that indicate the percentage of each type of aquatic system that makes up the watershed of reservoir 905.

The fields of different types of aquatic systems include a ponds field 985, a wetlands field 987, a streams/rivers field 989, and an other field 990.

Recorded problems field 915 and attempted solutions field 920 each further comprise periods field 620 (FIG. 6). Uses field 940 further comprises fields that indicate the percentage of the type of uses for the subject reservoir. The fields include a drinking water field 994, a flood control field 995, an irrigation field 996, a recreation field 997, a power plant cooling field 998, and an other field 999. An explanation of data contained in each field in history database 410 will be described next.

Data in reservoir field 905 represent a unique reservoir code for each reservoir in history database 410. For example, reservoir 105 (FIG. 1) is represented by a unique reservoir 905 code in history database 410 if data have been collected for reservoir 105.

Data in description of watershed field 910 represent data, for a particular reservoir 905, describing the history and human activities of its watershed for year 605. The present invention determines the history of reservoir construction and subsequent development as well as the natural history and the history of human activities within the watershed by comparing data in fields terrain 945 and aquatic systems 950 for multiple years 605.

Data in terrain field 945 describe the particular makeup of the surrounding land of reservoir 905's watershed for year 605. A higher percentage of cropland and industry in a watershed may indicate more human activities affecting the water in the reservoir. The present invention determines the history, or change, in the watershed terrain 945 of reservoir 905 by comparing different years 605. For example, referring to records 991 and 993 in FIG. 9, reservoir "R1" had a change in its terrain from 1997 to 1998. Specifically, the percentage of grassland decreased from 58% in 1997 to 40% in 1998. In addition, the percentage of cropland increased from 30% in 1997 to 48% in 1998.

Data in aquatic systems field 950 describe the particular makeup of the aquatic systems of reservoir 905's watershed for year 605. The present invention determines the history, or change, in the watershed aquatic systems 950 of reservoir 905 by comparing different years 605. For example, referring again to records 991 and 993, reservoir "R1" had a change in its aquatic systems from 1997 to 1998. Specifically, the percentage of wetlands increased from 35% in 1997 to 45% in 1998. In addition, the percentage of streams/rivers decreased from 35% in 1997 to 25% in 1998.

Data in recorded problems field 915 indicate which problems existed for reservoir 905 in year 605 during periods 620. These problems typically result in poor water quality and/or quantity in a reservoir. The present invention determines the history, or change, in recorded problems 915 for reservoir 905 by comparing different years 605. The types of problems will be discussed in detail below with reference to FIGS. 10, 11, and 12.

Data in attempted solutions field 920 indicate which solutions were attempted to solve recorded problems 915 for reservoir 905 in year 605 during periods 620. These solutions typically involve implementing steps to improve poor water quality and/or quantity in a reservoir. The present invention determines the history, or change, in attempted solutions 920 for reservoir 905 by comparing different years 605. The types of solutions will be discussed in detail below with reference to FIG. 13. In addition, the types of solutions that may solve a particular problem will be discussed below in reference to FIG. 12.

Data in number of people served field 925 indicate the number of consumers (i.e., customers) served by reservoir 905 in year 605. Number of people served 925 is used by the present invention for multiple reasons. Some of these reasons include providing an indication of how many people will be affected by poor water quality and/or quantity, providing an indication of how spread out the cost of a potential solution will be, and so forth. Referring to record 991 in FIG. 9, reservoir R1 serves 5,000 people.

Data in size in acres of water supply versus total size field 930 represent the water supply of reservoir 905 during year 605 that was available to supply water to consumers versus the original size of reservoir 905. The current water supply size is always less than or equal to the original size of reservoir 905. The available water supply typically reduces as reservoir 905 gets older due to various problems. These problems include siltation, drought conditions, thermal stratification, incorrect water adjustment levels for flood control, and so forth. Referring to record 991 in FIG. 9, reservoir R1's total size was 9,400 acres in year 1997 versus a water supply size of 8,800 acres.

Data in ownership type field 935 indicate who owns reservoir 905. Different types of ownership include federal, state, district, municipal/city, and private. Federal reservoirs are typically operated by either the United States Army Corps of Engineers, the Bureau of Reclamation, Tennessee Valley Authority, Forest Service, National Park Service, Fish and Wildlife Service, or Bureau of Land Management. Ownership type 935 of reservoir 905 is important because it determines who has direct and/or indirect jurisdiction over certain aspects of reservoir 905. Data in ownership type field 935 can be either "F" for federal, "S" for state, "D" for district, "M" for municipal/city, or "P" for private. Referring to record 991 in FIG. 9, reservoir R1 was federally owned in 1997.

Data in uses field 940 describe the particular uses of reservoir 905 for year 605. In general, federal reservoirs that are operated by the United States Army Corps of Engineers are typically used for flood control and drinking water. Federal reservoirs that are operated by the United States Bureau of Reclamations are typically used for irrigation and drinking water. State reservoirs are primarily used for recreation and drinking water. District reservoirs are used for flood control and drinking water. Municipal and city reservoirs mostly serve drinking water needs. Finally, private reservoirs are generally used for recreation, irrigation, and power plant cooling. Referring to record 991 in FIG. 9, reservoir R1 was used in 1997 for 50% drinking water, 25% flood control, and 25% irrigation.

The present invention determines the history, or change, in the uses of reservoir 905 by comparing two or more years 605. For example, referring to records 991 and 993, reservoir "R1" had a change in uses from 1997 to 1998. Specifically, drinking water use for R1 decreased from 50% in 1997 to 40% in 1998. This may be an indication of the decrease in water quality so that less water was available for drinking water. In addition, recreation use for R1 increased from 0% in 1997 to 10% in 1998.

While year 605 and reservoir 905 allow the present invention to historically compare recorded problems 915, attempted solutions 920, and so forth, MA 610 allows the present invention to historically compare weather experienced by reservoir in year 605 by using MA 610 as a key to weather history data 505 (FIGS. 6A, 6B, and 6C). This allows the present invention to compare specific weather conditions (i.e., parameters) with recorded problems 915 over periods 620 (FIG. 6) to understand the affects of weather on the resulting problems. It also allows the present invention to review how attempted solutions 920 to particular recorded problems 915 may have been hindered or helped by particular weather conditions.

MA 610 also allows the present invention to historically compare terrestrial vegetation experienced by reservoir in year 605 by using MA 610 as a key to terrestrial vegetation database 425 (see FIGS. 15, 16, and 17). This allows the present invention to compare specific terrestrial vegetation metrics with recorded problems 915 over periods 620 (FIG. 6) to understand the affects of terrestrial vegetation on the resulting problems. It also allows the present invention to review how attempted solutions 920 to particular recorded problems 915 may have been hindered or helped by particular terrestrial vegetation metrics.

One can expect to see more dramatic changes in terrain 945, aquatic systems 950, recorded problems 915, attempted solutions 920, and uses 940 as compared years 605 move further apart in time.

C. Problems Database

Figure 10:
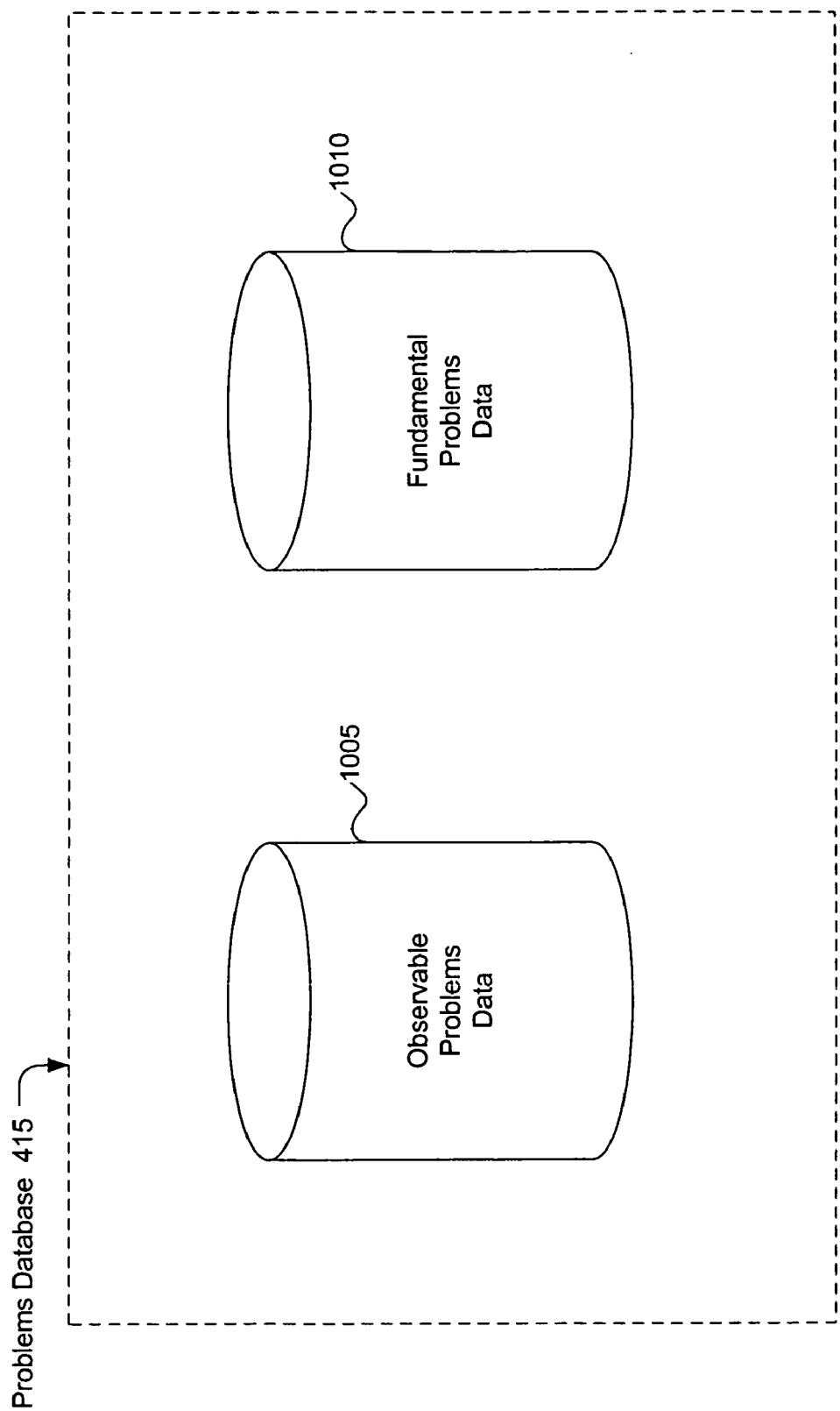
FIG. 10 is a diagram illustrating two types of data comprised by the problem database according to an embodiment of the present invention.

The current invention contemplates two types of interrelated problems within a reservoir and its watershed that could involve either management or renovation actions. These two types of problems are observable and fundamental problems. Accordingly, problems database 415 comprises two types of data, as shown in FIG. 10. Referring to FIG. 10, problems database 415 comprises observable problems data 1005 and fundamental problems data 1010. Although the present invention defines each of these problems separately, it is important to note that there is a great deal of overlap between them.

Generally, observable problems are detected by one or more of the human senses before any fundamental problems are detected in the reservoir. Yet, fundamental problems typically exist prior to, and are the essence of, observable problems. Examples of observable problems include, but are not limited to, declining sport fish availability, excessive plant growth, and taste and odor in drinking water. These observable problems and their relationship to fundamental problems are described below with reference to FIG. 11.

Fundamental problems are typically not detectable by the human senses. Examples of fundamental problems include, but are not limited to, excess nutrients or soil entering the reservoir due to some disturbance in the watershed, and thermal stratification. All of the fundamental problems are caused to some degree by certain weather conditions and compounded by certain terrestrial vegetation conditions. These fundamental problems and their relationship to certain weather and/or terrestrial vegetation conditions are described below with reference to FIG. 12.

1. Observable Problems Data

Exemplary observable problems data 1005 are shown with reference to FIG. 11. Observable problems data 1005 comprise an observable problem field 1105, a description field 1110, and a related fundamental/observable problems field 1115. An explanation of data contained in each field in observable problems data 1005 will be described next.

Data in observable problem field 1105 represent a unique observable problem code for each problem in problems data 1005.

Data in description field 1110 are a description of observable problem 1105. For example, referring to record 1120, observable problem OP1 is described as "objectionable taste and odor conditions." Other observable problems shown in FIG. 11 include declining wildlife (OP2), shallow water (OP3), decreased water clarity (OP4), decreased water flow (OP5), and excessive plant growth (OP6). It is important to note that the present invention is not limited to the observable problems listed in FIG. 11.

Data in related fundamental/observable problems field 1115 represent a list of both observable and fundamental problems that potentially may be related to observable problem 1105. Referring again to record 1120, objectionable taste and odor conditions (OP1) may be related to at least two observable problems and three fundamental problems. The observable problems include shallow water (OP3) and excessive plant growth (OP6). The fundamental problems include elevated chemical levels (FP2), siltation (FP3), and thermal stratification (FP4), as shown in FIGS. 11 and 12.

It is important to note that for a particular reservoir 905 experiencing a particular observable problem 1105, one or more of related fundamental/observable problems 1115 may not apply to reservoir 905. In essence, related fundamental/observable problems 1115 are a generic list of potentially related problems that the present invention should consider when analyzing a particular reservoir 905. Based on the specifics of reservoir 905, the present invention determines which particular problems listed in related fundamental/observable problems 1115 actually applies to reservoir 905.

2. Fundamental Problems Data

Exemplary fundamental problems data 1010 are shown with reference to FIG. 12. Fundamental problems data 1010 comprise a fundamental problem field 1205, a description field 1210, a related weather causes field 1215, a related terrestrial vegetation causes field 1217, and a possible solutions field 1220. Possible solutions field 1220 is organized in such a way that a check mark is placed under every solution that potentially may, if implemented, correct fundamental problem 1205. Each of these solutions (S1–S11) are described below with reference to solutions database 420 (FIG. 13).

Data in fundamental problem field 1205 represent a unique fundamental problem code for each problem in problems data 1010.

Data in description field 1210 are a description of fundamental problem 1205. For example, referring to record 1225, fundamental problem FP1 is described as "elevated plant nutrient levels." Other fundamental problems shown in FIG. 12 include elevated chemical levels (e.g., geosmin) (FP2), siltation (FP3), and thermal stratification (FP4). It is important to note that the present invention is not limited to the fundamental problems listed in FIG. 12.

Data in related weather causes field 1215 represent a list of weather conditions that may contribute to the cause of fundamental problem 1205. Referring again to record 1225, the weather conditions that may elevate plant nutrient levels (FP1) include high precipitation such that it causes excessive watershed runoff; high temperatures; and high solar radiation and/or reduced cloud coverage such that water temperature is increased, water circulation is decreased, and plant growth is increased in reservoir 905.

Data in related terrestrial vegetation causes field 1217 represent a list of vegetation conditions that may contribute to the cause of fundamental problem 1205. Referring to record 1225, the terrestrial vegetation conditions that may elevate plant nutrient levels (FP1) include early and late season greenness. Early season greenness, where chemical agricultural fertilizers are applied heavily in the spring, may mean earlier than normal onset of vegetation in agricultural. The result is that crops have begun to develop earlier than normal compared to grasses, trees, and shrubs that ordinarily serve as buffers to absorb fertilizer runoff. Alternatively, later than normal onset (late season greenness) might indicate a situation where fields have been planted late but where fertilizers were applied prior to planting. This situation might also permit heavier than normal fertilizer runoff into streams, since there are no crop roots to take them up or hold them.

Data in possible solutions field 1220 represent a list of solutions that the present invention considers in making recommendations for particular fundamental problems 1205 of reservoir 905. It is important to note that for a particular reservoir 905 one or more of possible solutions 1220 may not be affective, or even possible, to solve a particular fundamental problem. In FIG. 12, possible solutions 1220 is a list of generic solutions that the present invention should consider to solve fundamental problem 1205. Whether or not a particular solution is possible for reservoir 905 depends on factors that are unique to reservoir 905. Some of these factors include the makeup of terrain 945, makeup of aquatic systems 950, attempted solutions 920, number of people served 925, ownership type 935, uses 940, and so forth (FIG. 9). The present invention considers the unique factors of reservoir 905 when determining the renovation and management strategies for reservoir 905. Referring again to record 1225, the present invention may suggest to adjust the water level of the reservoir (S1) and/or to perform aeration on the reservoir water (S3).

D. Solutions Database

Exemplary solutions database 420 is shown with reference to FIG. 13. Solutions database 420 comprises a type of solution field 1305, a solution field 1310, a description field 1315, a term field 1320, an economic impact field 1325, a political impact field 1330, and an environmental impact field 1335. An explanation of data contained in each field in solutions database 420 will be described next.

Data in type of solution field 1305 represent whether solution 1310 is physical, chemical, or biological in nature.

Data in solution field 1310 represent a unique solution code for each solution in solutions database 420.

Data in description field 1315 are a description of solution 1310. For example, referring to record 1340, solution S1 is described as "adjust water level." Other physical solutions shown in FIG. 13 include cut weeds (S2), dredge (S3), aeration (S4), alter adjacent land use (S5), disinfect water (S6), filter water (S7), apply different types of fertilizer to crops(S8), and apply fertilizer to crops at time sensitive times relating to anticipated terrestrial greenness (S9). An exemplary chemical solution is to introduce herbicides into the water (S10). An exemplary biological solution is to introduce fish into the water (S11). Altering adjacent land use includes, but is not limited to, changing the types of crops grown around the reservoir, creating wetlands and/or ponds that previously did not exist, and so forth. It is important to note that the present invention is not limited to the solutions listed in FIG. 13.

Data in term field 1320 represent whether solution 1310 is a short term or long term solution. Generally, a short term solution is more easily implemented and costs less, yet may have to be repeated more often to control a particular problem. Alternatively, long term solutions take more time to implement and generally cost more. Yet, they often do not have to be repeated as often as short term solutions to control a particular problem.

Data in economic impact field 1325 represent whether the amount of resources required to implement solution 1310 is typically of a "high," "medium," or "low" nature. It is important to note that economic impact 1325 only represents the typical nature of solution 1310. The present invention considers factors unique to reservoir 905 in determining the cost of each solution 1310 for that reservoir. An example of such a factor is whether a permit is required from one or more government entities to implement a solution. The more permits that are required for solution 1310, the more costly the solution generally becomes. Thus, the same solution may be more costly for one reservoir than another, depending on the permits each is required to obtain to implement the solution. Permits required for the above solutions are described below in reference to government compliance database 430 (FIG. 19). Other variables that affect economic impact 1325 include cost of materials, how labor intensive the solution is, size of the reservoir, and so forth.

Data in political impact field 1330 represent whether the implementation of solution 1310 typically creates a "high," "medium," or "low" negative political impact. As with economic impact 1325, political impact 1330 only represents the typical nature of solution 1310. Again, the present invention considers factors unique to reservoir 905 in determining the political impact of each solution 1310 for that reservoir. The amount of political impact may be affected by both economic and environmental considerations. For example, if a water company that supplies water to consumers decide to invest in an expensive solution and thus raise water bills considerably, the consumers may develop ill feelings toward the water company. Consumers may be resistant in paying higher bills or cut back in the amount of water consumed. Another example is a solution that has high negative environmental consequences. Here, this solution is likely to generate both community and governmental resistance. Thus, a reservoir that is privately owned may not have the connections or resources to implement a solution.

Data in environmental impact field 1335 represent whether the implementation of solution 1310 typically creates a "high," "medium," or "low" negative environmental impact to the surrounding area. As with economic impact 1325 and political impact 1330, environmental impact field 1335 only represents the typical nature of solution 1310. Again, the present invention considers factors unique to reservoir 905 in determining the environmental impact of each solution 1310 for that reservoir. For example, to introduce herbicides into a water supply may kill the wildlife that depends on the water for survival. A reservoir that is owned by the federal government is more likely to be able to implement such a solution than a privately owned reservoir.

E. Terrestrial Vegetation Database

Figure 14:
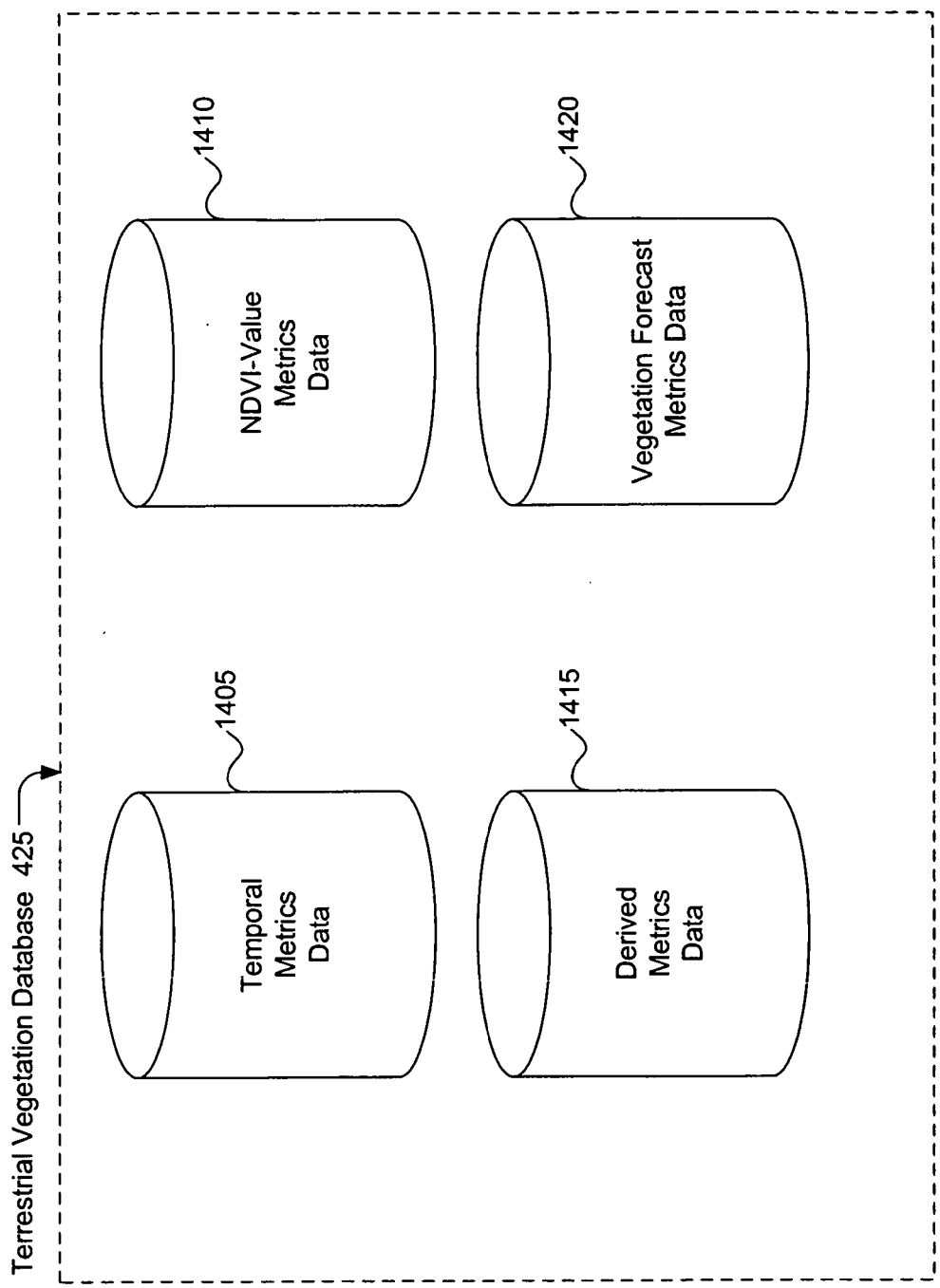
FIG. 14 is a diagram illustrating four types of data comprised by the terrestrial vegetation database according to an embodiment of the present invention.

Terrestrial vegetation, as it relates to weather conditions, are indicators of reservoir water conditions. Referring to FIG. 14, terrestrial vegetation database 425 comprises data relating to terrestrial vegetation. The data include temporal metrics data 1405, NDVI-value metrics data 1410, derived metrics data 1415, and vegetation forecast metrics data 1420. Temporal metrics data 1405, NDVI-value metrics data 1410, and derived metrics data 1415 store historical terrestrial vegetation data for a particular MA 610 and year 605. Vegetation forecast metrics data 1420 store future terrestrial vegetation data for a particular MA 610 and year 605. As explained above, the terrestrial vegetation covering the land surrounding a reservoir is a particularly important characteristic controlling the influence that this land has on the reservoir receiving its drainage. The present invention utilizes certain metrics gathered by remote sensing techniques to determine both past and future terrestrial vegetation of the land surrounding reservoirs. These metrics include terrestrial greenness and vegetation phenologic metrics. These metrics are stored in temporal metrics data 1405, NDVI-value metrics data 1410, and derived metrics data 1415 described next.

1. Temporal Metrics Data

Exemplary temporal metrics data 1405 are shown with reference to FIG. 15. Temporal metrics data 1405 comprise year field 605, MA field 610, and a temporal metrics field 1505. Temporal metrics field 1505 further comprises a time of onset of greenness field 1510, a time of end of greenness field 1515, a duration of greenness field 1520, and a time of maximum greenness field 1525. Time of onset of greenness field 1510, time of end of greenness field 1515, duration of greenness field 1520, and time of maximum greenness field 1525 each further comprise periods field 620 (FIG. 6). An explanation of data contained in each field in temporal metrics data 1405 will be described next.

Data in time of onset of greenness field 1510 represent the beginning of photosynthetic activity. The unit of measure is Julian date, where the Julian date represents the beginning date of the growing season for green vegetation as determined by NDVI.

Data in time of end of greenness field 1515 represent the end of photosynthetic activity. The unit of measure is Julian date, where the Julian date represents the ending date of the growing season for green vegetation as determined by NDVI.

Data in duration of greenness field 1520 represent the length of photosynthetic activity. The unit of measure is number of days, where the number of days represents the length of growing season for green vegetation (i.e., time of end of greenness 1515 minus time of onset of greenness 1510).

Data in time of maximum greenness field 1525 represent the time when photosynthesis is at its maximum. The unit of measure is Julian date, where the Julian date represents the time (date) when NDVI reaches its maximum value during the growing season.

2. NDVI-Value Metrics Data

Exemplary NDVI-value metrics data 1410 are shown with reference to FIG. 16. NDVI-value metrics data 1410 comprise year field 605, MA field 610, and a NDVI-value metrics field 1605. NDVI-value metrics field 1605 further comprises a value of onset greenness field 1610, a value of end of greenness field 1615, a value of maximum NDVI field 1620, and a range of NDVI field 1625. Value of onset greenness field 1610, value of end of greenness field 1615, value of maximum NDVI field 1620, and range of NDVI field 1625 each further comprise periods field 620 (FIG. 6). An explanation of data contained in each field in NDVI-value metrics data 1410 will be described next.

Data in value of onset of greenness field 1610 represent the level of photosynthesis at start. The unit of measure is scaled NDVI, where the scaled NDVI represents the NDVI value at the time of onset of greenness 1510 (FIG. 15). Data in value of end of greenness field 1615 represent the level of photosynthesis at end. The unit of measure used is scaled NDVI, where the scaled NDVI represents the NDVI value at the time of end of greenness 1515.

Data in value of maximum NDVI field 1620 represent the level of photosynthesis at maximum. The unit of measure is scaled NDVI, where the scaled NDVI represents the maximum NDVI value during the growing season.

Data in range of NDVI field 1625 represent the range of measurable photosynthesis. The unit of measure is scaled NDVI, where the scaled NDVI represents the range of NDVI values during the growing season (i.e., value of maximum NDVI 1620 minus the value of minimum NDVI.

3. Derived Metrics Data

Exemplary derived metrics data 1415 are shown with reference to FIG. 17. Derived metrics data 1415 comprise year field 605, MA field 610, and a derived metrics field 1705. Derived metrics field 1705 further comprises an accumulated NDVI field 1710, a rate of green-up field 1715, a rate of senescence field 1720, and a mean daily NDVI field 1725. Accumulated NDVI field 1710, rate of green-up field 1715, rate of senescence field 1720, and mean daily NDVI field 1725 each further comprise periods field 620 (FIG. 6). An explanation of data contained in each field in derived metrics data 1415 will be described next.

Data in accumulated NDVI field 1710 represent the net primary production. The measurement used is a measure of accumulated NDVI, where the measurement represents the time-integrated NDVI for vegetation over the growing season.

Data in rate of green-up field 1715 represent the acceleration of increasing photosynthetic activity. The measurement used is a measure of positive slope, where the measurement represents the slope of the line between the value of onset of greenness 1610 and value of maximum NDVI 1620.

Data in rate of senescence field 1720 represent the acceleration of decreasing photosynthetic activity. The measurement used is a measure of negative slope, where the measurement represents the slope of the line between value of maximum NDVI 1620 and value of end of greenness 1615.

Data in mean daily NDVI field 1725 represent the mean daily photosynthetic activity. The unit of measure is scaled NDVI, where the scaled NDVI represents the average NDVI from onset to end of greenness.

4. Vegetation Forecast Metrics Data

Exemplary vegetation forecast metrics data 1420 are shown with reference to FIG. 18. Forecast metrics data 1420 comprise year field 605, MA field 610, temporal metrics field 1505, NDVI-value metrics field 1605, and derived metrics field 1705. Temporal metrics field 1505 further comprises a time of onset of greenness field 1510, time of end of greenness field 1515, duration of greenness field 1520, and time of maximum greenness field 1525. NDVI-value metrics field 1605 further comprises value of onset vegetation field 1610, value of end of greenness field 1615, value of maximum NDVI field 1620, and range of NDVI field 1625. Time of onset of greenness field 1510, time of end of greenness field 1515, duration of greenness field 1520, time of maximum greenness field 1525, value of onset vegetation field 1610, value of end of greenness field 1615, value of maximum NDVI field 1620, range of NDVI field 1625 accumulated NDVI field 1710, rate of green-up field 1715, rate of senescence field 1720, and mean daily NDVI field 1725 each further comprise periods field 620 (FIG. 6). As indicated by like numbering, these fields contain the same type of data as the fields described with reference to temporal metrics data 1405 (FIG. 15), NDVI-value metrics data 1410 (FIG. 16), and derived metrics data 1415 (FIG. 17).

Forecast metrics data 1420 contain, for each future year 605 in the view, one or more records for each MA 610. These records contain information indicating terrestrial vegetation that is predicted to occur in the subject MA 610 in the future time span represented in the view. Changes in the land use of a reservoir (i.e., MA 610) have a more direct and immediate affect on terrestrial vegetation than they do the weather. For example, if one year to the next the terrain 945 of a particular reservoir 905 changed drastically from mostly cropland to industry, the terrestrial vegetation from one year to the next may change drastically. Thus, the forecasted data in forecast metrics data 1420 anticipate no dramatic changes in terrain 945.

Referring to FIG. 18, a record 1805 shows that in the 1999 (where N=1998), the metropolitan area indicated by MA 100 is predicted to have (for Period 1) a time of onset of greenness of 75, a time of end of greenness of 251, a duration of greenness of 170, a time of maximum greenness of 185, a value of onset of greenness of 120, a value of end of greenness of 120, a value of maximum NDVI of 171, a range of NDVI of 50, an accumulated NDVI of 1610, a rate of green-up of 2.1, a rate of senescence of −1.8, and a mean daily NDVI of 150.

Relationship Between Past and Future Data

As evident by the description above, temporal metrics data 1405, NDVI-value metrics data 1410, and derived metrics data 1415 represent past data because it contains historical information. In contrast, vegetation forecast metrics data 1420 present future data because they contain information pertaining to predicted terrestrial vegetation metrics in the future.

Both data in terrestrial vegetation database 425 contain information on a per period basis (see periods 620). Preferably, the increment of time represented by the period is the same for all data. Also, the periods in all the data are synchronized. Suppose that the increment of time is set equal to one month. In this example, if it is assumed that Period 1 represents January, then in temporal metrics data 1405, NDVI-value metrics data 1410, and derived metrics data 1415, Period 1 represents January of a past year. Similarly, in vegetation forecast metrics data 1420, Period 1 will represent January of a future year.

Time Periods

Data may be stored in temporal metrics data 1405, NDVI-value metrics data 1410, and derived metrics data 1415 using any time increment or period, including but not limited to daily, weekly, monthly, quarterly, and so forth. Similarly, vegetation forecast information for each location may be stored in forecast metrics data 1420 on a daily basis, a weekly basis, a monthly basis, or a quarterly basis. Preferably, the time increment/period is the same for all data 1405, 1410, 1415, and 1420.

F. Government Compliance Database

There exists considerable public concern over water resources of all types. This public concern results in involvement of water sources by many government agencies and other organizations. This involvement ranges from actual jurisdiction over certain matters to various degrees of influence over other matters. Particular management or renovation actions described in this document may require official types of compliance, even permits, or at least cooperation from certain parties to be most successfully completed. In general, the more permits and/or compliance a particular solution requires, the more costly that solution will be to implement. Thus, knowing how to work with this network of involved parties is very important to the success of any solution, whether it is at the federal, state, and/or private level.

The network of influential parties will differ depending on the ownership of the reservoir and land within the watershed. Most states have the following types of reservoirs based on ownership or designated responsibility. Federal reservoirs include those operated in some way by the Corps of Engineers, Bureau of Reclamation, Tennessee Valley Authority, Forest Service, National Park Service, Fish and Wildlife Service, and Bureau of Land Management. Other reservoirs are operated by the state, by particular watershed districts within the state, by municipal and city governments, or by private parties.

Government compliance database 430 represents which government entities (e.g., federal, state, and local) require permits for solutions 1310 (FIG. 13). Therefore, a particular solution may be more costly for one reservoir than for another, depending on the particular MA 610 the reservoir is located in. Exemplary government compliance database 430 is shown with reference to FIG. 19. Compliance database 430 comprises a type field 1905, a state/locality field 1910, a MA(s) applicable field 1915, and a permit required for solution field 1920. Permit required for solution field 1920 is organized in such a way that a check mark is placed under each solution that the type 1905 and state/locality 1910 require a permit for.

Although compliance database 430 shows only United States government entities, the present invention contemplates providing information worldwide. An explanation of data contained in each field in compliance database 430 will be described next.

Data in type field 1905 represent a type of government entity, including federal, state, and local government entities.

Data in state/locality field 1910 break down the type 1905 of "State" into different states in the United States. Data in state/locality field 1910 also break down the type 1905 of "local" into different localities in the United States.

Data in MA(s) applicable field 1915 list each MA 610 that type 1905 has jurisdiction over. For example, assume that MA 100 through MA 1780 includes all of the MAs 610 in the United States. Then, referring to record 1925 in FIG. 19, the federal government has jurisdiction over MA100 through MA1780. Whereas, the state of Alabama only has jurisdiction over MA201 through MA215.

Data in permit required for solution field 1920 represent, for each type 1905 and state/locality 1910, which solutions they require permits for. Referring to record 1925, the only solution that the federal government requires a permit for is S10 (i.e., introduce herbicides from FIG. 13). It is important to note that compliance database 430 is for exemplary purposes and may not reflect the actual permits required for each solution.

VIII. General System Operation The manner in which users may navigate through the functional modules and features provided by renovation system 205 will now be described. Renovation system 205 provides front end system 210 so that it may be accessible by a user directly on a desktop computer, via a World Wide Web page over the Internet (i.e., through on-line services), or accessible via an Intranet. In an alternative embodiment, it may be accessible via telephone services or the like. It should be understood that the control flows described are for example purposes only. Front end system 210 of the present invention is sufficiently flexible such that users may navigate through renovation system 205 in ways other than that described.

Referring again to FIG. 3, renovation system 205 includes processing modules 305, administration modules 310, and background modules 315. Each of module 305, 310, and 315 contains multiple modules. Each module of processing modules 305 performs a unique set of processing functions that are configured based on past and future weather, and past and future terrestrial vegetation. Each module of administration modules 310 performs a unique set of administrative functions. Each module of background modules 315 performs a unique set of background functions required by both processing modules 305 and administration modules 310. Because the modules in background module 315 are called upon by both processing modules 305 and administration modules 310, the modules in background modules 305 will be described first. Next, processing modules 305 will be described. Finally, administration modules 310 will be described.

A. Background Modules

Figure 20:
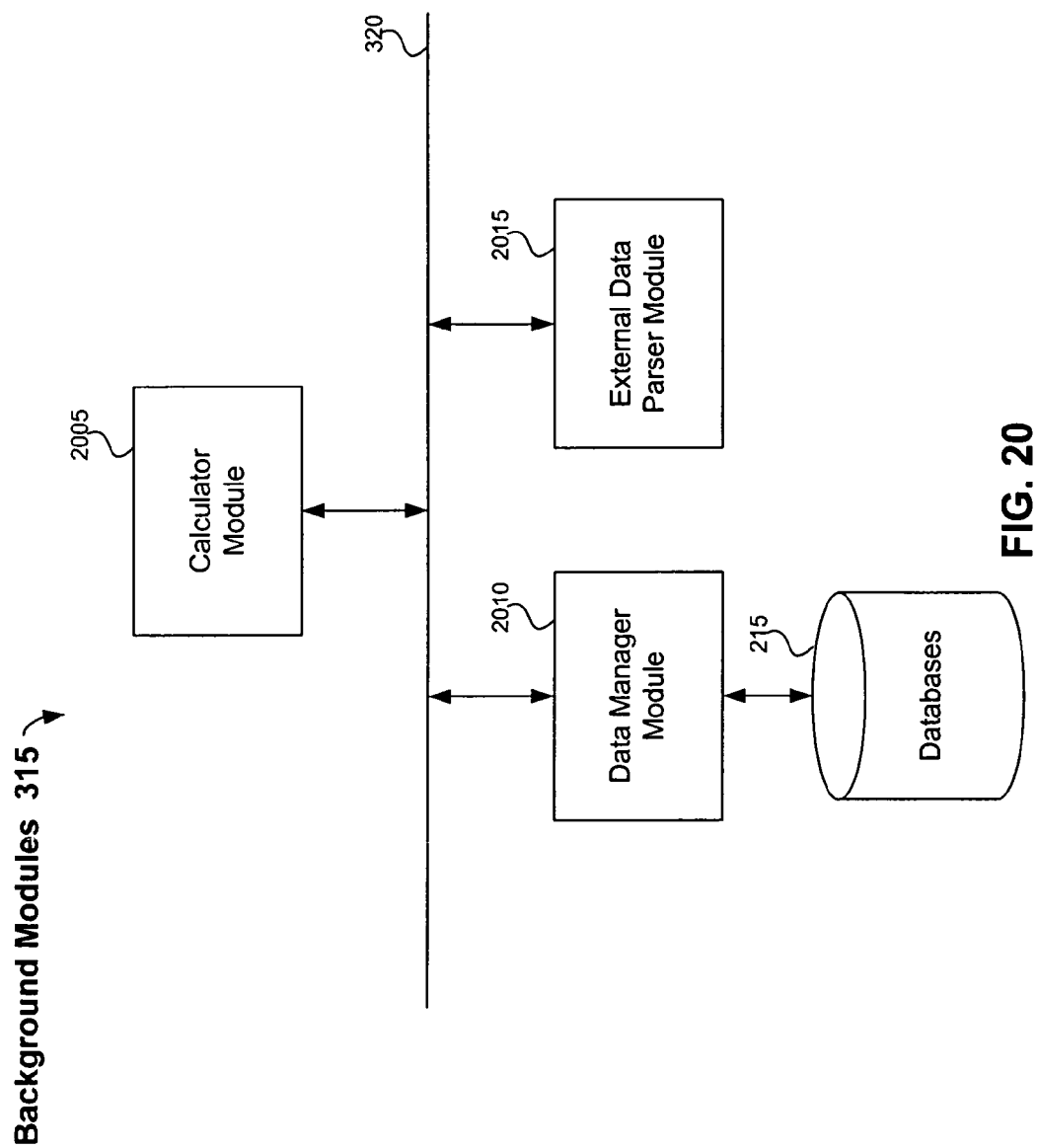
FIG. 20 is a block diagram of the background modules of the renovation system according to an embodiment of the present invention.

Each module of background modules 315 performs a unique set of background functions required by both processing modules 305 and administration modules 310. Referring to FIG. 20, background modules 315 provides a calculator module 2005, a data manager module 2010, and an external data parser module 2015. Each of these modules is described in detail below.

1. Calculator Module

Calculator module 2005 is called upon by remedy module 2210 and cost module 2215 (both discussed below with reference to FIG. 22) to process any mathematical calculations that are required. Calculator module 2005 will compute such things as rate of siltation, percentage of change in terrain 945, aquatic systems 950, number of people served 925, and uses; and so forth, for any given reservoir 905 (FIG. 9). The present invention includes an extensive library that includes cost of supplies and time in labor required for different solutions 1310 in solutions database 420 (FIG. 13).

2. Data Manager Module

Data manager module 2010 handles all requests for data from databases 215. Data manager module 2010 acts as an intermediary between databases 215 and the other modules of the present invention. One exception to this is shown in FIG. 3 where administration modules 310 may directly access databases 215.

3. External Data Parser Module

As stated above, data needed to perform all functions of the present invention are either passed in via front end system 210, collected by renovation system 205, or derived by renovation system 205. Therefore, the present invention must be able to accept and/or process data in various formats. Data are passed to front end system 210 in various methods. Once the data are received by front end system 210 they are passed to external data parser module 2015 to be formatted prior to storage in databases 215. Some of the methods of collecting the data that are eventually stored in databases 215 is explained with reference to FIG. 21.

Figure 21:
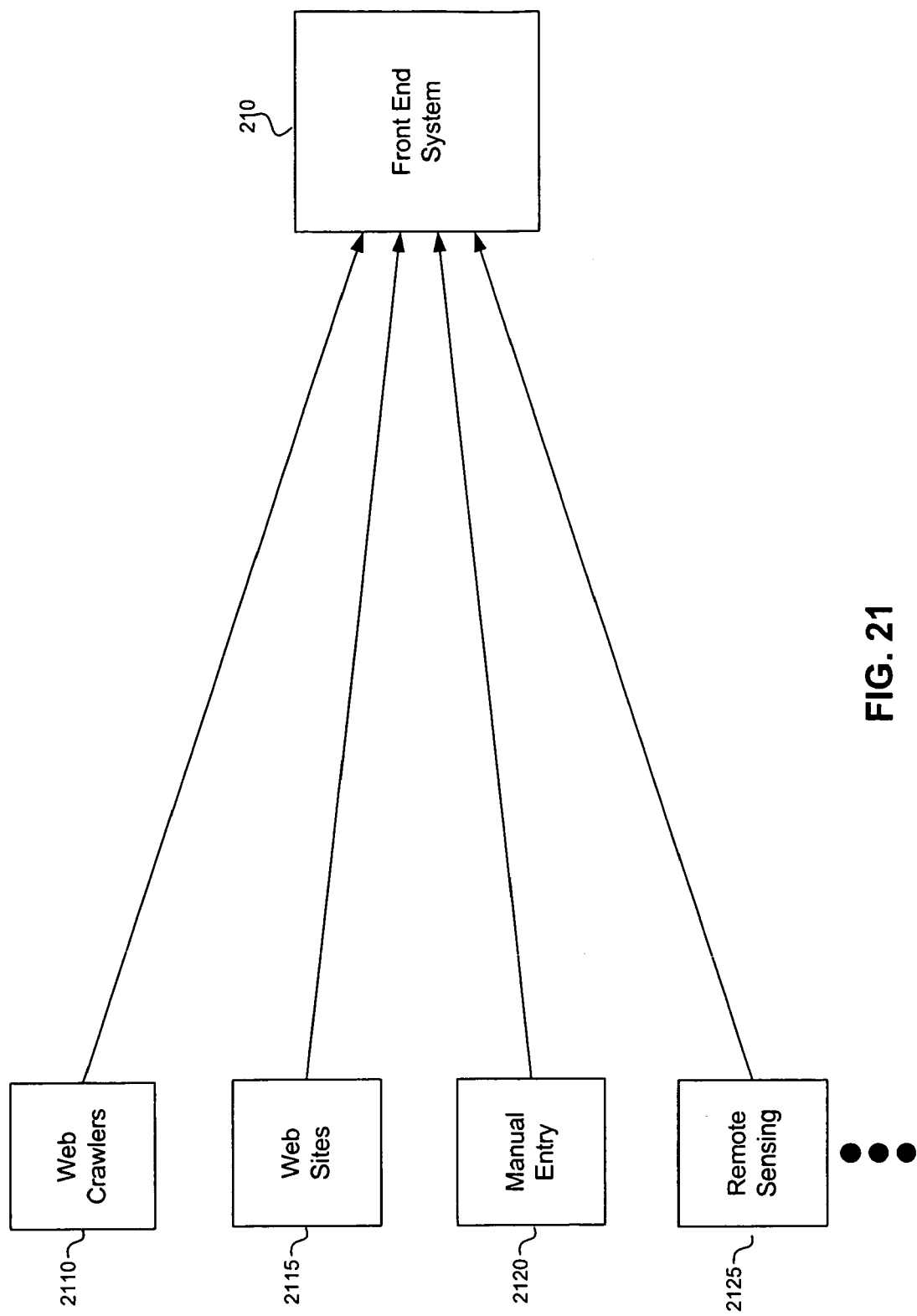
FIG. 21 is a block diagram representing various ways of obtaining data for databases of the present invention according to an embodiment of the present invention.

FIG. 21 is a block diagram representing various ways of obtaining data for databases 215. It should be understood that FIG. 21 is shown for illustrative purposes only and does not limit the invention. FIG. 21 shows the collection of data via web crawlers 2110, direct connections to web sites 2115, manual entry 2120, remote sensing 2125, uploaded from compact disks, and so forth. These entities represent sources of data, collectors of data, and means for inputting/receiving data. These collections of data are then sent to external data parser module 2015, via front end system 205, to reformat the data for storage in databases 215, and for processing by the present invention.

As is well-known in the relevant art(s), a web crawler is a program that indexes any web site it is pointed at that is open to the public. In a sense, it "crawls" through all the web pages (of the web site) and creates an index of their content. Manual entry 2120 may involve contracting an agency to input data from public documents (or any other publication), from publicly broadcasted programs, from independent research, and so forth. A specific example of the type of data utilized by the present invention that may involve manual entry 2120 is a collection of public and/or consumer complaints for each reservoir 905 stored in reservoir/watershed history database 410 (FIG. 9). Remote sensing 2125, as discussed above, involves the collection of data via high elevation sensors from airplanes and satellites. Once front end system 210 has been sent data from one or more of these sources mentioned above, front end system 210 then passes the data to external data parser module 2015.

B. Processing Modules

Figure 22:
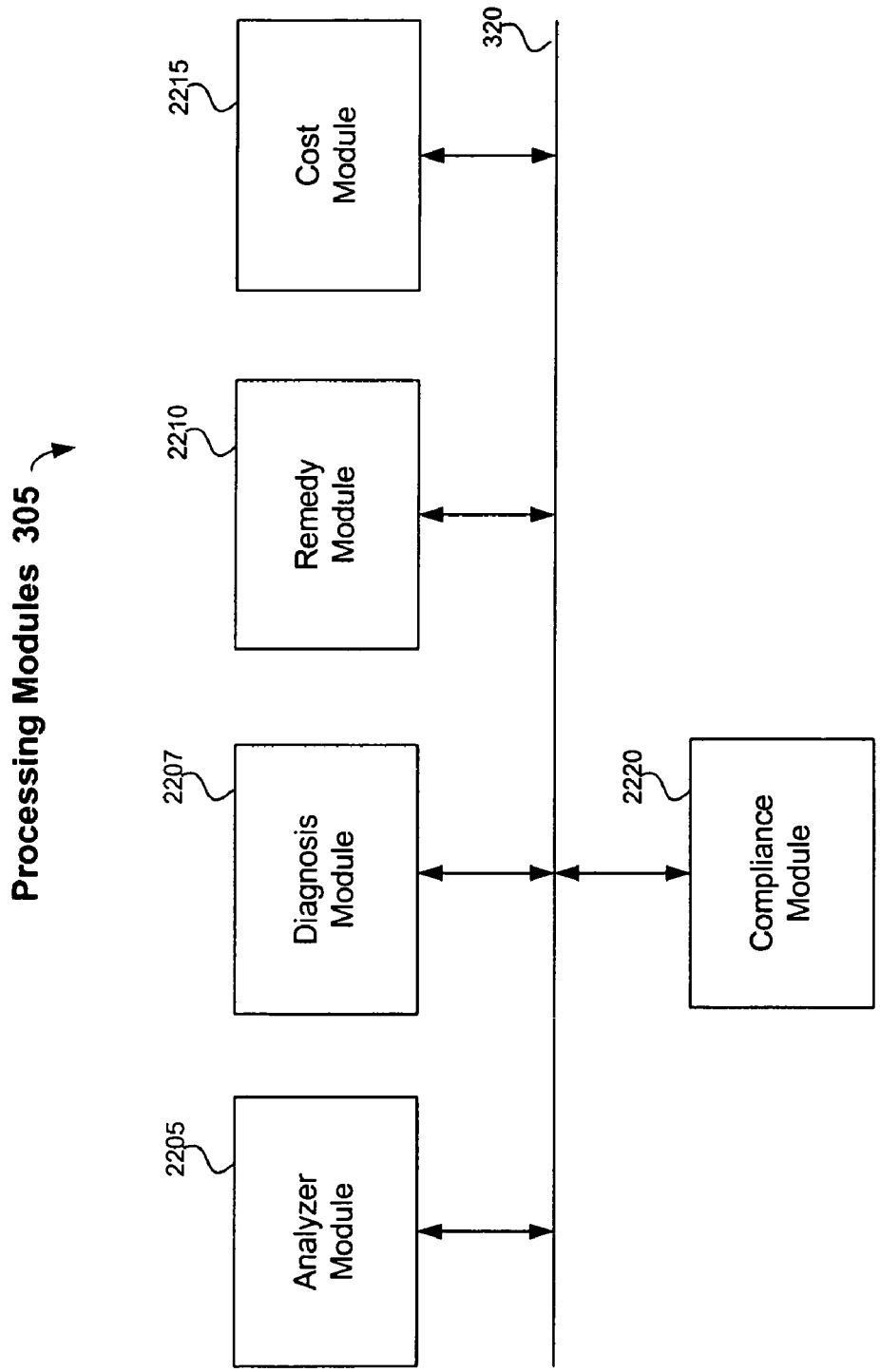
FIG. 22 is a block diagram of the processing modules of renovation system according to an embodiment of the present invention.

Each module of processing modules 305 performs a unique set of processing features that are configured based on past and future weather, and past and future terrestrial vegetation. Referring to FIG. 22, processing modules 305 provide an analyzer module 2205, a diagnosis module 2207, a remedy module 2210, a cost module 2215, and a compliance module 2220. Note that each of these modules requests required data for processing from databases 215 via data manager module 2010 of background modules 315. Data manager module 2010 was previously described with reference to FIG. 20. These modules are described for illustrative purposes. The invention is not limited to these modules.

Figure 23:
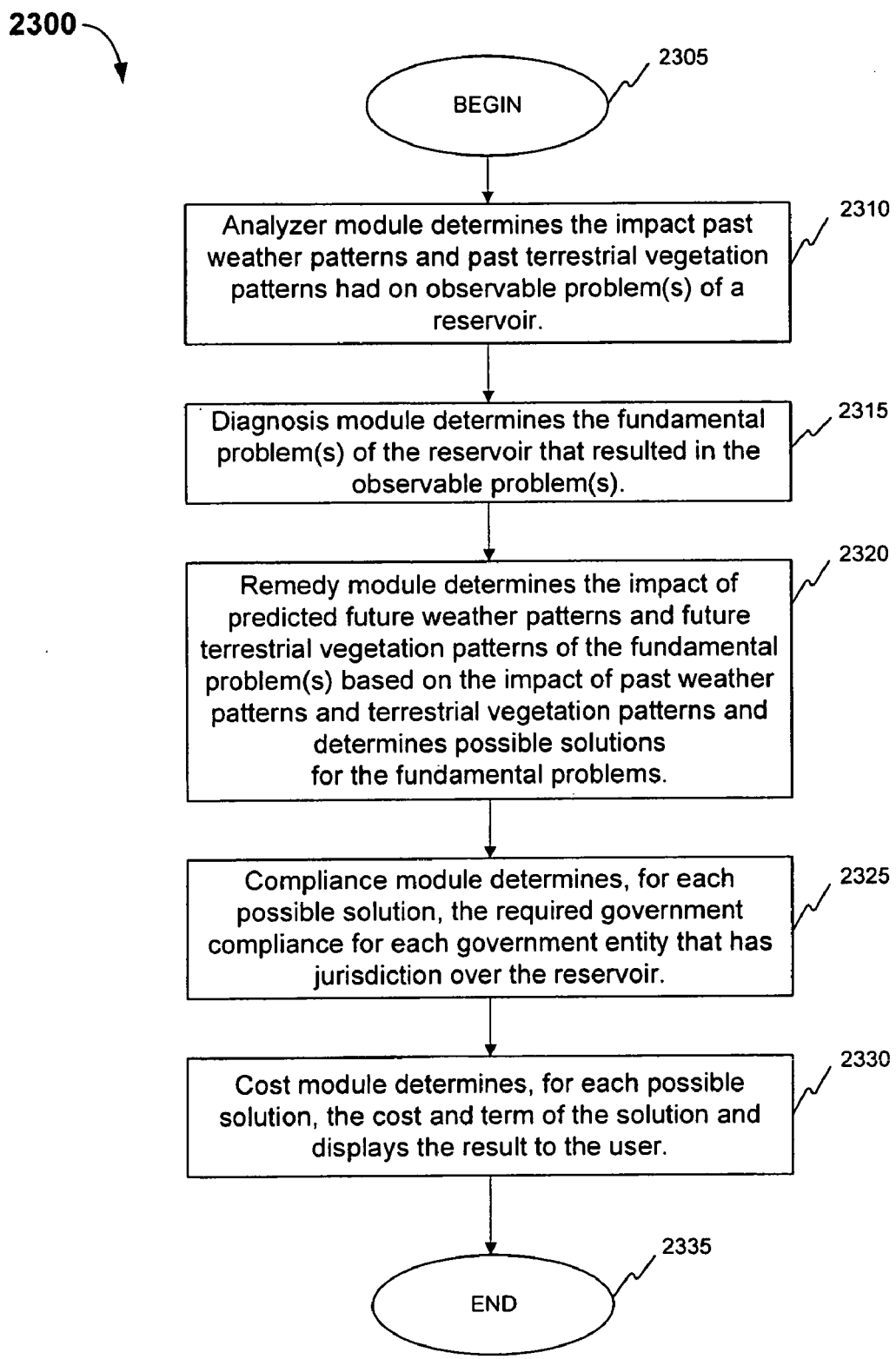
FIG. 23 a flowchart illustrating the high level method of operation of the renovation system according to an embodiment of the present invention.

A high level explanation of the operation of each of these modules is described with reference to FIG. 23. Referring to FIG. 23, a flowchart 2300 illustrating the high level method of operation of processing modules 305 is explained. The method of operation is described for illustrative purposes. The invention is not limited to this method of operation. Flowchart 2300 begins at step 2305 with control passing immediately to step 2310.

In step 2310, analyzer module 2205 determines the impact past weather and/or terrestrial vegetation patterns had on observable problem(s) for a reservoir. These observable problem(s) were collected and stored in reservoir/watershed history database 410 as recorded problems 915 (FIG. 9). It is important to note that the present invention is flexible in that as it determines different renovation and management strategies of reservoir 905, weather data may be used alone, terrestrial vegetation data may be used alone, or both weather and terrestrial vegetation data may be used in combination with each other. Control then passes to step 2315.

In step 2315, diagnosis module 2207 determines the fundamental problem(s) of the reservoir that resulted in these observable problems from analyzer module 2205. The process of first determining the observable problems and then the fundamental problems is desirable due to the fact that certain observable problems in the functioning of the reservoir may actually be symptoms of more fundamental, though less recognized, problems in the functioning of the reservoir. Fundamental problems, once the connections to the observable problems are understood (and their relationship to weather and terrestrial vegetation), then become the focus of renovation and management of the present invention. Control then passes to step 2320.

In step 2320, remedy module 2210 determines the impact of predicted future weather and terrestrial vegetation patterns of the fundamental problem(s) based on the impact of past weather patterns and terrestrial vegetation from analyzer module 2205. Remedy module 2210 then considers other factors prior to determining possible solutions for the fundamental problems of the reservoir. These other factors include the attempted solutions in the past to remedy an observable problem (i.e., attempted solutions 920), the particular uses of the reservoir (i.e., uses 940), the description of the watershed (i.e., description of watershed 910), and so forth. Control then passes to step 2325.

In step 2325, compliance module 2220 determines, for each possible solution (from step 2320), which government entities that have jurisdiction over reservoir 905 require permits. Control then passes to step 2330.

In step 2330, cost module 2215 determines, for each possible solution (from step 2320), its estimated cost, years to complete, possible funding, timing of implementation, and so forth. Cost module 2215 then displays the result to the user in the form of a report. The report indicates for each remaining solution, its estimated cost, whether the solution is short term or long term (e.g., management of the reservoir), possible funding options, timing of implementation, and so forth. Control then passes to step 2335 where flowchart 2300 ends.

A detailed explanation of the method of operation of processing modules 305 and the specific data from databases 215 utilized to perform these operations is described next.

1. Operation of Analyzer Module

As stated above, analyzer module 2205 determines the impact past weather terrestrial vegetation patterns had on observable problems (i.e., recorded problems 915) for reservoir 905 (step 2310 from FIG. 23). The specific data utilized by analyzer module 2205 to determine this impact are data stored in reservoir/watershed history database 410, weather history data 505, weather patterns data 510, temporal metrics data 1405, NDVI-value metrics data 1410, and derived metrics data 1415. A more detailed explanation of the operation of analyzer module 2205 shall now be described. Reference shall be made to a flowchart 2400 in FIG. 24, which represents the steps performed by analyzer module 2205 while performing step 2310 in FIG. 23 (described above).

Flowchart 2400 begins at step 2405 with control passing immediately to step 2410.

In step 2410, analyzer module 2205 determines the impact past weather patterns had on each recorded problem 915 for reservoir 905. Analyzer module 2205 then records the results. Control then passes to step 2415.

In step 2415, analyzer module 2205 determines the impact past terrestrial vegetation had on each recorded problem 915 for reservoir 905. Analyzer module 2205 then records the results. Control then passes to step 2420 where flowchart 2400 ends. Next, the detailed steps of 2410 and 2415 are described with reference to FIGS. 25 and 26, respectively.

i. Determination of the Impact of Past Weather Patterns on Observable Problems

Figure 24:
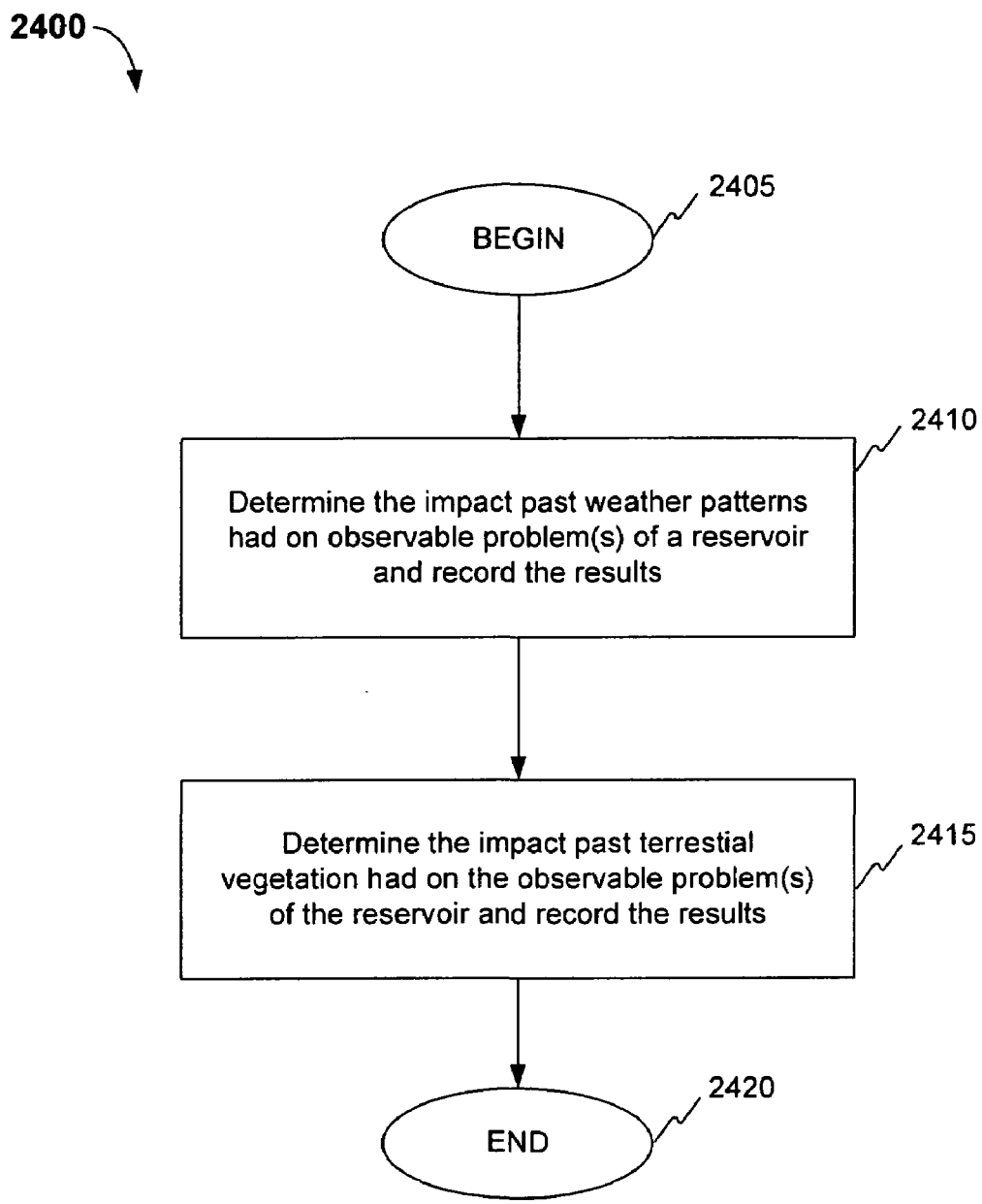
FIG. 24 is a high level flowchart illustrating the steps performed by the analyzer module according to an embodiment of the present invention.
Figure 25:
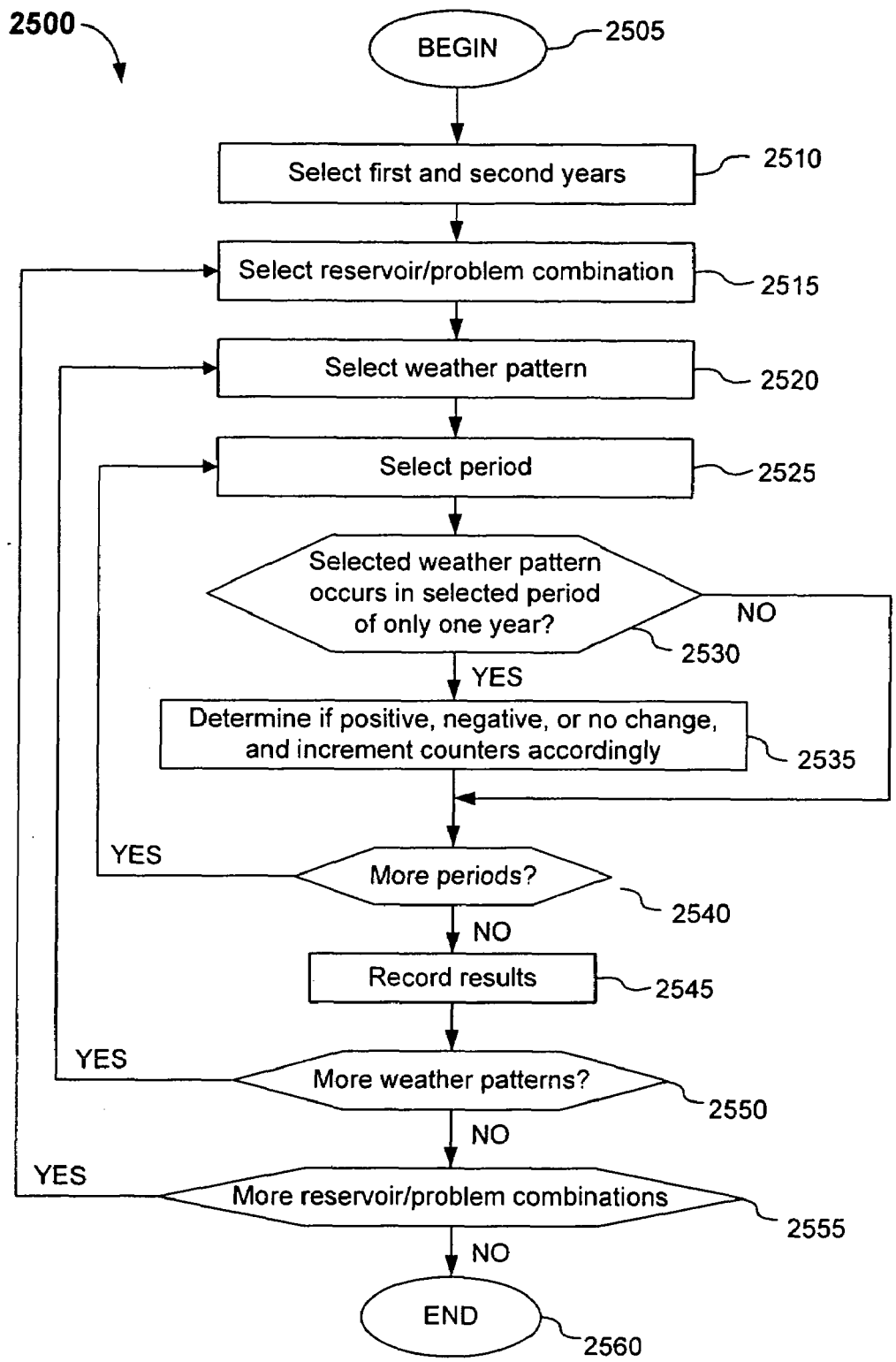
FIGS. 25 and 26 are flowcharts illustrating detailed steps performed by the analyzer module according to an embodiment of the present invention.
Figure 26:
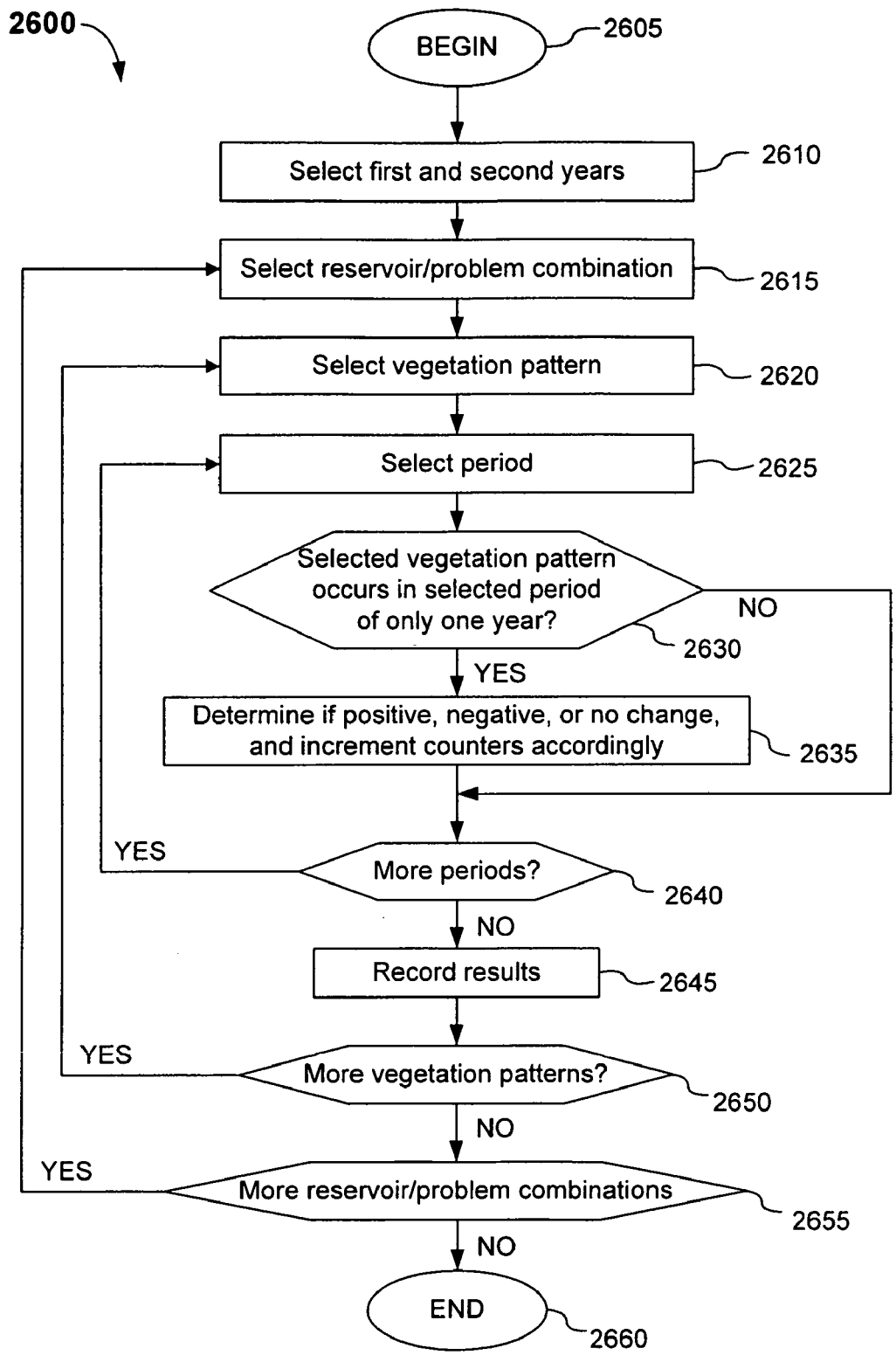

Reference shall be made to a flowchart 2500 in FIG. 25, which represents the steps performed by analyzer module 2205 while performing step 2410 in FIG. 24 (described above). Flowchart 2500 begins with step 2505, where control immediately flows to step 2510.

In step 2510, analyzer module 2205 selects two prior years for evaluation. Preferably, analyzer module 2205 in step 2510 selects the immediately two prior years for evaluation (in which case these years are referred to as Year N-1, and Year N-2, where N is the current year). But analyzer module 2205 could alternatively select any two or more past years for analysis. Assume, for purposes of illustration, that analyzer module 2205 selected 1997 and 1998. Control then passes to step 2515.

In step 2515, analyzer module 2205 selects a reservoir/observable problem combination. That is, analyzer module 2205 selects reservoir 905 and one observable problem 1105 (from recorded problems 915) for evaluation. For purposes of illustration, assume that analyzer module 2205 selects reservoir R1, and observable problem OP1 (i.e., objectionable taste and odor conditions). Control then passes to step 2520.

In step 2520, analyzer module 2205 uses weather patterns data 510 and selects a weather pattern for evaluation. For illustrative purposes, assume that analyzer module 2205 asserts the T1P1 weather pattern for evaluation (temperature above seasonal/precipitation above seasonal).

At this point, analyzer module 2205 has selected a reservoir, an observable problem, and a weather pattern for evaluation. Analyzer module 2205 has also selected two years on which to base the evaluation. In the following steps, analyzer module 2205 determines the extent to which the selected weather pattern (in this case, T1P1) impacted the selected observable problem 1105 (OP1) in selected reservoir 905 (R1) over the selected two years (1997 and 1998). Control then passes to step 2525.

In step 2525, analyzer module 2205 selects a period for evaluation. Suppose that analyzer module 2205 selects Period 1. Control then passes to step 2530.

In step 2530, analyzer module 2205 determines whether the selected weather pattern occurs in the selected period of only one of the two selected years. Consider, for example, records 625–633 in the weather history data 505 shown in FIG. 6C. In Period 1, the weather pattern T1P1 occurred in both 1997 and 1998.

If analyzer module 2205 in step 2530 determined that the selected weather pattern did not occur in the selected period of only one of the two selected years (as was the case in Period 1; this is also the case in periods P2, P4, P5, and P6), then control passes to step 2540. In step 2540, analyzer module 2205 selects another period for evaluation.

If, instead, analyzer module 2205 in step 2530 determined that the selected weather pattern did occur in the selected period of only one of the two selected years (as is the case in period 3; note that the weather pattern T1P1 occurs only in 1995), then step 2535 is performed.

In step 2535, analyzer module 2205 determines whether the selected weather pattern had a positive impact, a negative impact, or no impact on observable problem 1105 in the selected period from Year N-2 to Year N-1. The selected weather pattern had a positive impact if the condition of observable problem 1105 improved in the selected period from Year N-2 to Year N-1. The selected weather pattern had a negative impact if the condition worsened in the selected period from Year N-2 to Year N-1. The selected weather pattern had no impact if the condition was the same in the selected period from Year N-2 to Year N-1. Referring to the reservoir/watershed history database 410 in FIG. 9, note that in Period 1, OP1 was an observable problem for R1 in 1997, and was not an observable problem in 1998. Thus, the selected weather pattern T1P1 had a positive impact on the condition of objectionable taste and odor (OP1) during Period 1 from 1997 to 1998.

Also in step 2535, analyzer module 2205 increments the positive counter, negative counter, or the no change counter. The positive counter is incremented if it is determined that the selected weather pattern had a positive impact on the problem's condition in the selected period from Year N-2 to Year N-1. The negative counter is incremented if it is determined that the selected weather pattern had a negative impact on the problems condition (i.e., worsened the problem) in the selected period from Year N-2 to Year N-1. The no change counter is incremented if it is determined that the selected weather pattern had no impact on the problem's condition in the selected period from Year N-2 to Year N-1. Control then passes to step 2540.

In step 2540, analyzer module 2205 determines if there are other periods to process. The number of periods in any given year were previously determined, as discussed above.

If there are additional periods to process, then control returns to step 2525. Analyzer module 2205 processes steps 2525, 2530, 2535, and 2540 for each period in the years selected in step 2510.

If there are no more periods to process, then step 2545 is performed. In step 2545, analyzer module 2205 stores the results for the selected weather pattern. The data are stored in a temporary memory location or file called analyzer_past_weather.data. An example of analyzer_past_weather.data is shown in Table 4 below.

TABLE 4

| Weather Pattern | Reservoir | Observable Problem | Positive Counts | Negative Counts | No Change Counts |
|---|---|---|---|---|---|
| T1P1 | R1 | OP1 | 1 | 0 | 0 |
| T1S1 | R1 | OP1 | 3 | 1 | 0 |
| T1S-1 | R1 | OP6 | 2 | 3 | 1 |
| T0S1 | R1 | OP6 | 0 | 2 | 2 |
| . | . | . | . | . | . |
| . | . | . | . | . | . |
| . | . | . | . | . | . |

The analyzer_past_weather.data (Table 4 above) includes a record for each weather pattern/reservoir/problem combination. Each record stores the positive count, the negative count, and the no change count for the weather pattern/reservoir/problem combination. These counts indicate the manner in which the selected weather pattern impacted the selected problem's condition in the selected reservoir. Control then passes to step 2550.

In step 2550, analyzer module 2205 determines whether there are additional weather patterns to process. Preferably, analyzer module 2205 processes all possible weather patterns (see FIGS. 7A and 7B) for each reservoir/observable problem combination.

If there are additional weather patterns to process, then control returns to step 2520. Otherwise, control passes to step 2555.

In step 2555, analyzer module 2205 determines whether there are additional reservoir/observable problem combinations to process. Preferably, all reservoir/observable problem combinations are processed. If there are additional reservoir/problem combinations to process, then control passes to step 2515. Otherwise, control passes to step 2560 where flowchart 2500 ends.

ii. Determination of the Impact of Past Terrestrial Vegetation on Observable Problems Reference shall be made to a flowchart 2600 in FIG. 26, which represents the steps performed by analyzer module 2205 while performing step 2415 in FIG. 24 (described above). Flowchart 2600 begins with step 2605, where control immediately flows to step 2610.

In step 2610, analyzer module 2205 selects two prior years for evaluation. Preferably, analyzer module 2205 in step 2610 selects the immediately two prior years for evaluation (in which case these years are referred to as Year N-1, and Year N-2, where N is the current year). Analyzer module 2205 could alternatively select any two or more past years for analysis. Assume, for purposes of illustration, that analyzer module 2205 selected 1997 and 1998. Control then passes to step 2615.

In step 2615, analyzer module 2205 selects a reservoir/observable problem combination. That is, analyzer module 2205 selects reservoir 905 and one observable problem 1105 (from recorded problems 915) for evaluation. For purposes of illustration, assume that analyzer module 2205 selects reservoir R1, and the observable problem OP1 (i.e., objectionable taste and odor conditions). Control then passes to step 2620.

In step 2620, analyzer module 2205 uses terrestrial vegetation patterns data (not shown) and selects a terrestrial vegetation pattern for evaluation. Terrestrial vegetation patterns are similar in concept to weather patterns of the present invention. Each terrestrial vegetation pattern includes one or more greenness and/or vegetation phenologic metrics, including time of onset of greenness field 1510 ("TOG"), time of end of greenness field 1515 ("TEG"), duration of greenness field 1520 ("DGF"), time of maximum greenness field 1525 ("TMG"), value of onset greenness field 1610 ("VOG"), value of end of greenness field 1615 ("VEG"), value of maximum NDVI field 1620 ("VMN"), range of NDVI field 1625 ("RNF"), accumulated NDVI field 1710 ("ANF"), rate of green-up field 1715 ("RGF"), rate of senescence field 1720 ("RSF"), and mean daily NDVI field 1725 ("MDN").

The present invention makes use of a number of different terrestrial vegetation patterns to characterize the terrestrial vegetation that occurred during any given past period, or that is predicted to occur during any given future period. Exemplary terrestrial vegetation patterns employed by the present invention include time of onset of greenness/time of end of greenness, time of end of greenness/value of onset greenness, value of maximum NDVI/accumulated NDVI, and so forth., sustained greenness, time of onset of greenness/time of end of greenness lag 1 period, and value of maximum NDVI/accumulated NDVI lag 1 period. The present invention is not limited to these terrestrial vegetation patterns, for example patterns also include value of maximum NDVI/accumulated NDVI/time of end of greenness combinations.

Each terrestrial vegetation pattern includes one or more greenness and/or vegetation phenologic metrics. For any given period, each metric can be either seasonal, below seasonal, or above seasonal (except the sustained terrestrial vegetation pattern). For any given period, the values of these terrestrial vegetation patterns are represented by entries in terrestrial vegetation database 425 having the category data type (not shown). For example, in 1997, the terrestrial vegetation pattern in MA100 during Period 1 may be time of onset of greenness above seasonal/time of end of greenness above seasonal. This terrestrial vegetation pattern is abbreviated by TOG1TEG1. This file is used as the "look up" to allow renovation system 205 to determine which patterns it will use. For illustrative purposes, assume that analyzer module 2205 asserts the TOG1TEG1 terrestrial vegetation pattern for evaluation (time of onset of greenness above seasonal/time of end of greenness above seasonal).

At this point, analyzer module 2205 has selected a reservoir, an observable problem, and a terrestrial vegetation pattern for evaluation. Analyzer module 2205 has also selected two years on which to base the evaluation. In the following steps, analyzer module 2205 determines the extent to which the selected terrestrial vegetation pattern (in this case, TOG1TEG1) impacted the selected observable problem 1105 (OP1) in selected reservoir 905 (R1) over the selected two years (1997 and 1998). Control then passes to step 2625.

In step 2625, analyzer module 2205 selects a period for evaluation. Suppose that analyzer module 2205 selects Period 1. Control then passes to step 2630.

In step 2630, analyzer module 2205 determines whether the selected terrestrial vegetation pattern occurs in the selected period of only one of the two selected years.

Assume in Period 1, the terrestrial vegetation pattern TOG1TEG1 occurred in both 1997 and 1998.

If analyzer module 2205 in step 2630 determined that the selected terrestrial vegetation pattern did not occur in the selected period of only one of the two selected years (as was the case in Period 1; this is also the case in periods Period 2, Period 4, Period 5, and Period 6), then control passes to step 2640. In step 2640, analyzer module 2205 selects another period for evaluation.

If, instead, analyzer module 2205 in step 2630 determined that the selected terrestrial vegetation pattern did occur in the selected period of only one of the two selected years, then step 2635 is performed.

In step 2635, analyzer module 2205 determines whether the selected terrestrial vegetation pattern had a positive impact, a negative impact, or no impact on observable problem 1105 in the selected period from Year N-2 to Year N-1. The selected terrestrial vegetation pattern had a positive impact if the condition of observable problem 1105 improved in the selected period from Year N-2 to Year N-1. The selected terrestrial vegetation pattern had a negative impact if the condition worsened in the selected period from Year N-2 to Year N-1. The selected terrestrial vegetation pattern had no impact if the condition was the same in the selected period from Year N-2 to Year N-1. Referring to the reservoir/watershed history database 410 in FIG. 9, note that in Period 1, OP1 was an observable problem for R1 in 1997, and was not an observable problem in 1998. Thus, the selected terrestrial vegetation pattern TOG1TEG1 had a positive impact on the condition of objectionable taste and odor (OP1) during Period 1 from 1997 to 1998.

Also in step 2635, analyzer module 2205 increments the positive counter, negative counter, or the no change counter. The positive counter is incremented if it is determined that the selected terrestrial vegetation pattern had a positive impact on the problem's condition in the selected period from Year N-2 to Year N-1. The negative counter is incremented if it is determined that the selected terrestrial vegetation pattern had a negative impact on the problems condition (i.e., worsened the problem) in the selected period from Year N-2 to Year N-1. The no change counter is incremented if it is determined that the selected terrestrial vegetation pattern had no impact on the problem's condition in the selected period from Year N-2 to Year N-1. Control then passes to step 2640.

In step 2640, analyzer module 2205 determines if there are other periods to process. The number of periods in any given year were previously determined, as discussed above. If there are additional periods to process, then control returns to step 2625. Analyzer module 2205 processes steps 2625, 2630, 2635, and 2640 for each period in the years selected in step 2610.

If there are no more periods to process, then step 2645 is performed. In step 2645, analyzer module 2205 stores the results for the selected terrestrial vegetation pattern. The data are stored in a temporary memory location or file called analyzer_past_vegetation.data. An example of analyzer_past_vegetation.data is shown in Table 5 below.

TABLE 5

| Terrestrial Vegetation Pattern | Reservoir | Observable Problem | Positive Counts | Negative Counts | No Change Counts |
|---|---|---|---|---|---|
| TOG1TEG1 | R1 | OP1 | 1 | 0 | 0 |
| TOG1DGF1 | R1 | OP1 | 2 | 1 | 1 |
| TOG1DGF-1 | R1 | OP6 | 1 | 4 | 0 |
| TOG0DGF1 | R1 | OP6 | 2 | 0 | 2 |
| . | . | . | . | . | . |
| . | . | . | . | . | . |
| . | . | . | . | . | . |

The analyzer_past_vegetation.data (Table 5 above) includes a record for each terrestrial vegetation pattern/reservoir/problem combination. Each record stores the positive count, the negative count, and the no change count for the terrestrial vegetation pattern/reservoir/problem combination. These counts indicate the manner in which the selected terrestrial vegetation pattern impacted the selected problem's condition in the selected reservoir. Control then passes to step 2650.

In step 2650, analyzer module 2205 determines whether there are additional terrestrial vegetation patterns to process. Preferably, analyzer module 2205 processes all possible terrestrial vegetation patterns for each reservoir/observable problem combination.

If there are additional terrestrial vegetation patterns to process, then control returns to step 2620. Otherwise, control passes to step 2655.

In step 2655, analyzer module 2205 determines whether there are additional reservoir/observable problem combinations to process. Preferably, all reservoir/observable problem combinations are processed. If there are additional reservoir/problem combinations to process, then control passes to step 2615. Otherwise, control passes to step 2660 where flowchart 2600 ends.

2. Operation of Diagnosis Module

Figure 27:
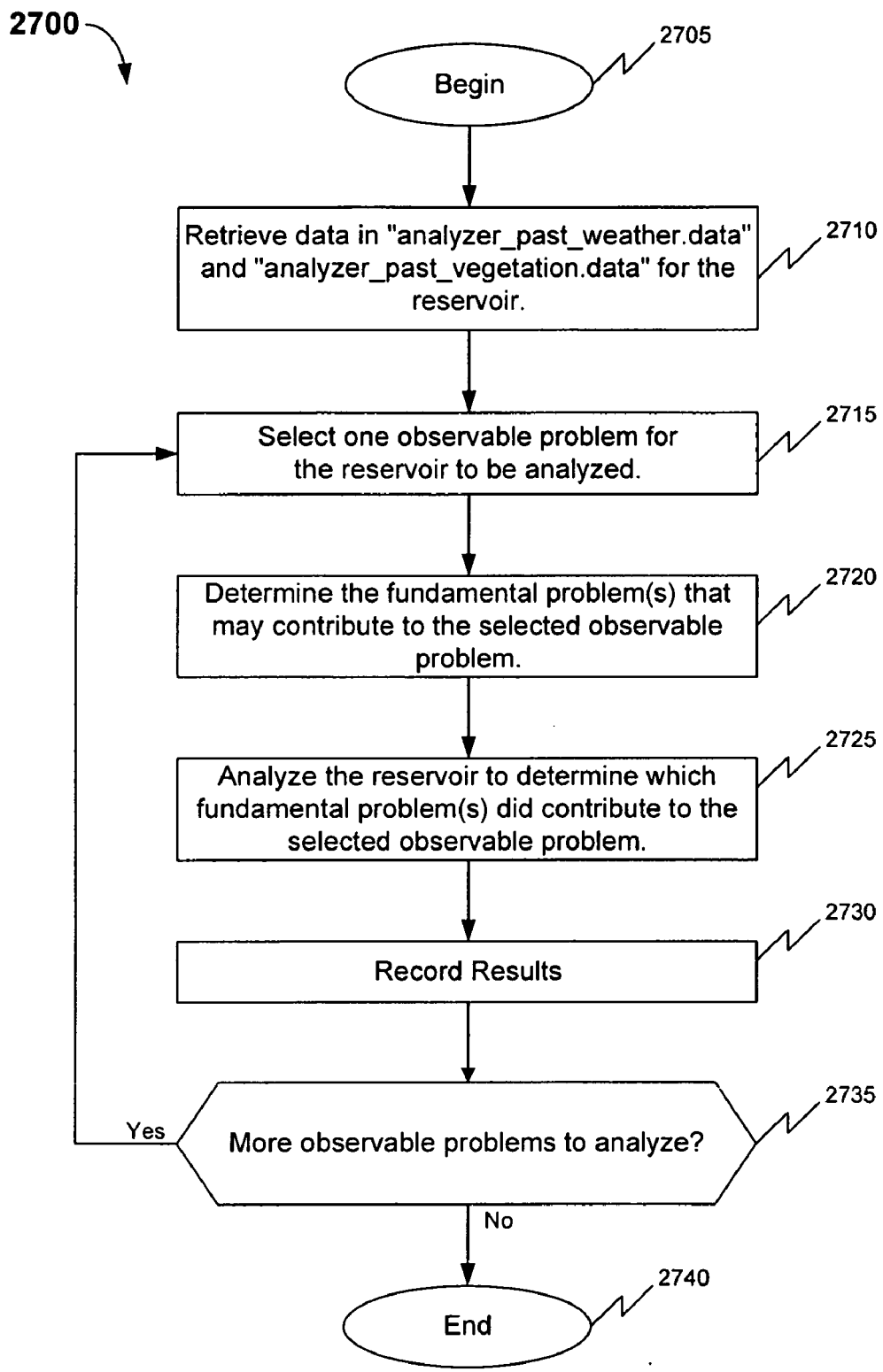
FIG. 27 is a flowchart illustrating the steps performed by the diagnosis module according to an embodiment of the present invention.

As stated above, diagnosis module 2207 determines any fundamental problems 1205 of reservoir 905 that resulted in observable problems 1105 (recorded problems 915 for reservoir 905 in FIG. 9) analyzed by analyzer module 2205 (step 2315 from FIG. 23). Fundamental problems 1205 typically exist prior to, and are the essence of, observable problems 1105. The specific data utilized by diagnosis module 2207 to determine the fundamental problems 1205 are data stored in analyzer_past weather.data and analyzer_past_vegetation.data (output of analyzer module 2205), reservoir/watershed history database 410, and problems database 415. A more detailed explanation of the operation of diagnosis module 2207 shall now be described. Reference shall be made to a flowchart 2700 in FIG. 27, which represents the steps performed by diagnosis module 2207 while performing step 2315 in FIG. 23 (described above). Flowchart 2700 begins at step 2705 with control passing immediately to step 2710.

In step 2710, diagnosis module 2207 retrieves the data in analyzer_past weather.data and analyzer_past vegetation.data for reservoir 905. This provides information to diagnosis module 2207 such as all observable problems 1105 that the reservoir is experiencing, and how past weather patterns and past terrestrial vegetation patterns impacted these observable problems 1105. Assume that observable problems are OP1 and OP6. Control then passes to step 2715.

In step 2715, diagnosis module 2207 selects an observable problem 1105 that has not been analyzed yet. Assume diagnosis module 2207 picks OP1. Control then passes to step 2720.

In step 2720, diagnosis module 2207 determines all of the fundamental problems 1205 that may contribute to selected observable problem 1105 to be analyzed. This information comes from observable problems data 1005 (FIG. 11). Referring to FIG. 11, observable problem OP1 (objectionable taste and odor conditions) has two related observable problems (OP3 and OP6) and three fundamental problems (FP2, FP3, and FP4) that may contribute to OP1. Since diagnosis module 2207 is only interested in determining fundamental problems 1205 that contribute to selected observable problem 1105 being analyzed, diagnosis module 2207 determines any fundamental problems 1205 that potentially contribute to observable problems 1105 and includes them in the list of fundamental problems 1205 to be considered by the present invention for reservoir 905. For example, for observable problem OP1 (objectionable taste and odor) the possible fundamental problems include FP1 (elevated plant nutrient levels), FP2 (elevated chemical levels (geosmin)), FP3 (siltation), and FP4 (thermal stratification) (see FIG. 12 and fundamental problems data 1010). Control then passes to step 2725.

In step 2725, diagnosis module 2207 analyzes the reservoir and determines which fundamental problems 1205 determined in step 2720 actually need to be addressed in reservoir 905 (which fundamental problems 1205 actually did contribute to selected observable problem 1105 analyzed in step 2720). Here, diagnosis module 2207 reviews the historical data for reservoir 905 in reservoir/watershed history database 410, including description of watershed 910, size in acres of water supply versus total size 930, and so forth. Diagnosis module 2207 also reviews both related weather causes 1215 and related terrestrial vegetation causes 1217 (fundamental problems data 1010) for each fundamental problem 1205. Diagnosis module 2207 also relates related weather causes 1215 and related terrestrial vegetation causes 1217 for each fundamental problem 1205 with the actual weather and terrestrial vegetation patterns experienced by the reservoir (analyzer_past_weather.data and analyzer_past_vegetation.data). Assume diagnosis module 2207 determines that out of the possible fundamental problems (FP1, FP2, FP3, and FP4), the actual fundamental problems include FP1 and FP2 only. Control then passes to step 2730.

In step 2730, diagnosis module 2207 stores the results (i.e., actual fundamental problems determined in step 2725) in a temporary memory location or file called diagnosis_fundamental_problems.data. An example of diagnosis_fundamental_problems.data is shown in Table 6 below.

TABLE 6

| Reservoir | Observable Problem(a) | Fundamental Problems to be Addressed |
|---|---|---|
| R1 | OP1 | FP1, FP2 |
| ... | | ... |

Note, that as diagnosis module 2207 determines additional fundamental problems for the reservoir, diagnosis module 2207 simply adds these to diagnosis_fundamental_problems.data. Control then passes to step 2735.

In step 2735, diagnosis module 2207 determines whether there are additional observable problems 1105 to process. If there are additional observable problems 1105 to process, control returns to step 2715. Otherwise, control passes to step 2740 where flowchart 2700 ends.

3. Operation of Remedy Module

As stated above, remedy module 2210 determines the impact of predicted future weather and terrestrial vegetation patterns of the fundamental problems 1205 based on the impact of past weather and terrestrial vegetation patterns from analyzer module 2205 of observable problems 1105. Since diagnosis module 2207 determines fundamental problems 1205 of reservoir 905 that are essentially the cause of observable problems 1105 in reservoir 905, remedy module 2210 can simply replace the observable problems 1105 listed in analyzer_past_weather.data and analyzer_past_vegetation.data and replace them with the fundamental problems 1205 determined by diagnosis module 2207 above (diagnosis_fundamental_problems.data).

The specific data utilized by remedy module 2210 to determine this impact are data stored in analyzer_past_weather.data, analyzer_past_vegetation.data, diagnosis_fundamental_problems.data, reservoir/watershed history database 410, fundamental problems data 1010, solutions database 420, weather forecast data 515, and terrestrial vegetation forecast data 1420. A more detailed explanation of the operation of remedy module 2210 shall now be described. Reference shall be made to a flowchart 2800 in FIG. 28, which represents the steps performed by remedy module 2210 while performing step 2320 in FIG. 23 (described above). Flowchart 2800 begins at step 2805 with control passing immediately to step 2810. In step 2810, remedy module 2210 determines the impact predicted future weather patterns will have on each fundamental problem 1205 reservoir 905 is currently experiencing. Remedy module 2210 then records the results. Control then passes to step 2815.

In step 2815, remedy module 2210 determines the impact predicted future terrestrial vegetation will have on each fundamental problem 1205 of reservoir 905 in step 2810. Remedy module 2210 then records the results. Control then passes to step 2820.

Figure 29:
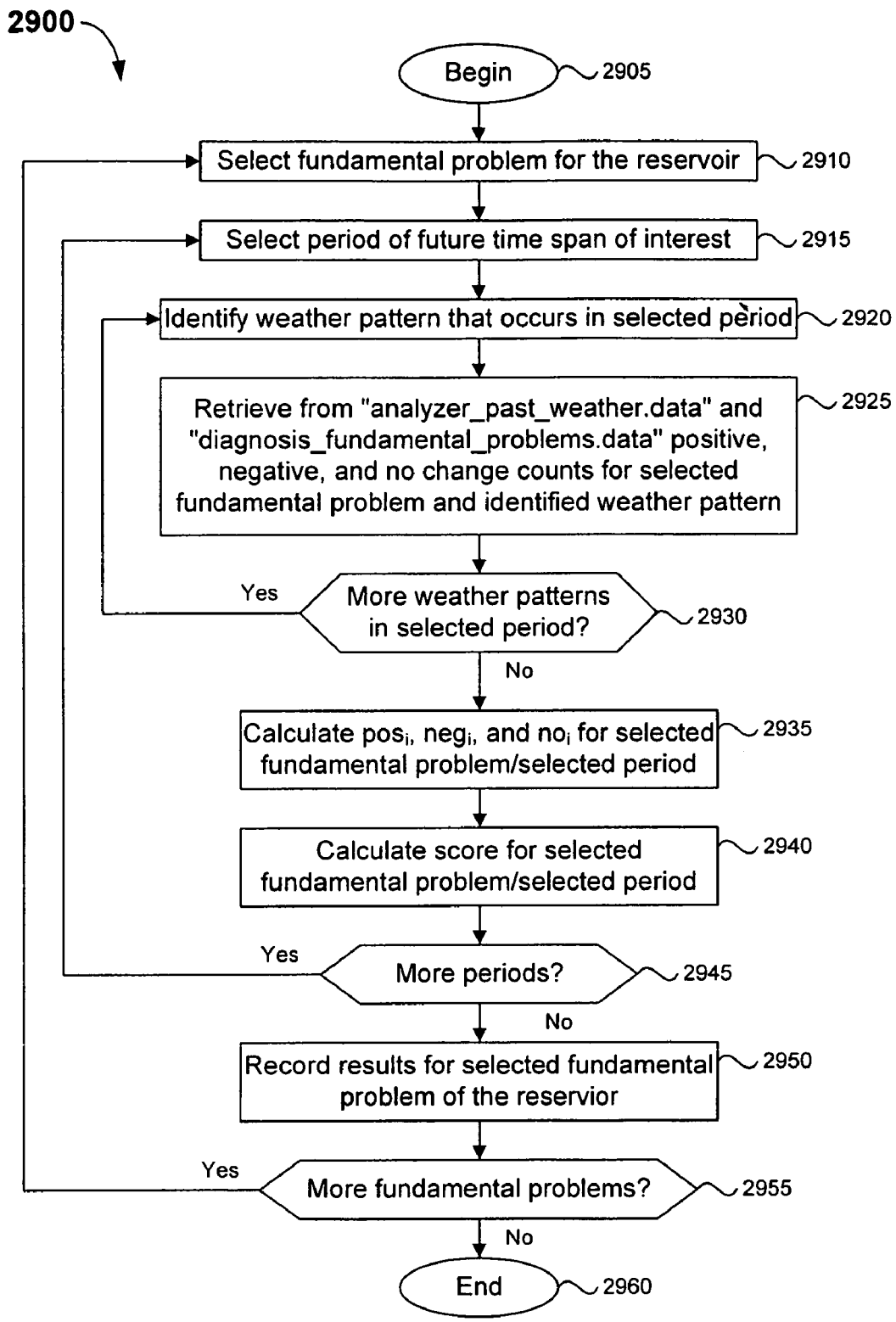
FIGS. 29, 30, and 31 are flowcharts illustrating detailed steps performed by the remedy module according to an embodiment of the present invention.
Figure 30:
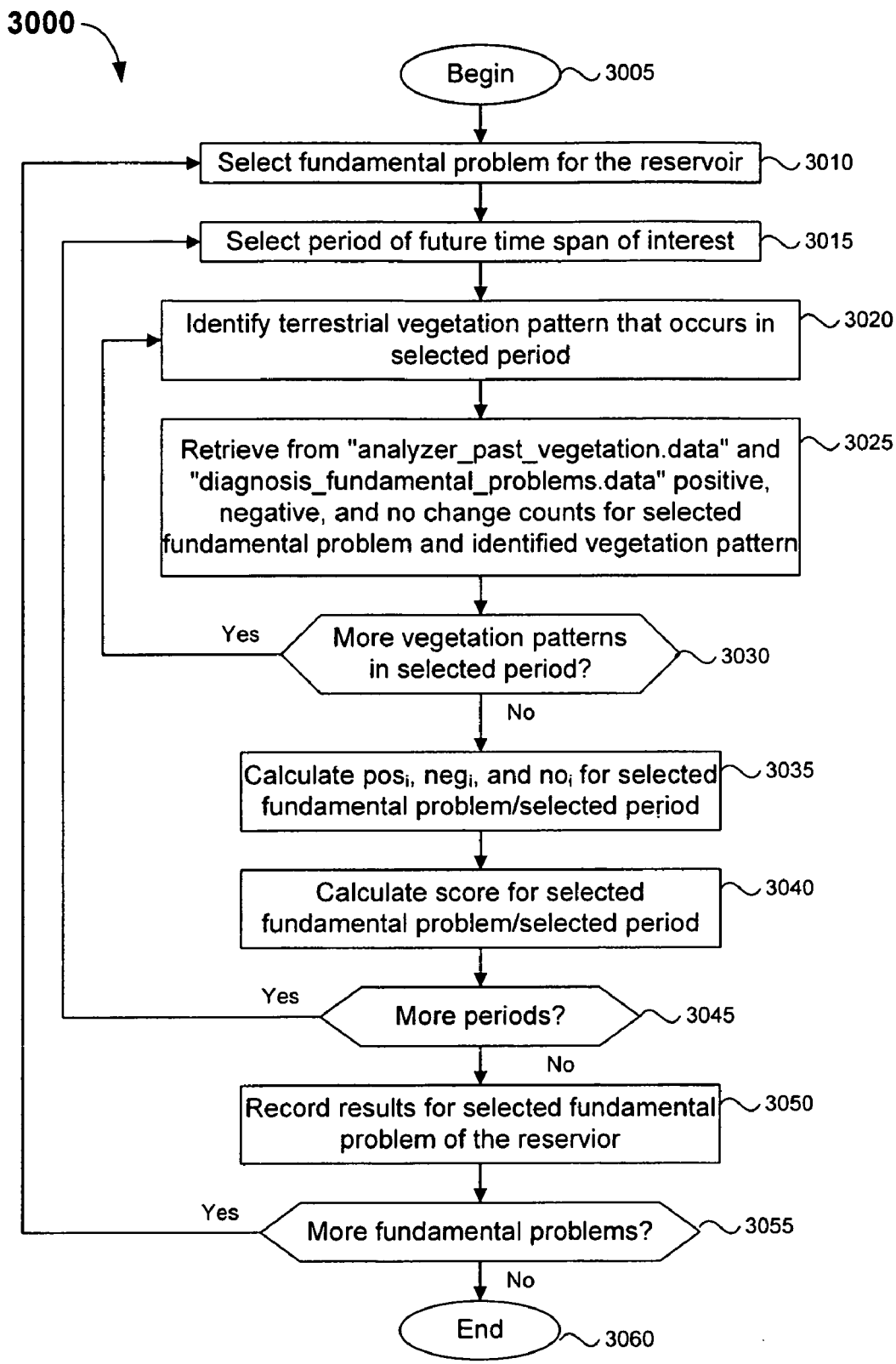

In step 2820, remedy module 2210 determines possible solutions 1310 to the fundamental problems 1205 experienced by reservoir 905 based on the output of steps 2810 and 2815. Remedy module 2210 then records the results. Control then passes to step 2825 where flowchart 2800 ends. Next, the detailed steps of 2810, 2815, and 2820 are described with reference to FIGS. 29, 30 and 31, respectively.

i. Determination of the Impact of Predicted Future Weather on Fundamental Problems Reference shall be made to a flowchart 2900 in FIG. 29, which represents the step performed by remedy module 2110 while performing step 2810 in FIG. 28 (described above). Flowchart 2900 begins with step 2905, where control immediately flows to step 2910.

In step 2910, remedy module 2210 selects a fundamental problem 1205 experienced by reservoir 905 (assume R1) to evaluate. For illustrative purposes, assume that remedy module 2210 selects fundamental problem FP1. Control then passes to step 2915.

In step 2915, remedy module 2210 selects a period in a future time span to evaluate. Assume that remedy module 2210 selects Period 1 in the future time span. At this point, remedy module 2210 has selected fundamental problem 1205 and a future selected period. Control then passes to step 2920.

In the following steps, remedy module 2210 estimates the severity of the selected fundamental problem 1205 for reservoir 905 during the selected period. In doing this, remedy module 2210 takes into account the affect of the weather that is predicted to occur in the selected period.

In step 2920, remedy module 2210 identifies the weather pattern that occurs in the predicted future time period. Consider, for example, weather forecast data 515 in FIG. 8B. As indicated by records 810 and 815, the predicted weather pattern in MA100 (where reservoir R1 is located; see FIG. 9) in selected period is T1P1. Accordingly, in this example, remedy module 2210 in step 2920 identifies weather pattern T1P1 as occurring in the selected period. Many weather patterns potentially occur in any given period. For example, the weather pattern P1W-1 (precipitation above seasonal/wind speed below seasonal) also occurs in Period 1. Control then passes to step 2925.

In step 2925, remedy module 2210 determines the manner in which these identified weather patterns have, in the past, impacted the selected fundamental problem 1205 in reservoir 905. In particular, in step 2925 remedy module 2210 retrieves from analyzer_past_weather.data (output from analyzer module 2205) and diagnosis_fundamental_problems.data (output from diagnosis module 2207) the positive, negative, and no change counts for the selected fundamental problem 1205 and identified weather pattern. Remedy module 2210 stores these counts in a temporary memory location. Control then passes to step 2930.

As indicated by step 2930, remedy module 2210 performs steps 2920 and 2925 for every predicted weather pattern identified in the selected period. After all weather patterns in the selected period have been identified (in step 2920) and processed (in step 2925), control passes to step 2935.

In step 2935, remedy module 2210 totals all positive counts to obtain a total positive count for the selected period. Also, remedy module 2210 totals all negative counts to obtain a total negative count for the selected period. Also, remedy module 2210 totals all no change counts to obtain a total no change count for the selected period. Control then passes to step 2940.

In step 2940, remedy module 2210 uses the total positive count, the total negative count, and the total no change count to obtain a score for the selected period. This score represents an indication of the predicted severity for the selected fundamental problem 1205 in reservoir 905 for the future selected period in view of the predicted weather. One manner in which this score is generated is with a "calc strength" algorithm/calculation described in detail in U.S. Pat. No. 5,832,456, and incorporated herein by reference in its entirety. Control then passes to step 2945.

In step 2945, remedy module 2210 determines whether there are additional periods in the future time span to process for the selected fundamental problem 1205 of reservoir 905. A user preferably specifies the periods in the future time span to process. If there are more periods to process, then control returns to step 2915. Otherwise, control flows to step 2950.

In step 2950, remedy module 2210 stores information pertaining to the selected fundamental problem 1205. The data are stored in a temporary memory location or file called remedy_future_weather.data. An example of remedy_future_weather.data is shown in Table 7 below.

TABLE 7

| Reservoir | Fundamental Problem | Future Weather | | | | |
|---|---|---|---|---|---|---|
| | | Period1 Counts | Period1 Score | ... | Period6 Counts | Period6 Score |
| R1 | FP1 | $Pos_1, Neg_1, No_1$ | $Score_1$ | ... | $Pos_6, Neg_6, No_6$ | $Score_6$ |
| . | . | . | . | . | . | . |
| . | . | . | . | . | . | . |
| . | . | . | . | . | . | . |

Referring to Table 7, remedy_future weather.data includes a record for each reservoir/fundamental problem combination. Each record stores the total positive count (e.g., Pos1), total negative count (e.g., Neg1), total no change count (e.g., No1), and score (e.g., Score1) for each period for the reservoir/fundamental problem combination. Control then passes to step 2955.

In step 2955, remedy module 2210 determines whether there are any other fundamental problems 1205 to analyze. If there are more fundamental problems 1205 to analyze, then control returns to step 2910. Otherwise, control passes to step 2960 where flowchart 2900 ends.

ii. Determination of the Impact of Predicted Future Terrestrial Vegetation on Fundamental Problems Reference shall be made to a flowchart 3000 in FIG. 30, which represents the step performed by remedy module 2110 while performing step 2815 in FIG. 28 (described above). Flowchart 3000 begins with step 3005, where control immediately flows to step 3010.

In step 3010, remedy module 2210 selects a fundamental problem 1205 for reservoir 905 to evaluate. For illustrative purposes, assume that remedy module 2210 selects fundamental problem FP1. Control then passes to step 3015.

In step 3015, remedy module 2210 selects a period in a future time span to evaluate. Assume that remedy module 2210 selects Period 1 in the future time span. At this point, remedy module 2210 has a selected fundamental problem 1205 and future selected period. Control then passes to step 3020.

In the following steps, remedy module 2210 estimates the severity of the selected fundamental problem 1205 for reservoir 905 during the selected future time period. In doing this, remedy module 2210 takes into account the affect of the terrestrial vegetation that is predicted to occur in the future time span.

In step 3020, remedy module 2210 identifies the terrestrial vegetation pattern that occurs in the predicted future time period. Consider, for example, vegetation forecast metrics data 1420 in FIG. 18. Assume, the predicted terrestrial vegetation pattern in MA100 (where reservoir R1 is located; see FIG. 9) in selected period is TOG1TEG1 (time of onset of greenness above seasonal/time of end of greenness above seasonal). Accordingly, in this example, remedy module 2210 in step 3020 identifies terrestrial vegetation pattern TOG1TEG1 as occurring in the selected period.

Many terrestrial vegetation patterns potentially occur in any given period. For example, the terrestrial vegetation pattern VMN1RNF-1 (value of maximum NDVI above seasonal/range of NDVI below seasonal) may also occur in the selected period. Control then passes to step 3025.

In step 3025, remedy module 2210 determines the manner in which these identified terrestrial vegetation patterns have, in the past, impacted the selected fundamental problem 1205 in reservoir 905. In particular, in step 3025 remedy module 2210 retrieves from analyzer_past_vegetation.data (output from analyzer module 2205) and diagnosis_fundamental_problems.data (output from diagnosis module 2207) the positive, negative, and no change counts for the selected fundamental problem 1205 and identified terrestrial vegetation pattern. Remedy module 2210 stores these counts in a temporary memory location. Control then passes to step 3030. As indicated by step 3030, remedy module 2210 performs steps 3020 and 3025 for every predicted terrestrial vegetation pattern identified in the selected period. After all terrestrial vegetation patterns in the selected period have been identified (in step 3020) and processed (in step 3025), control passes to step 3035.

In step 3035, remedy module 2210 totals all positive counts to obtain a total positive count for the selected period. Also, remedy module 2210 totals all negative counts to obtain a total negative count for the selected period. Also, remedy module 2210 totals all no change counts to obtain a total no change count for the selected period. Control then passes to step 3040.

In step 3040, remedy module 2210 uses the total positive count, the total negative count, and the total no change count to obtain a score for the selected period. This score represents an indication of the predicted severity for the selected fundamental problem 1205 in reservoir 905 for the selected period in view of the predicted terrestrial vegetation. One manner in which this score is generated is with a "calc strength" algorithm/calculation described in detail in U.S. Pat. No. 5,832,456, and incorporated herein by reference in its entirety. Control then passes to step 3045.

In step 3045, remedy module 2210 determines whether there are additional periods in the future time span to process for the selected fundamental problem 1205 of reservoir 905. A user preferably specifies the periods in the future time span to process. If there are more periods to process, then control returns to step 3015. Otherwise, control flows to step 3050.

In step 3050, remedy module 2210 stores information pertaining to the selected fundamental problem 1205. The data are stored in a temporary memory location or file called remedy_future_vegetation.data. An example of remedy_future_vegetation.data is shown in Table 8 below.

(e.g., Pos1), total negative count (e.g., Neg1), total no change count (e.g., No1), and score (e.g., Score1) for each period for the reservoir/fundamental problem combination. Control then passes to step 3055.

In step 3055, remedy module 2210 determines whether there are any other fundamental problems 1205 to analyze. If there are more fundamental problems 1205 to analyze, then control returns to step 3010. Otherwise, control passes to step 3060 where flowchart 3000 ends.

iii. Determination of the Solutions to Fundamental Problems

Figure 28:
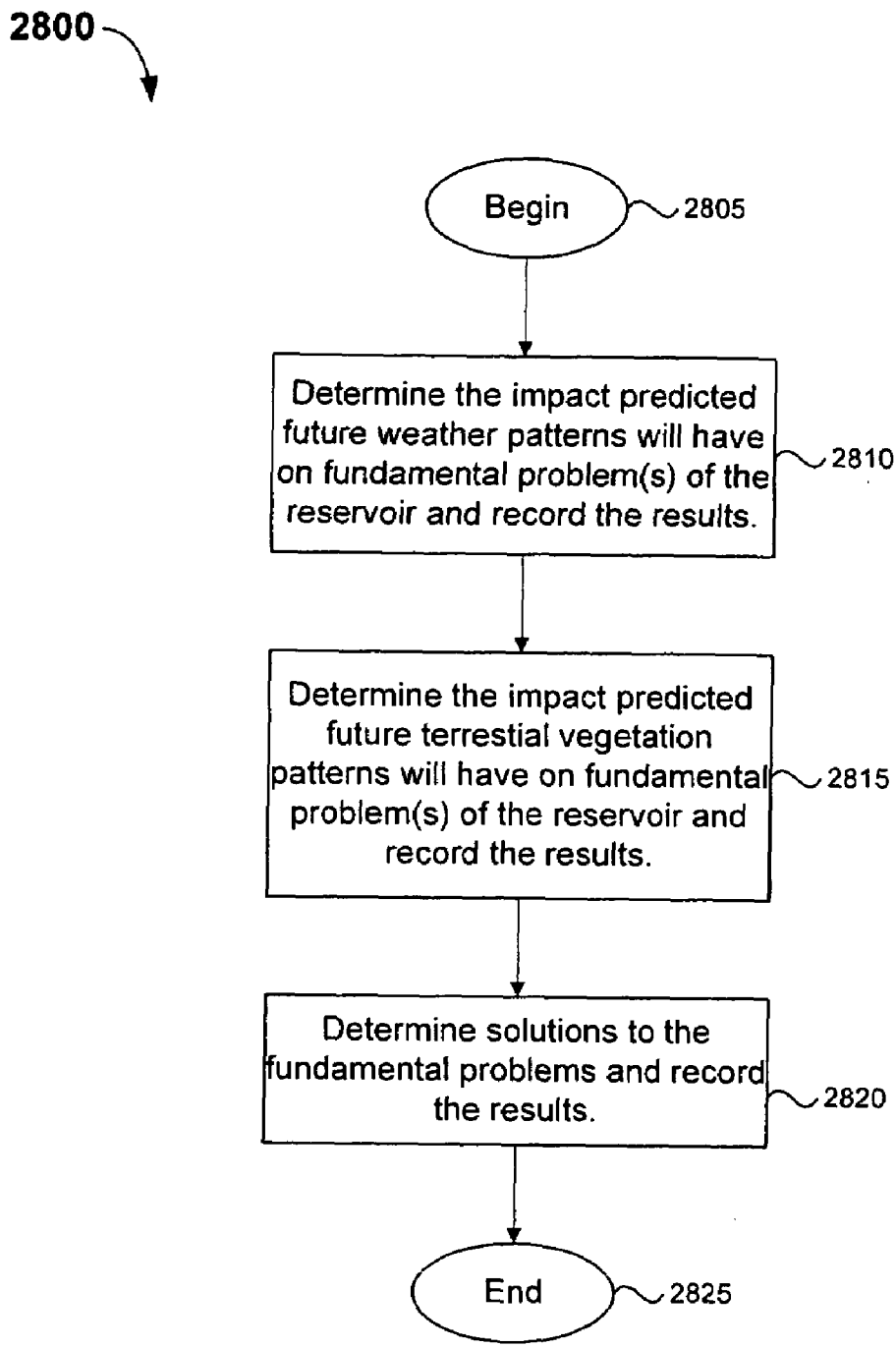
FIG. 28 is a high level flowchart illustrating the steps performed by the remedy module according to an embodiment of the present invention.
Figure 31:
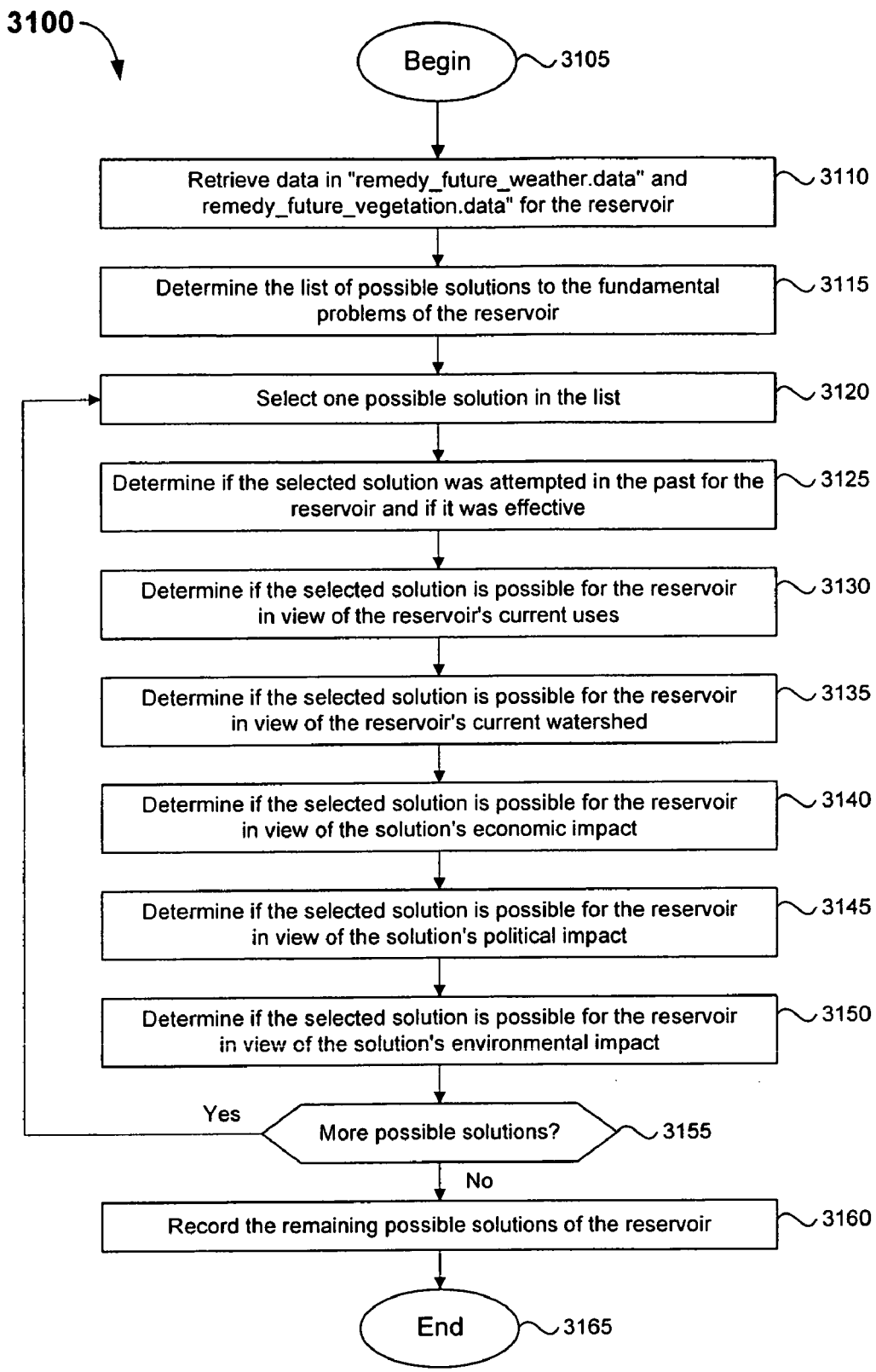

Reference shall be made to a flowchart 3100 in FIG. 31, which represents the step performed by remedy module 2110 while performing step 2820 in FIG. 28 (described above). Flowchart 3100 begins with step 3105, where control immediately flows to step 3110.

In step 3110, remedy module 2110 retrieves data from remedy_future_weather.data (determined in step 2810 in FIG. 28 above) and remedy_future_vegetation.data (determined in step 2815 in FIG. 28 above) for reservoir 905. Control then passes to step 3115.

In step 3115, remedy module 2110 determines the list of possible solutions 1310 for fundamental problems 1205 indicated in remedy_future_weather.data and remedy_future_vegetation.data. Remedy module 2110 determines this list referencing fundamental problems data 1010 (FIG. 12). Referring to FIG. 12, for each fundamental problem 1205 the possible solutions are checked in possible solutions 1220. It is important to note that this indicates generic solutions for the fundamental problems. In other words, the solutions are not specific for the fundamental problem of reservoir R1 currently being analyzed by renovation system 205. For example, solution S5 (alter adjacent land use—see FIG. 13) is one possible solution listed in fundamental problems data 1010 for fundamental problem FP3 (siltation). Assume FP3 is a fundamental problem of R1. It may be the situation that the use of the current land adjoining R1 forbids altering the land use. Thus, FP3 is not a possible solution for any fundamental problem of R1. Control passes to step 3120.

In step 3120, remedy module 2210 selects one of the possible solutions 1310 to determine whether it is a possible and/or affective solution 1310 for reservoir 905 in steps 3125, 3130, 3135, 3140, 3145, and 3150. Control passes to step 3125.

In step 3125, remedy module 2110 determines if selected solution 1310 was attempted in the past for reservoir 905, and if it was attempted, whether is was an affective solution for reservoir 905 during the same period or a period following shortly. Remedy module 2110 determines this by referencing reservoir/watershed history database 410 (FIG.

TABLE 8

| | | Future Terrestrial Vegetation | | | | |
|---|---|---|---|---|---|---|
| Reservoir | Fundamental Problem | Period1 Counts | Period1 Score | . . . | Period6 Counts | Period6 Score |
| R1 | FP1 | $Pos_1, Neg_1, No_1$ | $Score_1$ | . . . | $Pos_6, Neg_6, No_6$ | $Score_6$ |
| . | . | . | . | | . | . |
| . | . | . | . | | . | . |
| . | . | . | . | | . | . |

Referring to Table 8, remedy_future vegetation.data includes a record for each reservoir/fundamental problem combination. Each record stores the total positive count 9). Referring to FIG. 9, attempted solutions 920 indicates the solutions that were attempted for recorded problems 915 that existed in the same period (periods 620). If a particular solution 1310 was attempted in one period for a particular recorded problem and the recorded problem went away in subsequent periods, it is likely that solution 1310 was affective for the problem. Alternatively, if a particular solution 1310 was attempted in one period for a particular recorded problem and the recorded problem did not go away in subsequent periods, it is likely that the solution 1310 was not affective for the problem. (It is important to note that remedy module 2110 references diagnosis_fundamental_problems.data from Table 6 above to correlate recorded problems 915, which are typically observable problems 1105, with fundamental problems 1205 that cause observable problems 1105.) Depending on how ineffective the selected solution 1310 was in the past, remedy module 2110 may eliminate the selected solution 1310 from the list of possible solutions for reservoir 905. Control passes to step 3130.

In step 3130, remedy module 2110 determines whether selected solution 1310 is possible for reservoir 905 considering its current uses 940. Remedy module 2110 determines this by referencing reservoir/watershed history database (FIG. 9). Referring to FIG. 9, uses 940 indicates the percentage of each different use reservoir 905 was used for in year 605. The different types of uses 940 include drinking water 994, flood control 995, irrigation 996, recreation 997, power plant cooling 998, and other 999.

An example of when solution 1310 would not be desirable for reservoir 905, and thus deleted from the list of possible solutions by remedy module 2110, is when solution 1310 is dredging and reservoir 905 is used one hundred percent for supplying drinking water. Here, dredging may stir up too much residue in the drinking water, such that it can't be used for drinking water for an unacceptable period of time. Control then passes to step 3135.

In step 3135, remedy module 2110 determines whether the selected solution 1310 is possible for reservoir 905 considering its current makeup of its watershed. Remedy module 2110 determines this by referencing reservoir/watershed history database (FIG. 9). Referring to FIG. 9, description of watershed 910 indicates the types of terrain 945 and aquatic systems 950 that make up reservoir 905 for year 605. The different types of terrain 945 include grassland 955, cropland 960, forest 965, residential 970, industry 975, and other 980. The different types of aquatic systems 950 include ponds 985, wetlands 987, streams/rivers 989, and other 990.

An example of when a solution would not be desirable for reservoir 905, and thus deleted from the list of possible solutions by remedy module 2110, is when solution 1310 is to introduce herbicides (see S10 in solutions database 420) and reservoir R1's terrain consists of one hundred percent residential. Here, if the herbicides are harmful to human contact, it may not be desirable to use these herbicides in an area where children are likely to be in contact with the water after it has been treated. Control then passes to step 3140.

In step 3140, remedy module 2110 determines whether the selected solution 1310 is desirable for reservoir 905 considering the selected solution's economic impact 1325. An example of when solution 1310 would not be desirable for reservoir 905, and thus deleted from the list of possible solutions by remedy module 2110, is when solution 1310 has a high economic impact (see economic impact 1325 in solutions database 420) and the particular reservoir's ownership is private (see ownership type 935 in reservoir/watershed history database 410). Here, it may be impossible for a privately owned reservoir to afford an expensive solution 1310. Control then passes to step 3145.

In step 3145, remedy module 2110 determines whether the selected solution 1310 is desirable for reservoir 905 considering the selected solution's political impact 1330. An example of when solution 1310 would not be desirable for reservoir 905, and thus deleted from the list of possible solutions by remedy module 2110, is when solution 1310 has a high political impact (see political impact 1330 in solutions database 420) and the particular reservoir's ownership is district (see ownership type 935 in reservoir/watershed history database 410). Here, an elected official whose future re-election may be hinging on public approval, may not want to implement solution 1310 if it may affect his or her re-election. Control then passes to step 3150.

In step 3150, remedy module 2110 determines whether the selected solution 1310 is desirable for reservoir 905 considering the selected solution's environmental impact 1335. An example of when solution 1310 would not be desirable for reservoir 905, and thus deleted from the list of possible solutions by remedy module 2110, is when solution 1310 has a high environmental impact (see environmental impact 1335 in solutions database 420) and the particular reservoir's ownership is private (see ownership type 935 in reservoir/watershed history database 410). Here, since solution 1310 has a high environmental impact, it is likely that different government entities will have to approve of solution 1310 before it is implemented. A private owner may not have the resources and/or connections to get such a solution approved. Control then passes to step 3155.

In step 3155, remedy module 2110 determines if there are other possible solutions 1310 in the list to process. If there are additional solutions 1310 to process, the control returns to step 3120. Otherwise control passes to step 3160.

In step 3160, remedy module 2110 stores the remaining solutions 1310 (that have not been eliminated in steps 3125 through 3150 above) in the list in a temporary memory location or file called remedy solutions.data. An example of remedy_solutions_data is shown in Table 9 below.

TABLE 9

| Reservoir | Fundamental Problem | Remaining Solutions |
|-----------|---------------------|---------------------|
| R1        | FP1                 | S1, S3              |
|           | FP4                 | S2                  |

The remedy_solutions.data (Table 9 above) includes a record for each reservoir/fundamental problem combination. Each record stores the remaining solutions 1310. Control then passes to step 3165 where flowchart 3100 ends.

4. Operation of Compliance Module

Figure 32:
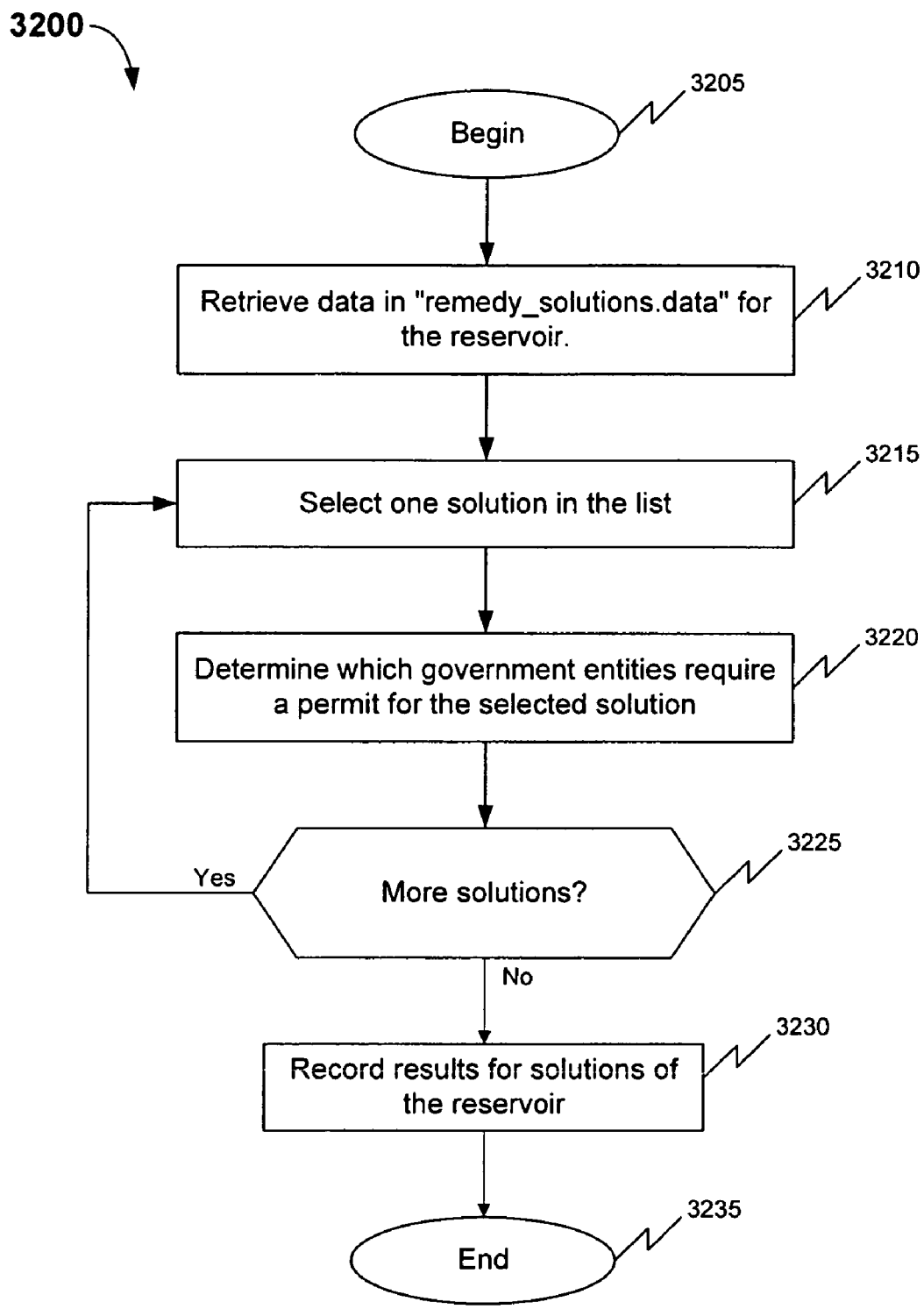
FIG. 32 is a flowchart illustrating the steps performed by the compliance module according to an embodiment of the present invention.
Figure 33:
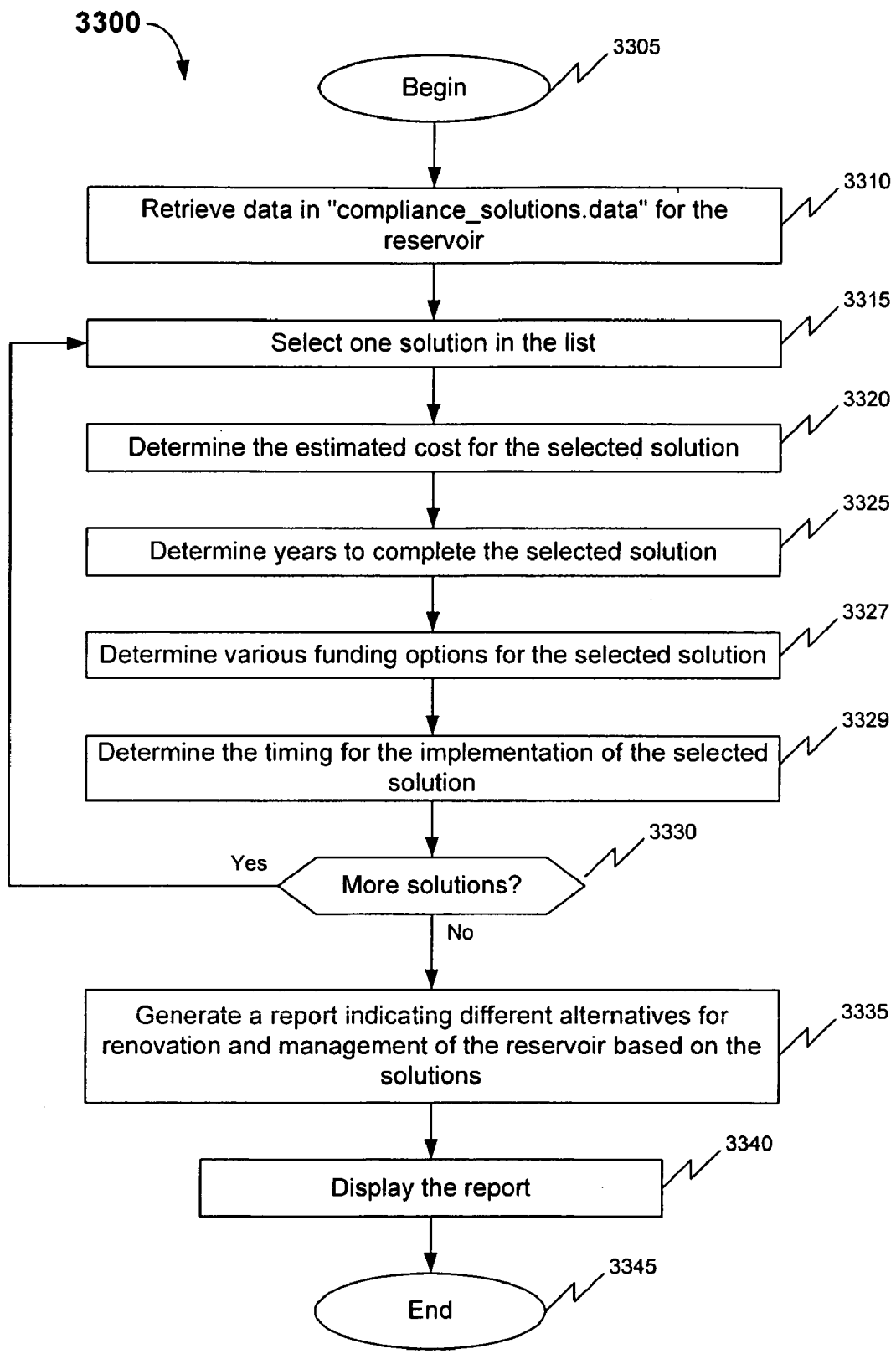
FIG. 33 is a flowchart illustrating the steps performed by the cost module according to an embodiment of the present invention.

As stated above, compliance module 2220 determines, for each remaining solution, which government entities that have jurisdiction over reservoir 905 require permits (step 2325 from FIG. 23). The specific data utilized by compliance module 2220 are remedy_solutions.data (output of remedy module 2210), reservoir/watershed history database 410, and government compliance database 430 (FIG. 19). A more detailed explanation of the operation of compliance module 2220 shall now be described. Reference shall be made to a flowchart 3200 of FIG. 32 while performing step 2325 in FIG. 23 (described above). Flowchart 3200 begins at step 3205 with control passing immediately to step 3210.

In step 3210, compliance module 2220 retrieves the data in remedy_solutions.data for reservoir 905. This provides to compliance module 2220 the list of remaining solutions 1310 that were determined by the present invention to apply to reservoir 905. Assume, for illustration purposes, that reservoir 905 is R1. From Table 9 above, assume the remaining solutions are S1 (adjust water level), S2 (cut weeds), and S3 (dredge). Control then passes to step 3215.

In step 3215, compliance module 2220 selects one remaining solution 1310 in the list. Assume compliance module 2220 selects S1. Control then passes to step 3220.

In step 3220, compliance module 2220 determines which government entities that have jurisdiction over R1 require a permit for S1. Here, compliance module 2220 references government compliance database 430 (FIG. 19) and determines that since R1 is in MA100 (see FIG. 9) then two types of government entities have jurisdiction over MA100 (and thus R1), including "federal" and the state "Alaska." Now, referencing permit required for solution 1920, the solution S1 is not required by either the federal government or the state of Alaska to get a permit. Control then passes to step 3225.

In step 3225, compliance module 2220 determines if there are other remaining solutions 1310 in the list to process. If there are additional solutions 1310 to process, the control returns to step 3215. Otherwise control passes to step 3230.

In step 3230, compliance module 2220 stores the results, indicating for each remaining solution 1310, which permits are required in a temporary memory location or file called compliance_solutions.data. An example of compliance_solutions_data is shown in Table 10 below.

TABLE 10

| Reservoir | Fundamental Problem | Remaining Solutions | Permits Required |
|---|---|---|---|
| R1 | FP1 | S1 | None |
|  |  | S3 | Alaska |
|  | FP4 | S2 | None |

Compliance_solutions.data (Table 10 above) includes a record for each reservoir/fundamental problem/remaining solutions combination. Each record stores the permits required for each remaining solution 1310. Control then passes to step 3235 where flowchart 3200 ends.

5. Operation of Cost Module

As stated above, cost module 2215 determines, for each remaining solution 1310, its estimated cost, estimated years to complete, optional funding options, the timing of its implementation, and so forth., in a report form for the user of renovation system 205 to view (step 2330 from FIG. 23). The specific data utilized by compliance module 2220 are compliance_solutions.data (output of compliance module 2220), reservoir/watershed history database 410, and solutions database 420. A more detailed explanation of the operation of cost module 2215 shall now be described. Reference shall be made to a flowchart 3300 while performing step 2330 in FIG. 23 (described above). Flowchart 3300 begins at step 3305 with control passing immediately to step 3310.

In step 3310, cost module 2215 retrieves the data in compliance_solutions.data for reservoir 905. This provides to cost module 2215 the remaining list of solutions 1310 for reservoir 905 and the permits that are required for each solution 1310. Control then passes to step 3315.

In step 3315, cost module 2215 selects one solution 1310 in the list. Control then passes to step 3320.

In step 3320, cost module 2215 determines the estimated cost of selected solution 1310 for reservoir 905. Here, cost module 2215 references a cost database (not shown) that lists particular costs associated with each solution 1310 (e.g., materials and labor from industry suppliers 230) and reservoir/watershed history database 410 (e.g., size in acres of water supply versus total size 930, uses 940, description of watershed 910, and so forth). Cost module 2215 calculates a cost for selected solution 1310 using calculator module 2005 from background modules 315 (FIG. 20). Control then passes to step 3325.

In step 3325, cost module 2215 determines the estimated years to complete selected solution 1310. Here, cost module 2215 also references the cost database and reservoir/watershed history database 410 to make this determination. Control then passes to step 3327.

In step 3327, cost module 2215 determines various funding options for selected solution 1310. Here, cost module 2215 also references the cost database and reservoir/watershed history database 410 to make this determination. Control then passes to step 3329.

In step 3329, cost module 2215 determines the timing for the implementation of selected solution 1310. Here, cost module 2215 also references the cost database and reservoir/watershed history database 410 to make this determination. For example, cost module 2215 may recommend that selected solution 1310 be implemented immediately or else risk the cost of selected solution 1310 doubling in cost each year its implementation is delayed. Control then passes to step 3330.

In step 3330, cost module 2215 determines if there are other remaining solutions 1310 in the list to process. If there are remaining solutions 1310 to process, control returns to step 3315. Otherwise control passes to step 3335.

In step 3335, cost module 2215 generates a report indicating different alternative solutions 1310 for fundamental problems 1205 of reservoir 905 for both renovation and management. Control then passes to step 3340.

In step 3340, the report is displayed to the user of renovation system 205. Again, the report suggests to the user one or more solutions 1310 for each fundamental problem 1205 that renovation system 205 has determined reservoir 905 is experiencing. The user is likely to look at these suggested solutions 1310 and implement one or more of solutions 205. Once the implementation of solutions 1310 has begun, the present invention can analyze the effectiveness of implemented solutions 1310 along the way such that adjustments can be made to implemented solutions 1310 prior to their completion. Control then passes to step 3345 where flowchart 3300 ends.

The modules of administration modules 310 will now be described.

C. Administration Modules

Figure 34:
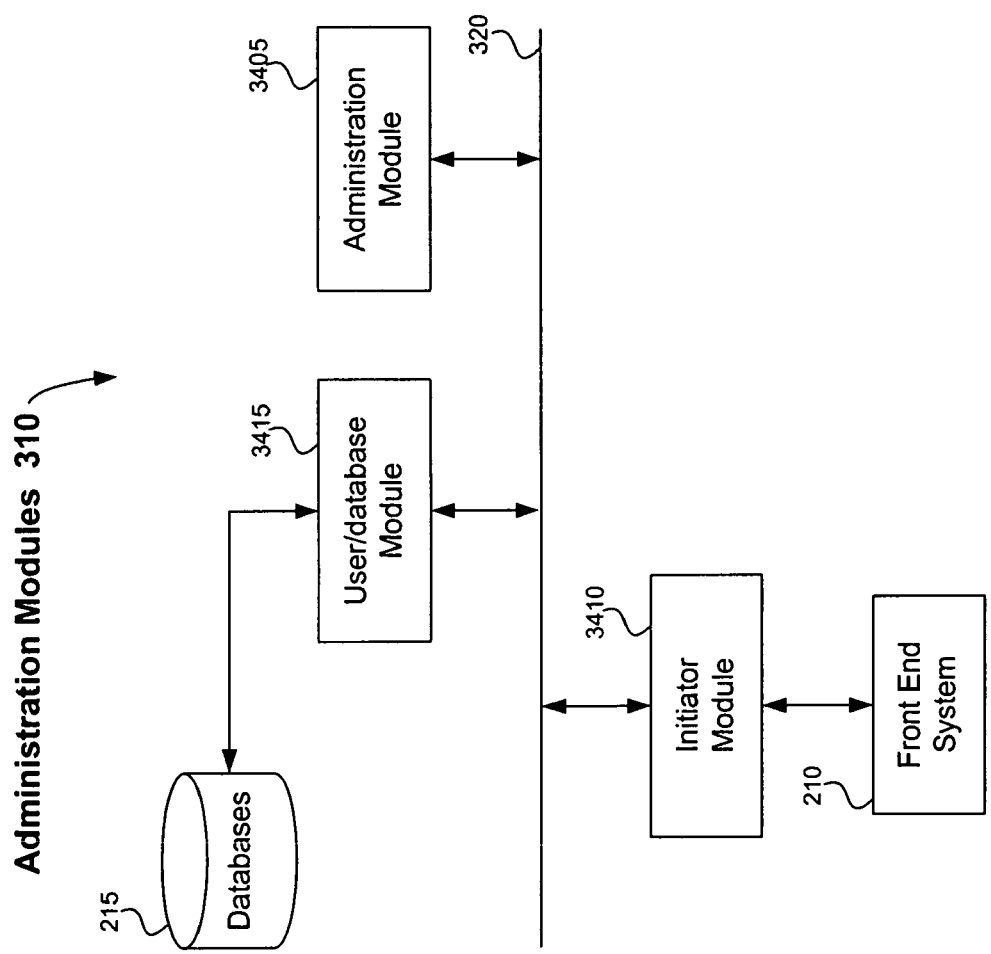
FIG. 34 is a block diagram of the administration modules of renovation system according to an embodiment of the present invention.

Each module of administration modules 310 performs a unique set of administrative features. Referring to FIG. 34, administration modules 310 provides an administration module 3405, an initiator module 3410, and a user/database module 3415. Each of these modules is described in detail below.

1. Administration Module

Administration module 3405 provides the front end for the administration of databases 215. Administration module 3405 allows the user to maintain databases 215, obtain various reports, and administer logon activities such as logon passwords. Preferably, front end system 210 provides an administration GUI to facilitate the user in the administration of databases 215.

2. Initiator Module

Initiator module 3410 is the interface to front end system 210. Initiator module 3410 is also responsible for coordinating, prioritizing, and arbitrating the activities amongst the various modules of renovation system 205. Initiator module 3410 is also responsible for accepting data via front end system 210 and returning results via front end system 210 back to the user.

3. User/database Module

User/database module 3415 provided by the present invention manages user access (security) and databases 215 administration requirements. User/database module 3415 controls user access by managing user passwords needed to access various modules of the present invention. Preferably, user access is controlled on both an individual level and on a group level. User/database 3415 also facilitates databases 215 administration. This includes performing backups of databases 215, displaying variables relating to the environment of the present invention, displaying cron logs, performing miscellaneous operating system utilities, initializing databases 215 for multiple users, and controlling purging and archiving routines.

IX. Implementations of the Present Invention

A. An Implementation of the Present Invention

Figure 35:
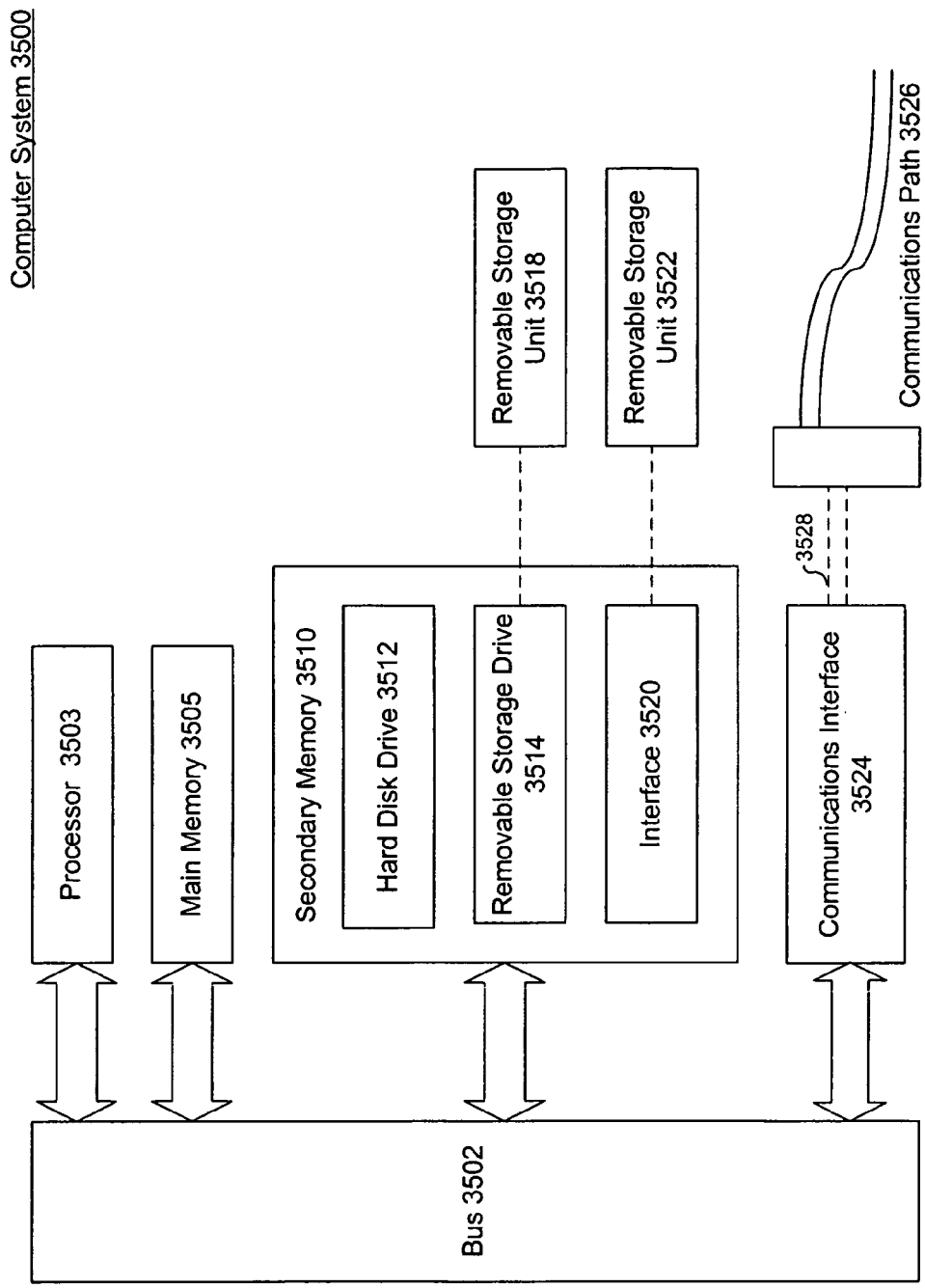
FIG. 35 is a block diagram of a computer system preferably used to implement the present invention according to an embodiment of the present invention.

The present invention (i.e., renovation system 205, front end system 210, databases 215, or any part thereof) may be implemented using hardware, software or a combination thereof and may be implemented in one or more computer systems or other processing systems. In fact, in one embodiment, the invention is directed towards one or more computer systems capable of carrying out the functionality described herein. An example of a computer system 3500 is shown in FIG. 35. The computer system 3500 includes one or more processors, such as processor 3503. The processor 3503 is connected to a communication bus 3502. Various software embodiments are described in terms of this exemplary computer system. After reading this description, it will be apparent to a person skilled in the relevant art how to implement the invention using other computer systems and/or computer architectures.

Computer system 3500 also includes a main memory 3505, preferably random access memory (RAM), and may also include a secondary memory 3510. The secondary memory 3510 may include, for example, a hard disk drive 3512 and/or a removable storage drive 3514, representing a floppy disk drive, a magnetic tape drive, an optical disk drive, etc. The removable storage drive 3514 reads from and/or writes to a removable storage unit 3518 in a well known manner. Removable storage unit 3518, represents a floppy disk, magnetic tape, optical disk, etc. which is read by and written to by removable storage drive 3514. As will be appreciated, the removable storage unit 3518 includes a computer usable storage medium having stored therein computer software and/or data.

In alternative embodiments, secondary memory 3510 may include other similar means for allowing computer programs or other instructions to be loaded into computer system 3500. Such means may include, for example, a removable storage unit 3522 and an interface 3520. Examples of such may include a program cartridge and cartridge interface (such as that found in video game devices), a removable memory chip (such as an EPROM, or PROM) and associated socket, and other removable storage units 3522 and interfaces 3520 which allow software and data to be transferred from the removable storage unit 3522 to computer system 3500.

Computer system 3500 may also include a communications interface 3524. Communications interface 3524 allows software and data to be transferred between computer system 3500 and external devices. Examples of communications interface 3524 may include a modem, a network interface (such as an Ethernet card), a communications port, a PCMCIA slot and card, etc. Software and data transferred via communications interface 3524 are in the form of signals 3528 which may be electronic, electromagnetic, optical or other signals capable of being received by communications interface 3524. These signals 3528 are provided to communications interface 3524 via a communications path (i.e., channel) 3526. This channel 3526 carries signals 3528 and may be implemented using wire or cable, fiber optics, a phone line, a cellular phone link, an RF link and other communications channels.

In this document, the term "computer program product" refers to removable storage units 3518, 3522, and signals 3528. These computer program products are means for providing software to computer system 3500. The invention is directed to such computer program products.

Computer programs (also called computer control logic) are stored in main memory 3505, and/or secondary memory 3510 and/or in computer program products. Computer programs may also be received via communications interface 3524. Such computer programs, when executed, enable the computer system 3500 to perform the features of the present invention as discussed herein. In particular, the computer programs, when executed, enable the processor 3503 to perform the features of the present invention. Accordingly, such computer programs represent controllers of computer system 3500.

In an embodiment where the invention is implemented using software, the software may be stored in a computer program product and loaded into computer system 3500 using removable storage drive 3514, hard drive 3512 or communications interface 3524. The control logic (software), when executed by processor 3503, causes processor 3503 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

B. A Software Programming Language and Network Architecture

As discussed above, computer programs when executed, enable computer 3500 to perform the functions of the present invention as discussed herein. In an embodiment, the present invention is implemented using computer programs written in an object-oriented programming language. Object-oriented programming is a type of programming in which programmers define not only the data type of a data structure, but also the types of operations (functions) that can be applied to the data structure. In this way, the data structure becomes an object that includes both data and functions. In addition, programmers can create relationships between one object and another. For example, objects can inherit characteristics from other objects.

One of the principal advantages of object-oriented programming techniques over procedural programming techniques is that they enable programmers to create components that do not need to be changed when a new type of object is added. A programmer can simply create a new object that inherits many of its features from existing objects. This makes object-oriented programs easier to modify. To perform object-oriented programming, one needs an object-oriented programming language (OOPL). C++ and Smalltalk are two of the more popular languages, and there are also object-oriented versions of Pascal. While an embodiment of the present invention is implemented using computer programs written in an object-oriented programming language, the present invention can also be implemented using procedural programming languages, etc.

As discussed above, one or more of computers 3500 is connected by a network. An embodiment of the present invention uses a type of network architecture called a peer-to-peer object architecture. Before peer-to-peer object architecture can be understood, a type of network architecture called client/server architecture must be described. Client/server architecture is a network architecture in which each computer or process on the network is either a client or a server. Servers are computers or processes dedicated to managing disk drives (file servers), printers (print servers), applications/functions or network traffic (network servers). In fact, a server is any computer or device that allocates resources for an application. Clients are personal computers or workstations on which users run applications. Clients rely on servers for resources, such as files, devices, execution of functions and even processing power.

Figure 36G:
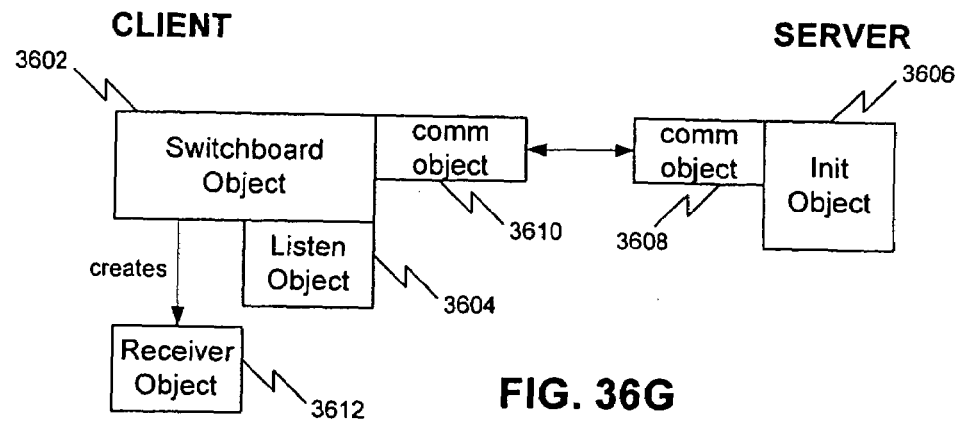
Figure 36H:
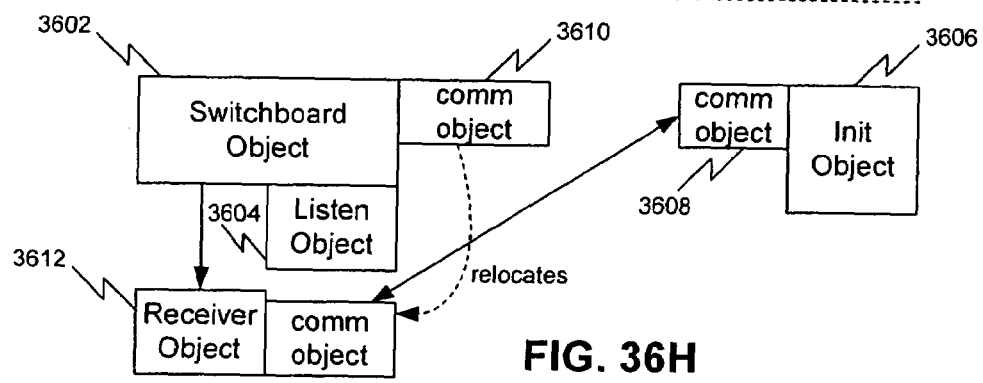

FIGS. 36A–36I illustrate the dynamic steps to establish communication between a client and a server executing an object-oriented program. In FIG. 36A, the client has switchboard object 3602 and listen object 3604 waiting for a request from the server. In FIG. 36B, init object 3606 determines that it needs to perform a specific task. In FIG. 36C, init object 3606 creates comm object 3608. Comm object 3608 is used to communicate with the client. Then, comm object 3608 makes a connection to listen object 3604 in FIG. 36D. Once comm object 3608 makes the connection, listen object 3604 creates comm object 3610 and relocates comm object 3610 to switchboard object 3602. Comm object 3610 is used to communicate back to the server (i.e., between the two piers), via comm object 3608.

Figure 36I:
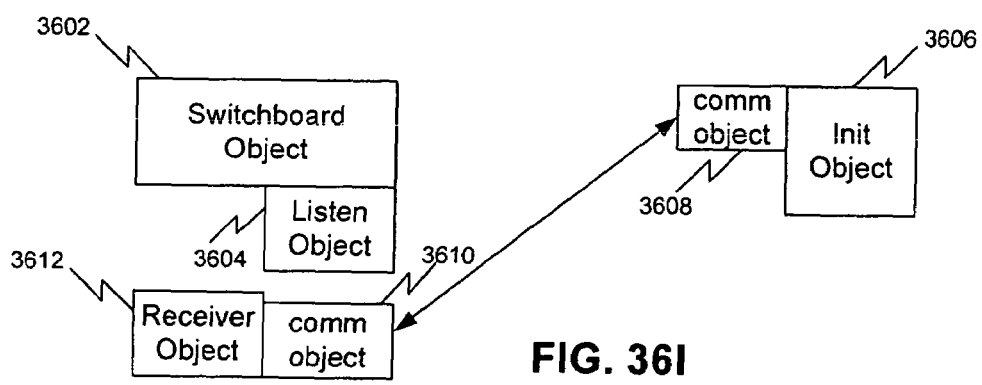

At this point, as shown in FIG. 36F, there is two-way communication between the client and the server (i.e., between the two piers) through comm object 3608 and comm object 3610. Init object 3606 knows which receiver object needs to be created by the client (i.e., receiving pier) to perform the specific task required. Therefore, once this communication is established, init object 3606 sends a request to the client (i.e., receiving pier) to create the specific receiver object. In FIG. 36G, switchboard object 3602 receives the request, via comm object 3610, and creates receiver object 3612. Once receiver object 3612 is created, comm object 3610 is relocated to receiver object 3612 in FIG. 36H. Now, as shown in FIG. 36I, init object 3606 and receiver object 3612, via comm object 3608 and comm object 3610, can communicate back and forth until receiver object 3612 completes the task requested by init object 3606.

As stated above, an embodiment of the present invention uses a type of network architecture called a peer-to-peer object architecture. A peer-to-peer object architecture is when each computer in the network has equivalent capabilities and responsibilities. This differs from client/server architectures, in which some computers are dedicated to serving the others. Therefore, in an embodiment of the present invention, all components (e.g., computers 3500) can operate as either a server or a client with respect to all other components.

As discussed above, one advantage of using an object-oriented programming language is that it allows programmers to create components that do not need to be changed when a new type of object is added. In fact, each component of the present invention is a self-contained object that can exist, evolve, and execute without the presence of any other component. Each component exposes its services, which can be used by any other component.

In an embodiment of the present invention, the components (and the features within) are built and packaged as Common Object Request Broker Architecture (CORBA) compliant components with CORBA Interface Definition Language (IDL) used for interface specifications between the components. The IDL is used to define interfaces to objects. Remote objects view a CORBA object purely in terms of its interface. IDL provides encapsulation of an object's implementation behind a formal IDL interface that is independent of implementation language, implementation algorithm, location, machine architecture, operating system, and network technology. This separation of interface and implementation allows CORBA to be viewed as a 'software bus,' and is one of the most powerful aspects of CORBA.

In fact, when the components of the present invention are built and packaged as CORBA compliant components, network 320 (FIG. 3) is implemented as an object request broker (ORB). Here, network 320 is really an 'object bus' that handles all communication between processing modules 305, administration modules 310, and background modules 315. It is the implementation of the modules of the present invention as CORBA compliant modules that help to provide ease of customization to users. It is possible to provide variations of the features through multiple interfaces of the modules. To the extent possible, business functionality is separated from technical implementation. This separation provides future maintainability, ease of enhancements, and additions of new functions.

C. Other Implementations of the Present Invention

The present invention (i.e., renovation system 205, front end system 210, databases 215, or any part thereof) may also be implemented using neural networks and/or expert systems.

A neural network is a type of artificial intelligence that attempts to imitate the way a human brain works. Rather than using a digital model (as directed towards in the embodiments of the present invention explained above), in which all computations manipulate zeros and ones, a neural network works by creating connections between processing elements, the computer equivalent of neurons. The organization and weights of the connections determine the output.

Neural networks are particularly effective for predicting events when the networks have a large database of prior examples to draw on. Strictly speaking, a neural network implies a non-digital computer, but neural networks can be simulated on digital computers, such as computer 3500.

An expert system is a computer application that performs a task that would otherwise be performed by a human expert. For example, there are expert systems that can diagnose human illnesses, schedule routes for delivery vehicles make financial forecasts, and make weather forecasts. Some expert systems are designed to take the place of human experts, while others are designed to aid them.

Expert systems are part of a general category of computer applications known as artificial intelligence. To design an expert system, one needs a knowledge engineer (i.e., an individual who studies how human experts make decisions and translates the rules into terms that a computer can understand).

Anyway, expert systems are meant to solve real problems which normally would require a specialized human expert (such as a doctor or a mineralogist). Building an expert system therefore first involves extracting the relevant knowledge from the human expert. Such knowledge is often heuristic in nature, based on useful "rules of thumb" rather than absolute certainties. Extracting it from the expert in a way that can be used by a computer is generally a difficult task, requiring its own expertise. A knowledge engineer has the job of extracting this knowledge and building the expert system knowledge base.

A first attempt at building an expert system is unlikely to be very successful. This is partly because the expert generally finds it very difficult to express exactly what knowledge and rules they use to solve a problem. Much of it is almost subconscious, or appears so obvious they don't even bother mentioning it. Knowledge acquisition for expert systems is a big area of research, with a wide variety of techniques developed. However, generally it is important to develop an initial prototype based on information extracted by interviewing the expert, then iteratively refine it based on feedback both from the expert and from potential users of the expert system.

In order to do such iterative development from a prototype it is important that the expert system is written in a way that it can easily be inspected and modified. The system should be able to explain its reasoning (to expert, user and knowledge engineer) and answer questions about the solution process. Updating the system shouldn't involve rewriting a whole lot of code—just adding or deleting localized chunks of knowledge.

The most widely used knowledge representation scheme for expert systems is rules (sometimes in combination with frame systems). Typically, the rules won't have certain conclusions—there will just be some degree of certainty that the conclusion will hold if the conditions hold. Statistical techniques are used to determine these certainties. Rule-based systems, with or without certainties, are generally easily modifiable and make it easy to provide reasonably helpful traces of the system's reasoning. These traces can be used in providing explanations of what it is doing.

Expert systems have been used to solve a wide range of problems in domains such as medicine, mathematics, engineering, geology, computer science, business, law, defense, and education. Within each domain, they have been used to solve problems of different types. Types of problem involve diagnosis (e.g., of a system fault, disease or student error); design (of a computer systems, hotel etc); and interpretation (of, for example, geological data). The appropriate problem solving technique tends to depend more on the problem type than on the domain. Whole books have been written on how to choose your knowledge representation and reasoning methods given characteristics of your problem.

X. Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A weather and terrestrial vegetation-based system for forecasting renovation and management for a body of water, comprising:

means for accessing a database having stored therein data for analyzing the body of water, wherein said database includes weather history data, weather forecast data, terrestrial vegetation history data, terrestrial vegetation forecast data, body of water history data, a list of observable problems, and a list of fundamental problems; and a renovation system to execute a request to analyze the body of water for renovation and management by using said weather history data, said weather forecast data, said terrestrial vegetation history data, said terrestrial vegetation forecast data, and said body of water history data to determine potential problems for the body of water and potential solutions for said potential problems;

wherein said list of observable problems includes information about at least one of a fish activity within the body of water, a density of terrestrial vegetation within a vicinity of the body of water, a taste of the body of water, and an odor of the body of water; and wherein said list of fundamental problems includes information about at least one of a density of nutrients within a soil within said vicinity of the body of water and a distribution of thermal energy within the body of water;

wherein the body of water is one of a lake, a reservoir, and a pond.

2. The system of claim 1, wherein said database data are one of passed in via a front end system, collected by said renovation system, and derived by said renovation system.

3. The system of claim 1, further comprising a front end system to receive a request to analyze the body of water for renovation and management, wherein said front end system is a web server.

4. The system of claim 1, wherein said renovation system comprises:

processing modules for performing processing functions;

administration modules for performing administration functions; and background modules for performing background functions required by said processing modules and said administration modules.

5. The system of claim 1, wherein said renovation system comprises:

an analyzer module to determine an impact said weather history data and said terrestrial vegetation history data had on actual observable problems of the body of water;

a diagnosis module to determine actual fundamental problems for the body of water based on said actual observable problems; and a remedy module to estimate an impact said weather forecast data and said terrestrial vegetation forecast data will have on said actual fundamental problems based on the impact said weather history data and said terrestrial vegetation history data had on said actual observable problems, and then to determine, based on the impact said weather forecast data and said terrestrial vegetation forecast data will have on said actual fundamental problems, and at least one solution for said actual fundamental problems.

6. The system of claim 5, further comprising:
a compliance module to determine compliance for a solution of said at least one solution; and
a cost module to determine for said solution of said at least one solution a list of factors that will aid in the renovation and management of the body of water;
wherein said list of factors includes at least one of an estimated cost, years to complete, a possible funding, and a timing of implementation.

7. A terrestrial vegetation-based system for forecasting renovation and management for a body of water, comprising:
means for accessing a database having stored therein data for analyzing the body of water, wherein said database includes at least one of terrestrial vegetation history data, terrestrial vegetation forecast data, body of water history data, a list of observable problems, a list of fundamental problems, and a list of solutions;
a front end system to receive a request to analyze the body of water for renovation and management; and
a renovation system to execute said request by using at least one of said terrestrial vegetation history data, said terrestrial vegetation forecast data, said body of water history data, said list of problems, and said list of solutions to determine potential problems for the body of water and potential solutions for said potential problems;
wherein said list of observable problems includes information about at least one of a fish activity within the body of water, a density of terrestrial vegetation within a vicinity of the body of water, a taste of the body of water, and an odor of the body of water; and
wherein said list of fundamental problems includes information about at least one of a density of nutrients within a soil within said vicinity of the body of water and a distribution of thermal energy within the body of water;
wherein the body of water is one of a lake, a reservoir, and a pond.

8. The system of claim 7, wherein said database data are one of passed in via said front end system, collected by said renovation system, and derived by said renovation system.

9. The system of claim 7, wherein said front end system is a web server.

10. The system of claim 7, wherein said renovation system comprises:
processing modules for performing processing functions;
administration modules for performing administration functions; and
background modules for performing background functions required by said processing modules and said administration modules.

11. The system of claim 7, wherein said renovation system comprises:
an analyzer module to determine an impact said terrestrial vegetation history data had on actual observable problems of the body of water;
a diagnosis module to determine actual fundamental problems for the body of water based on said actual observable problems; and
a remedy module to estimate an impact said terrestrial vegetation forecast data will have on said actual fundamental problems based on the impact said terrestrial vegetation history data had on said actual observable problems, and then to determine, based on the impact said terrestrial vegetation forecast data will have on said actual fundamental problems, and at least one solution for said actual fundamental problems.

12. The system of claim 11, further comprising:
a compliance module to determine compliance for a solution of said at least one solution; and
a cost module, wherein said cost module determines for said solution of said at least one solution a list of factors that will aid in the renovation and management of the body of water;
wherein said list of factors includes at least one of an estimated cost, years to complete, a possible funding, and a timing of implementation.

13. A computer-based weather and terrestrial vegetation-based method for forecasting renovation and management for a body of water, comprising the steps of:
accessing a database having stored therein data for analyzing the body of water, wherein said database includes weather history data, weather forecast data, terrestrial vegetation history data, terrestrial vegetation forecast data, body of water history data, a list of observable problems, and a list of fundamental problems, and wherein said database is coupled to a computer system; and
executing on the computer system a request to analyze the body of water for renovation and management by using said weather history data, said weather forecast data, said terrestrial vegetation history data, said terrestrial vegetation forecast data, and said body of water history data to determine potential problems for the body of water and potential solutions for said potential problems;
wherein said list of observable problems includes information about at least one of a fish activity within the body of water, a density of terrestrial vegetation within a vicinity of the body of water, a taste of the body of water, and an odor of the body of water; and
wherein said list of fundamental problems includes information about at least one of a density of nutrients within a soil within said vicinity of the body of water and a distribution of thermal energy within the body of water;
wherein the body of water is one of a lake, a reservoir, and a pond.

14. The method of claim 13, wherein said database data are one of passed in via a front end system, collected by a renovation system, and derived by said renovation system.

15. The method of claim 14, wherein said front end system is a web server.

16. The method of claim 13, wherein said executing step comprises the steps of:
performing processing functions;
performing administration functions; and
performing background functions required by said performing processing functions step and said performing administration functions step.

17. The method of claim 13, wherein said executing step comprises the steps of:
determining an impact said weather history data and said terrestrial vegetation history data had on actual observable problems of the body of water;
determining actual fundamental problems for the body of water based on said actual observable problems;
estimating an impact said weather forecast data and said terrestrial vegetation forecast data will have on said actual fundamental problems based on the impact said weather history data and said terrestrial vegetation history data had on said actual observable problems; and determining at least one solution from said potential solutions based on said estimated impact said weather forecast data and said terrestrial vegetation data will have on said actual fundamental problems.

18. The method of claim 17, wherein said executing step further comprises the steps of:

determining a compliance for a solution of said at least one solution; and determining a list of factors for said solution of said at least one solution that will aid in the renovation and management of the body of water;

wherein said list of factors includes at least one of an estimated cost, years to complete, a possible funding, and a timing of implementation.

19. A computer-based terrestrial vegetation-based method for forecasting renovation and management for a body of water, comprising the steps of:

accessing a database having stored therein data for analyzing the body of water, wherein said database includes at least one of terrestrial vegetation history data, terrestrial vegetation forecast data, body of water history data, a list of observable problems, a list of fundamental problems, and a list of solutions, and wherein said database is coupled to a computer system;

receiving on the computer system a request to analyze the body of water for renovation and management; and executing on the computer system said request by using at least one of said terrestrial vegetation history data, said terrestrial vegetation forecast data, said body of water history data, said list of problems, and said list of solutions to determine potential problems for the body of water and potential solutions for said potential problems;

wherein said list of observable problems includes information about at least one of a fish activity within the body of water, a density of terrestrial vegetation within a vicinity of the body of water, a taste of the body of water, and an odor of the body of water; and wherein said list of fundamental problems includes information about at least one of a density of nutrients within a soil within said vicinity of the body of water and a distribution of thermal energy within the body of water;

wherein the body of water is one of a lake, a reservoir, and a pond.

20. The method of claim 19, wherein said database data are one of passed in via a front end system, collected by a renovation system, and derived by said renovation system.

21. The method of claim 20, wherein said front end system is a web server.

22. The method of claim 19, wherein said executing step comprises the steps of:

performing processing functions;

performing administration functions; and performing background functions required by said performing processing functions step and said performing administration functions step.

23. The method of claim 19, wherein said executing step comprises the steps of:

determining an impact said terrestrial vegetation history data had on actual observable problems of the body of water;

determining actual fundamental problems for the body of water based on said actual observable problems;

estimating an impact said terrestrial vegetation forecast data will have on said actual fundamental problems based on the impact said terrestrial vegetation history data had on said actual observable problems; and determining at least one solution from said potential solutions based on said estimated impact said terrestrial vegetation data will have on said actual fundamental problems.

24. The method of claim 23, wherein said list of factors includes at least one of an estimated cost, years to complete, a possible funding, and a timing of implementation.

* * * * *